United States Patent
Catalena

(10) Patent No.: US 11,950,170 B2
(45) Date of Patent: *Apr. 2, 2024

(54) PASSIVE SENSOR TRACKING USING OBSERVATIONS OF Wi-Fi ACCESS POINTS

(71) Applicant: Troverlo, Inc., College Station, TX (US)

(72) Inventor: Cody William Catalena, College Station, TX (US)

(73) Assignee: TROVERLO, INC., College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,396

(22) Filed: Feb. 14, 2023

(65) Prior Publication Data
US 2023/0199434 A1    Jun. 22, 2023

Related U.S. Application Data

(63) Continuation of application No. 17/102,429, filed on Nov. 23, 2020, now Pat. No. 11,589,187, which is a
(Continued)

(51) Int. Cl.
*H04W 4/029* (2018.01)
*G01S 5/02* (2010.01)
(Continued)

(52) U.S. Cl.
CPC ........... *H04W 4/029* (2018.02); *G01S 5/0284* (2013.01); *H04B 17/318* (2015.01);
(Continued)

(58) Field of Classification Search
CPC ..... H04W 12/06; H04W 12/03; H04W 4/029; H04W 4/38; H04W 84/12; H04W 88/08;
(Continued)

(56) References Cited

U.S. PATENT DOCUMENTS

| 6,122,520 A | 9/2000 | Want et al. |
| 6,442,485 B2 | 8/2002 | Evans |

(Continued)

FOREIGN PATENT DOCUMENTS

| CN | 102811481 A | 12/2012 |
| CN | 104640073 A | 5/2015 |

(Continued)

OTHER PUBLICATIONS

China National Intellectual Property Administration notice of allowance issued in Chinese patent application 202080063959.3, dated Jan. 11, 2023.

(Continued)

*Primary Examiner* — Joseph Arevalo
(74) *Attorney, Agent, or Firm* — Basil M. Angelo; ANGELO IP

(57) ABSTRACT

A method of passive sensor tracking includes using a Wi-Fi access point that transmits a management frame comprising sensor data of a sensor as part of Wi-Fi wireless network discovery, associating unique identifying information of the Wi-Fi access point with a sensor in a sensor tracking database, receiving observation data of the Wi-Fi access point from a Wi-Fi AP Database, the observation data including the unique identifying information of the Wi-Fi access point and the sensor data of the sensor, and storing the sensor data in the sensor tracking database. The Wi-Fi AP Database receives one or more reports comprising observation data from one or more wireless devices that encounter the Wi-Fi access point.

51 Claims, 21 Drawing Sheets

Related U.S. Application Data continuation-in-part of application No. 16/812,471, filed on Mar. 9, 2020, now Pat. No. 10,848,934, which is a continuation-in-part of application No. 16/570,195, filed on Sep. 13, 2019, now Pat. No. 10,728,709, said application No. 17/102,429 is a continuation-in-part of application No. 16/812,612, filed on Mar. 9, 2020, now Pat. No. 10,848,935, which is a continuation-in-part of application No. 16/570,195, filed on Sep. 13, 2019, now Pat. No. 10,728,709, said application No. 17/102,429 is a continuation-in-part of application No. 17/099,749, filed on Nov. 16, 2020, now Pat. No. 11,622,234, which is a continuation-in-part of application No. 16/907,806, filed on Jun. 22, 2020, now Pat. No. 10,841,749, which is a continuation of application No. 16/570,195, filed on Sep. 13, 2019, now Pat. No. 10,728,709.

(51) Int. Cl.
*H04B 17/318* (2015.01)
*H04W 4/02* (2018.01)
*H04W 48/08* (2009.01)
*H04W 48/16* (2009.01)
*H04W 48/20* (2009.01)

(52) U.S. Cl.
CPC ........... *H04W 4/023* (2013.01); *H04W 48/08* (2013.01); *H04W 48/16* (2013.01); *H04W 48/20* (2013.01)

(58) Field of Classification Search
CPC . H04W 12/0471; H04W 24/10; H04W 4/023; H04W 4/025; H04W 4/70; H04W 48/08; H04W 48/16; H04W 48/20; H04W 84/005; H04W 4/80; H04W 12/0431; H04W 12/0433; H04W 12/069; H04W 12/30; H04W 12/47; H04W 12/50; H04W 4/50; H04W 80/10
USPC ...... 455/456.1, 574, 404.1, 456.5, 437, 454, 455/411
See application file for complete search history.

(56) References Cited

U.S. PATENT DOCUMENTS

| | | |
|---|---|---|
| 6,934,540 B2 | 8/2005 | Twitchell, Jr. |
| 7,136,832 B2 | 11/2006 | Li et al. |
| 7,155,238 B2 | 12/2006 | Katz |
| 7,305,245 B2 | 12/2007 | Alizadeh-Shabdiz et al. |
| 7,403,762 B2 | 7/2008 | Morgan et al. |
| 7,411,921 B2 | 8/2008 | Strong et al. |
| 7,414,988 B2 | 8/2008 | Jones et al. |
| 7,433,694 B2 | 10/2008 | Morgan et al. |
| 7,471,954 B2 | 12/2008 | Brachet et al. |
| 7,474,897 B2 | 1/2009 | Morgan et al. |
| 7,493,127 B2 | 2/2009 | Morgan et al. |
| 7,515,578 B2 | 4/2009 | Alizadeh-Shabdiz et al. |
| 7,551,579 B2 | 6/2009 | Alizadeh-Shabdiz et al. |
| 7,551,929 B2 | 6/2009 | Alizadeh-Shabdiz et al. |
| 7,558,852 B2 | 7/2009 | Douglas et al. |
| 7,768,963 B2 | 8/2010 | Alizadeh-Shabdiz |
| 7,769,396 B2 | 8/2010 | Alizadeh-Shabdiz et al. |
| 7,778,649 B2 | 8/2010 | Sharony et al. |
| 7,818,017 B2 | 10/2010 | Alizadeh-Shabdiz et al. |
| 7,835,754 B2 | 11/2010 | Alizadeh-Shabdiz et al. |
| 7,848,765 B2 | 12/2010 | Phillips et al. |
| 7,856,234 B2 | 12/2010 | Alizadeh-Shabdiz et al. |
| 7,860,648 B2 | 12/2010 | Jung et al. |
| 7,916,661 B2 | 3/2011 | Alizadeh-Shabdiz et al. |
| 7,999,742 B2 | 8/2011 | Alizadeh-Shabdiz |
| 8,014,788 B2 | 9/2011 | Alizadeh-Shabdiz et al. |
| 8,019,357 B2 | 9/2011 | Alizadeh-Shabdiz et al. |
| 8,022,877 B2 | 9/2011 | Alizadeh-Shabdiz |
| 8,031,657 B2 | 10/2011 | Jones et al. |
| RE42,927 E | 11/2011 | Want et al. |
| 8,054,219 B2 | 11/2011 | Alizadeh-Shabdiz |
| 8,063,820 B2 | 11/2011 | Alizadeh-Shabdiz |
| 8,089,398 B2 | 1/2012 | Alizadeh-Shabdiz |
| 8,089,399 B2 | 1/2012 | Alizadeh-Shabdiz |
| 8,090,386 B2 | 1/2012 | Alizadeh-Shabdiz et al. |
| 8,103,288 B2 | 1/2012 | Alizadeh-Shabdiz et al. |
| 8,130,148 B2 | 3/2012 | Alizadeh-Shabdiz |
| 8,140,094 B2 | 3/2012 | Morgan et al. |
| 8,144,673 B2 | 3/2012 | Alizadeh-Shabdiz |
| 8,154,454 B2 | 4/2012 | Alizadeh-Shabdiz |
| 8,155,666 B2 | 4/2012 | Alizadeh-Shabdiz |
| 8,155,673 B2 | 4/2012 | Alizadeh-Shabdiz et al. |
| 8,185,129 B2 | 5/2012 | Alizadeh-Shabdiz |
| 8,223,074 B2 | 7/2012 | Alizadeh-Shabdiz |
| 8,229,455 B2 | 7/2012 | Alizadeh-Shabdiz |
| 8,242,960 B2 | 8/2012 | Alizadeh-Shabdiz |
| 8,244,272 B2 | 8/2012 | Morgan et al. |
| 8,279,114 B2 | 10/2012 | Alizadeh-Shabdiz et al. |
| 8,284,103 B2 | 10/2012 | Alizadeh-Shabdiz |
| 8,300,603 B2 | 10/2012 | Chowdhury et al. |
| 8,314,704 B2 | 11/2012 | Cova et al. |
| 8,315,233 B2 | 11/2012 | Alizadeh-Shabdiz |
| 8,315,598 B2 | 11/2012 | Price |
| 8,369,264 B2 | 2/2013 | Brachet et al. |
| 8,374,630 B2 | 2/2013 | Duxbury et al. |
| 8,406,785 B2 | 3/2013 | Alizadeh-Shabdiz et al. |
| 8,433,334 B2 | 4/2013 | Huang et al. |
| 8,447,332 B2 | 5/2013 | Weinreich et al. |
| 8,462,745 B2 | 6/2013 | Alizadeh-Shabdiz |
| 8,478,297 B2 | 7/2013 | Morgan et al. |
| 8,526,967 B2 | 9/2013 | Alizadeh-Shabdiz et al. |
| 8,538,457 B2 | 9/2013 | Morgan et al. |
| 8,559,974 B2 | 10/2013 | Alizadeh-Shabdiz et al. |
| 8,564,481 B2 | 10/2013 | Alizadeh-Shabdiz |
| 8,570,373 B2 | 10/2013 | Variyath et al. |
| 8,577,392 B1 | 11/2013 | Pai et al. |
| 8,594,703 B2 | 11/2013 | Price et al. |
| 8,606,294 B2 | 12/2013 | Alizadeh-Shabdiz |
| 8,619,643 B2 | 12/2013 | Alizadeh-Shabdiz et al. |
| 8,630,657 B2 | 1/2014 | Alizadeh-Shabdiz et al. |
| 8,630,664 B2 | 1/2014 | Alizadeh-Shabdiz et al. |
| 8,638,256 B2 | 1/2014 | Alizadeh-Shabdiz et al. |
| 8,638,725 B2 | 1/2014 | Alizadeh-Shabdiz |
| 8,644,852 B2 | 2/2014 | Jones et al. |
| 8,669,902 B2 | 3/2014 | Pandey et al. |
| 8,700,053 B2 | 4/2014 | Alizadeh-Shabdiz et al. |
| 8,700,060 B2 | 4/2014 | Huang |
| 8,706,140 B2 | 4/2014 | Alizadeh-Shabdiz |
| 8,837,363 B2 | 9/2014 | Jones et al. |
| 8,890,746 B2 | 11/2014 | Alizadeh-Shabdiz et al. |
| 8,909,245 B2 | 12/2014 | Alizadeh-Shabdiz et al. |
| 8,965,412 B2 | 2/2015 | Alizadeh-Shabdiz et al. |
| 8,971,915 B2 | 3/2015 | Alizadeh-Shabdiz et al. |
| 8,971,923 B2 | 3/2015 | Alizadeh-Shabdiz et al. |
| 8,983,493 B2 | 3/2015 | Brachet et al. |
| 8,983,504 B2 | 3/2015 | Alizadeh-Shabdiz et al. |
| 8,989,773 B2 | 3/2015 | Sandel et al. |
| 8,996,032 B2 | 3/2015 | Alizadeh-Shabdiz et al. |
| 9,001,743 B2 | 4/2015 | Alizadeh-Shabdiz |
| 9,008,690 B2 | 4/2015 | Alizadeh-Shabdiz et al. |
| 9,008,700 B2 | 4/2015 | Mukkavilli et al. |
| 9,013,350 B2 | 4/2015 | Alizadeh-Shabdiz |
| 9,014,715 B2 | 4/2015 | Alizadeh-Shabdiz et al. |
| 9,031,580 B2 | 5/2015 | Alizadeh-Shabdiz |
| 9,037,160 B2 | 5/2015 | Jones et al. |
| 9,037,162 B2 | 5/2015 | Morgan et al. |
| 9,052,378 B2 | 6/2015 | Alizadeh-Shabdiz et al. |
| 9,055,395 B2 | 6/2015 | Hart et al. |
| 9,103,900 B2 | 8/2015 | Alizadeh-Shabdiz |
| RE45,808 E | 11/2015 | Sheynblat et al. |
| 9,237,415 B2 | 1/2016 | Alizadeh-Shabdiz et al. |
| 9,250,085 B2 | 2/2016 | Hwang et al. |
| 9,253,605 B2 | 2/2016 | Alizadeh-Shabdiz et al. |
| 9,277,369 B2 | 3/2016 | Lindskog et al. |

(56) References Cited

U.S. PATENT DOCUMENTS

| | | |
|---|---|---|
| 9,279,114 B2 | 3/2016 | Lassen et al. |
| 9,279,877 B2 | 3/2016 | Alizadeh-Shabdiz |
| 9,298,897 B2 | 3/2016 | Broadstone et al. |
| 9,363,785 B2 | 6/2016 | Alizadeh-Shabdiz et al. |
| 9,369,845 B2 | 6/2016 | Alizadeh-Shabdiz et al. |
| 9,369,884 B2 | 6/2016 | Jones et al. |
| 9,392,407 B2 | 7/2016 | Brachet et al. |
| 9,398,558 B2 | 7/2016 | Morgan et al. |
| 9,408,031 B1 | 8/2016 | Steger et al. |
| 9,408,037 B1 | 8/2016 | Alizadeh-Shabdiz et al. |
| 9,426,613 B2 | 8/2016 | Alizadeh-Shabdiz et al. |
| 9,445,239 B2 | 9/2016 | Reddy |
| 9,467,807 B2 | 10/2016 | Alizadeh-Shabdiz |
| 9,497,596 B2 | 11/2016 | Cho et al. |
| 9,516,471 B2 | 12/2016 | Alizadeh-Shabdiz et al. |
| 9,521,512 B2 | 12/2016 | Alizadeh-Shabdiz et al. |
| 9,554,247 B2 | 1/2017 | Jones et al. |
| 9,565,523 B1 | 2/2017 | Steger et al. |
| 9,572,026 B2 | 2/2017 | Hart et al. |
| 9,612,315 B2 | 4/2017 | Sutton et al. |
| 9,639,557 B2 | 5/2017 | Arslan et al. |
| 9,658,315 B2 | 5/2017 | Pandey et al. |
| 9,693,194 B2 | 6/2017 | Pandey et al. |
| 9,726,752 B2 | 8/2017 | Attar et al. |
| 9,817,101 B2 | 11/2017 | Jones et al. |
| 9,832,633 B2 | 11/2017 | Gerber, Jr. et al. |
| 9,915,721 B2 | 3/2018 | Alizadeh-Shabdiz |
| 9,918,295 B2 | 3/2018 | Jones et al. |
| 9,924,311 B2 | 3/2018 | Steger et al. |
| 9,936,348 B2 | 4/2018 | Alizadeh-Shabdiz et al. |
| 9,936,442 B1 | 4/2018 | Noonan et al. |
| 9,955,358 B2 | 4/2018 | Alizadeh-Shabdiz et al. |
| 10,021,554 B2 | 7/2018 | Abraham et al. |
| 10,031,237 B2 | 7/2018 | Alizadeh-Shabdiz |
| 10,034,265 B2 | 7/2018 | Alizadeh-Shabdiz et al. |
| 10,080,208 B2 | 9/2018 | Morgan et al. |
| 10,082,558 B2 | 9/2018 | Tee et al. |
| 10,098,085 B1 | 10/2018 | Overcash |
| 10,104,503 B2 | 10/2018 | Pandey et al. |
| 10,111,069 B1 | 10/2018 | Dawson-Haggerty et al. |
| 10,114,123 B2 | 10/2018 | Alizadeh-Shabdiz et al. |
| 10,217,078 B1 | 2/2019 | Klein |
| 10,284,997 B2 | 5/2019 | Alizadeh-Shabdiz et al. |
| 10,304,086 B2 | 5/2019 | Broadstone et al. |
| 10,305,854 B2 | 5/2019 | Alizadeh-Shabdiz et al. |
| 10,317,507 B2 | 6/2019 | Alizadeh-Shabdiz |
| 10,361,994 B2 | 7/2019 | Alizadeh-Shabdiz et al. |
| 10,390,173 B2 | 8/2019 | Alizadeh-Shabdiz et al. |
| 10,448,210 B2 | 10/2019 | Pandey et al. |
| 10,459,593 B2 | 10/2019 | Tiwari et al. |
| 10,491,563 B2 | 11/2019 | Alizadeh-Shabdiz et al. |
| 10,536,428 B2 | 1/2020 | Alizadeh-Shabdiz et al. |
| 10,572,700 B2 | 2/2020 | Sengstaken, Jr. |
| 10,594,650 B2 | 3/2020 | Alizadeh-Shabdiz et al. |
| 10,681,511 B1 | 6/2020 | Alizadeh-Shabdiz et al. |
| 10,698,073 B2 | 6/2020 | Smith et al. |
| 10,708,366 B2 | 7/2020 | Douglas et al. |
| 10,715,961 B2 | 7/2020 | Stern et al. |
| 10,721,708 B1 | 7/2020 | Mukherji et al. |
| 10,728,709 B1 | 7/2020 | Catalena |
| 10,783,419 B2 | 9/2020 | Singh |
| 10,791,419 B2 | 9/2020 | Santo et al. |
| 10,798,525 B2 | 10/2020 | Houri |
| 10,841,749 B1 | 11/2020 | Catalena |
| 10,848,934 B1 | 11/2020 | Catalena |
| 10,848,935 B1 | 11/2020 | Catalena |
| 2002/0098852 A1 | 7/2002 | Goren et al. |
| 2003/0210142 A1 | 11/2003 | Freathy et al. |
| 2006/0009240 A1 | 1/2006 | Katz |
| 2006/0046709 A1 | 3/2006 | Krumm et al. |
| 2009/0146832 A1 | 6/2009 | Ebert et al. |
| 2010/0076902 A1 | 3/2010 | Kraft |
| 2010/0090822 A1 | 4/2010 | Benson et al. |
| 2010/0102964 A1 | 4/2010 | Steer |
| 2010/0141445 A1 | 6/2010 | Venkatasubramaniyam et al. |
| 2010/0321181 A1 | 12/2010 | Broadbent |
| 2011/0012731 A1 | 1/2011 | Stevens |
| 2011/0051665 A1 | 3/2011 | Huang |
| 2011/0133888 A1 | 6/2011 | Stevens et al. |
| 2012/0126974 A1 | 5/2012 | Phillips et al. |
| 2013/0214909 A1 | 8/2013 | Meijers et al. |
| 2014/0204926 A1 | 7/2014 | Ota et al. |
| 2014/0378163 A1 | 12/2014 | Dicke et al. |
| 2015/0180816 A1 | 6/2015 | Varoglu et al. |
| 2015/0208454 A1 | 7/2015 | Cho et al. |
| 2015/0223082 A1 | 8/2015 | Negus et al. |
| 2015/0312404 A1 | 10/2015 | Abramson et al. |
| 2016/0066155 A1 | 3/2016 | Fan et al. |
| 2016/0307154 A1 | 10/2016 | Moore et al. |
| 2017/0118530 A1 | 4/2017 | Amano et al. |
| 2017/0219676 A1 | 8/2017 | Tran et al. |
| 2017/0238136 A1 | 8/2017 | Smith |
| 2017/0337522 A1 | 11/2017 | Bennett |
| 2018/0018618 A1 | 1/2018 | Groseclose |
| 2018/0069650 A1 | 3/2018 | Tran et al. |
| 2018/0295519 A1 | 10/2018 | Premnath et al. |
| 2018/0322376 A1 | 11/2018 | Henry et al. |
| 2019/0050806 A1 | 2/2019 | Klein |
| 2019/0174289 A1 | 6/2019 | Martin et al. |
| 2019/0182627 A1 | 6/2019 | Thoresen et al. |
| 2019/0313246 A1* | 10/2019 | Nix ................ H04W 80/10 |
| 2019/0362108 A1* | 11/2019 | Haggag ............. H04W 4/70 |
| 2020/0049837 A1 | 2/2020 | Werner et al. |
| 2020/0337162 A1 | 10/2020 | Perkins et al. |
| 2021/0060686 A1 | 3/2021 | Rappl et al. |
| 2021/0084449 A1 | 3/2021 | Catalena |
| 2021/0084450 A1 | 3/2021 | Catalena |

FOREIGN PATENT DOCUMENTS

| | | |
|---|---|---|
| CN | 105050055 A | 11/2015 |
| CN | 114424591 B | 4/2022 |
| HK | 40063887 | 6/2023 |
| TW | 201918103 A | 5/2019 |
| WO | 2011008884 A1 | 1/2011 |
| WO | 2011022412 A1 | 2/2011 |
| WO | 2011025821 A1 | 3/2011 |
| WO | 2011025987 A1 | 3/2011 |
| WO | 2021050209 A1 | 3/2021 |
| WO | 2021050210 A1 | 3/2021 |
| WO | 2021050211 A1 | 3/2021 |
| WO | 2021183445 A1 | 9/2021 |
| WO | 2021183447 A1 | 9/2021 |
| WO | 2021183449 A1 | 9/2021 |

OTHER PUBLICATIONS

EPO Supplemental European Search Report issued in EP 20862613.5, filed on Jul. 31, 2023, dated Aug. 9, 2023.

EPO supplementary European search report issued in EPO application EP20862665.5, filed on Mar. 9, 2022, dated Sep. 8, 2023.

USPTO Notice of Allowance issued in U.S. Appl. No. 17/102,151, filed Nov. 23, 2020, dated Nov. 8, 2023.

U.S. Appl. No. 16/812,471, filed Mar. 9, 2020, Cody Catalena, Entire Document.

U.S. Appl. No. 16/812,612, filed Mar. 9, 2020, Cody Catalena, Entire Document.

U.S. Appl. No. 16/907,806, filed Jun. 22, 2020, Cody Catalena, Entire Document.

U.S. Appl. No. 17/099,749, filed Nov. 16, 2020, Cody Catalena, Entire Document.

U.S. Appl. No. 17/102,151, filed Nov. 23, 2020, Cody Catalena, Entire Document.

U.S. Appl. No. 17/102,429, filed Nov. 23, 2020, Cody Catalena, Entire Document.

Applicant reply to USPTO non-final office action issued in U.S. Appl. No. 16/570,195, filed Sep. 13, 2019, reply submitted on Jan. 27, 2020.

Applicant reply to USPTO non-final office action issued in U.S. Appl. No. 16/812,612, filed Sep. 13, 2019, reply submitted on Jul. 7, 2020.

(56) References Cited

OTHER PUBLICATIONS

Applicant reply to USPTO non-final office action issued in U.S. Appl. No. 17/099,749, filed Nov. 16, 2020, reply submitted on Dec. 6, 2022.
Applicant reply to USPTO non-final Office Action issued in U.S. Appl. No. 17/102,151, filed Nov. 23, 2020, submitted on Jan. 19, 2023.
Applicant reply to USPTO non-final office action issued in U.S. Appl. No. 17/102,429, filed Nov. 23, 2020, reply submitted on Dec. 6, 2022.
Applicant reply to USPTO non-final office action issued in U.S. Appl. No. 16/812,471, filed Mar. 9, 2020, reply submitted on Jul. 13, 2020.
China National Intellectual Property Administration office action issued in Chinese patent application 202080063842.5, dated Jul. 13, 2022.
China National Intellectual Property Administration office action issued in Chinese patent application 202080063842.5, dated Jan. 12, 2023.
China National Intellectual Property Administration office action issued in Chinese patent application 202080063876.4 dated Jan. 18, 2023.
China National Intellectual Property Administration office action issued in Chinese patent application 202080063876.4 dated Jul. 20, 2022.
China National Intellectual Property Administration office action issued in Chinese patent application 202080063959.3, dated Aug. 1, 2022.
PCT International Search Report of the International Search Authority (USPTO) for PCT/US2020/046657, international filing date Aug. 17, 2020, dated Sep. 14, 2020.
PCT International Search Report of the International Search Authority (USPTO) for PCT/US2020/046662, filed Aug. 17, 2020, dated Sep. 29, 2020.
PCT International Search Report of the International Search Authority (USPTO) for PCT/US2020/046667, filed Aug. 17, 2020, dated Nov. 18, 2020.
PCT International Search Report of the International Search Authority (USPTO) for PCT/US2021/021384, filed on Mar. 8, 2021, dated May 27, 2021.
PCT International Search Report of the International Search Authority (USPTO) for PCT/US2021/021387, filed on Mar. 8, 2021, dated Jun. 3, 2021.
PCT International Search Report of the International Search Authority (USPTO) for PCT/US2021/021391, filed on Mar. 8, 2021, dated Jun. 3, 2021.
PCT Written Opinion on Patentability by International Search Authority (USPTO) for PCT/US2020/046657, international filing date Aug. 17, 2020, dated Sep. 14, 2020.
PCT Written Opinion on Patentability by International Search Authority (USPTO) for PCT/US2020/046662, filed Aug. 17, 2020, dated Sep. 29, 2020.
PCT Written Opinion on Patentability by International Search Authority (USPTO) for PCT/US2020/046667, filed Aug. 17, 2020, dated Nov. 18, 2020.
PCT Written Opinion on Patentability by International Search Authority (USPTO) for PCT/US2021/021384, filed on Mar. 8, 2021, dated May 27, 2021.
PCT Written Opinion on Patentability by International Search Authority (USPTO) for PCT/US2021/021387, filed on Mar. 8, 2021, dated Jun. 3, 2021.
PCT Written Opinion on Patentability by International Search Authority (USPTO) for PCT/US2021/021391, filed on Mar. 8, 2021, dated Jun. 3, 2021.
USPTO non-final office action issued in U.S. Appl. No. 16/570,195, filed Sep. 13, 2019, dated Nov. 21, 2019.
USPTO non-final office action issued in U.S. Appl. No. 16/812,471, filed Mar. 9, 2020, dated Apr. 13, 2020.
USPTO non-final office action issued in U.S. Appl. No. 16/812,612, filed Mar. 9, 2020, dated Apr. 8, 2020.
USPTO non-final office action issued in U.S. Appl. No. 17/099,749, filed Nov. 16, 2020, dated Jul. 22, 2022.
USPTO non-final office action issued in U.S. Appl. No. 17/102,151, filed Nov. 23, 2020, dated Sep. 19, 2022.
USPTO non-final office action issued in U.S. Appl. No. 17/102,429, filed Nov. 23, 2020, dated Jul. 7, 2022.
USPTO Notice of Allowance issued in U.S. Appl. No. 16/570,195, filed Sep. 13, 2019, dated Apr. 30, 2020.
USPTO Notice of Allowance issued in U.S. Appl. No. 16/812,471, filed Mar. 9, 2020, dated Sep. 10, 2020.
USPTO Notice of Allowance issued in U.S. Appl. No. 16/812,612, filed Mar. 9, 2020, dated Sep. 9, 2020.
USPTO Notice of Allowance issued in U.S. Appl. No. 16/907,806, filed Jun. 22, 2020, dated Jul. 24, 2020.
USPTO Notice of Allowance issued in U.S. Appl. No. 17/099,749, filed Nov. 16, 2020, dated Feb. 9, 2023.
USPTO Notice of Allowance issued in U.S. Appl. No. 17/102,429, filed Nov. 23, 2020, dated Jan. 9, 2023.

* cited by examiner

| Subtype Bits | Subtype Description |
|---|---|
| 0000 | Association Request |
| 0001 | Association Response |
| 0010 | Reassociation Request |
| 0011 | Reassociation Response |
| 0100 | Probe Request |
| *0101* | *Probe Response* |
| 0110 | Timing Advertisement |
| 0111 | Reserved |
| *1000* | *Beacon* |
| 1001 | Announcement Traffic Indication Message (ATIM) |
| 1010 | Dissociation |
| 1011 | Authentication |
| 1100 | De-authentication |
| 1101 | Action |
| 1110 | Action No Ack (NACK) |
| 1111 | Reserved |

| Time | Date | GPS LAT | GPS LNG | SSID | BSSID | Signal Strength |
|------|------|---------|---------|------|-------|-----------------|
| 2:02 | 1-Sep | 30.613181 N | 96.339878 W | Asset1 | BSSID1 | 25% |
| 2:05 | 1-Sep | 30.621315 N | 96.335597 W | BULB OUT | BSSID1 | 75% |
| 3:04 | 1-Sep | 30.621315 N | 96.337564 W | Asset1 | BSSID1 | 95% |
| 4:23 | 1-Sep | 30.519234 N | 96.299430 W | Asset2 | BSSID2 | 56% |
| 9:59 | 2-Sep | 30.595311 N | 96.284302 W | Asset3 | BSSID3 | 45% |

| Time | Date | GPS LAT | GPS LNG | SSID | Asset BSSID | Signal Strength | AP LK LAT | AP LK LNG | AP CUR LAT | AP CUR LNG |
|------|------|---------|---------|------|-------------|-----------------|-----------|-----------|------------|------------|
| 2:02 | 1-Sep | 30.613181N | 96.339878W | Asset1 | BSSID1 | 25% | 30.624754 | 96.548265 | 30.620123 | 96.338854 |
| 2:05 | 1-Sep | 30.621315N | 96.335597W | BULB OUT | BSSID1 | 75% | 30.624754 | 96.317456 | 30.620950 | 96.337554 |
| 3:04 | 1-Sep | 30.621315N | 96.337564W | Asset1 | BSSID1 | 95% | 30.629432 | 96.310222 | 30.621310 | 96.337421 |
| 4:23 | 1-Sep | 30.519234N | 96.299430W | Asset2 | BSSID2 | 56% | 30.519234 | 96.312430 | 30.519234 | 96.299430 |
| 9:59 | 2-Sep | 30.595311N | 96.284302W | Asset3 | BSSID3 | 45% | 30.602451 | 96.284302 | 30.595311 | 96.284302 |

| Time | Date | GPS LAT | GPS LNG | SSID | BSSID | Signal Strength |
|---|---|---|---|---|---|---|
| 2:02 | 1-Sep | 30.613181 N | 96.339878 W | Asset1 | BSSID1 | 25% |
| 2:05 | 1-Sep | 30.621315 N | 96.335597 W | Asset1 | BSSID1 | 75% |
| 3:04 | 1-Sep | 30.621315 N | 96.337564 W | Asset1 | BSSID1 | 95% |
| 4:23 | 1-Sep | 30.519234 N | 96.299430 W | Asset2 | BSSID2 | 56% |
| 9:59 | 2-Sep | 30.595311 N | 96.284302 W | Asset3 | BSSID3 | 45% |

| Time | Date | GPS LAT | GPS LNG | SSID | Asset BSSID | Signal Strength | AP LK LAT | AP LK LNG | AP CUR LAT | AP CUR LNG |
|---|---|---|---|---|---|---|---|---|---|---|
| 2:02 | 1-Sep | 30.613181N | 96.339878W | Asset1 | BSSID1 | 25% | 30.624754 | 96.548265 | 30.620123 | 96.338854 |
| 2:05 | 1-Sep | 30.621315N | 96.335597W | Asset1 | BSSID1 | 75% | 30.624754 | 96.317456 | 30.620950 | 96.337554 |
| 3:04 | 1-Sep | 30.621315N | 96.337564W | Asset1 | BSSID1 | 95% | 30.629432 | 96.310222 | 30.621310 | 96.337421 |
| 4:23 | 1-Sep | 30.519234N | 96.299430W | Asset2 | BSSID2 | 56% | 30.519234 | 96.312430 | 30.519234 | 96.299430 |
| 9:59 | 2-Sep | 30.595311N | 96.284302W | Asset3 | BSSID3 | 45% | 30.602451 | 96.284302 | 30.595311 | 96.284302 |

FIG. 10C

PASSIVE SENSOR TRACKING USING OBSERVATIONS OF Wi-Fi ACCESS POINTS

CROSS-REFERENCE TO RELATED APPLICATIONS

This application is a continuation of Ser. No. 17/102,429, filed on Nov. 23, 2020, which is a continuation-in-part of U.S. patent application Ser. No. 16/812,471, filed on Mar. 9, 2020, and issued as U.S. Pat. No. 10,848,934, on Nov. 24, 2020, which is a continuation-in-part of U.S. patent application Ser. No. 16/570,195, filed on Sep. 13, 2019, and issued as U.S. Pat. No. 10,728,709, on Jul. 28, 2020.

This application is a continuation-in-part of U.S. patent application Ser. No. 16/812,612, filed on Mar. 9, 2020, and issued as U.S. Pat. No. 10,848,935, on Nov. 24, 2020, which is a continuation-in-part of U.S. patent application Ser. No. 16/570,195, filed on Sep. 13, 2019, and issued as U.S. Pat. No. 10,728,709, on Jul. 28, 2020.

This application is a continuation-in-part of U.S. patent application Ser. No. 17/099,749, filed Nov. 16, 2020, which is a continuation-in-part of U.S. patent application Ser. No. 16/907,806, filed on Jun. 22, 2020, and issued as U.S. Pat. No. 10,841,749, on Nov. 17, 2020, which is a continuation of U.S. patent application Ser. No. 16/570,195, filed on Sep. 13, 2019, and issued as U.S. Pat. No. 10,728,709, on Jul. 28, 2020.

All of the above-referenced patent applications are hereby incorporated by reference in their entirety.

BACKGROUND OF THE INVENTION

Wireless networking refers to the wireless exchange of information between network nodes with electromagnetic signaling. Standards setting organizations, such as the Institute of Electrical and Electronics Engineers ("IEEE"), coordinate, develop, promulgate, and maintain technical standards that facilitate implementation of wireless network standards that ensure compatibility between competing original equipment manufacturers and thereby seek to achieve widespread adoption of their respective technologies. The ubiquitous IEEE 802.11 standard specifies a Wireless Local Area Network ("WLAN") technology, commonly referred to as Wi-Fi, that facilitates wireless communication between devices and often serves as a bridge to a network carrying Internet Protocol traffic. Wi-Fi typically operates at either the 2.4 GHz or 5 GHz frequency bands in the radio portion of the electromagnetic spectrum.

In its first iterations, the IEEE 802.11a/b standards specified transfer rates of up to 11 Mbps at a range of up to 150 feet. The IEEE 802.11g amendment implemented various improvements, including Orthogonal Frequency Division Multiplexing ("OFDM"), to increase transfer rates to up to 54 Mbps while maintaining backward compatibility with IEEE 802.11b. The IEEE 802.11n amendment added Multiple Input Multiple Output ("MIMO") functionality where multiple transmitters and receivers operate simultaneously at one or both ends of the link to facilitate transfer rates of up to 300 Mbps and even higher if additional antennae are used. The IEEE 802.11ac amendment added support for spatial streams and increased channel widths to substantially increase transfer rates from 433 Mbps to several Gbps and works exclusively in the less crowded 5 GHz frequency band and at a range of up to 300 feet or more.

The IEEE 802.11 standard remains an evolving technical standard and future amendments will likely seek to increase transfer rates, improve connectivity in challenging environments, and enhance security. As such, Wi-Fi remains the most widely adopted wireless networking standard in the world.

BRIEF SUMMARY OF THE INVENTION

According to one aspect of one or more embodiments of the present invention, a method of passive sensor tracking includes using a Wi-Fi access point that transmits a management frame comprising sensor data of a sensor as part of Wi-Fi wireless network discovery, associating unique identifying information of the Wi-Fi access point with the sensor in a sensor tracking database, receiving observation data of the Wi-Fi access point from a Wi-Fi AP Database, the observation data including the unique identifying information of the Wi-Fi access point and the sensor data of the sensor, and storing the sensor data in the sensor tracking database. The Wi-Fi AP Database receives one or more reports comprising observation data from one or more wireless devices that encounter the Wi-Fi access point.

According to one aspect of one or more embodiments of the present invention, a method of passive sensor tracking includes using a Wi-Fi access point that transmits a management frame including sensor data of a sensor as part of Wi-Fi wireless network discovery, associating unique identifying information of the Wi-Fi access point with the sensor in a sensor tracking database, receiving first observation data of the Wi-Fi access point from one or more direct reporting wireless devices that encounter the Wi-Fi access point, the first observation data including the unique identifying information of the Wi-Fi access point and first sensor data of the sensor, receiving second observation data of the Wi-Fi access point from a Wi-Fi AP Database, the second observation data including the unique identifying information of the Wi-Fi access point and second sensor data of the sensor, and storing first sensor data and second sensor data in the sensor tracking database. There is no communication between the sensor tracking database and one or more wireless devices that report their respective encounters with the Wi-Fi access point, including second observation data, to the Wi-Fi AP Database.

According to one aspect of one or more embodiments of the present invention, a method of passive sensor tracking includes using a Wi-Fi access point that transmits a management frame including sensor data of a sensor as part of Wi-Fi wireless network discovery, associating unique identifying information of the Wi-Fi access point with the sensor in a sensor tracking database, receiving observation data of the Wi-Fi access point from one or more wireless devices that encounter the Wi-Fi access point, the observation data including the unique identifying information of the Wi-Fi access point and sensor data of the sensor, and storing the sensor data of the sensor in the sensor tracking database.

Other aspects of the present invention will be apparent from the following description and claims.

BRIEF DESCRIPTION OF THE DRAWINGS

FIG. 3A shows the subtypes of IEEE 802.11 management frames.

FIG. 9C shows an example of observation data reported by a wireless device based on an encounter in accordance with one or more embodiments of the present invention.

FIG. 9D shows an example of sensor data stored or generated by a sensor tracking database in accordance with one or more embodiments of the present invention.

FIG. 10B shows an example of observation data of one or more Wi-Fi access points reported by a wireless device based on an encounter in accordance with one or more embodiments of the present invention.

FIG. 10C shows an example of sensor data stored or generated by a sensor and/or asset tracking database in accordance with one or more embodiments of the present invention.

DETAILED DESCRIPTION OF THE INVENTION

Figure 1:
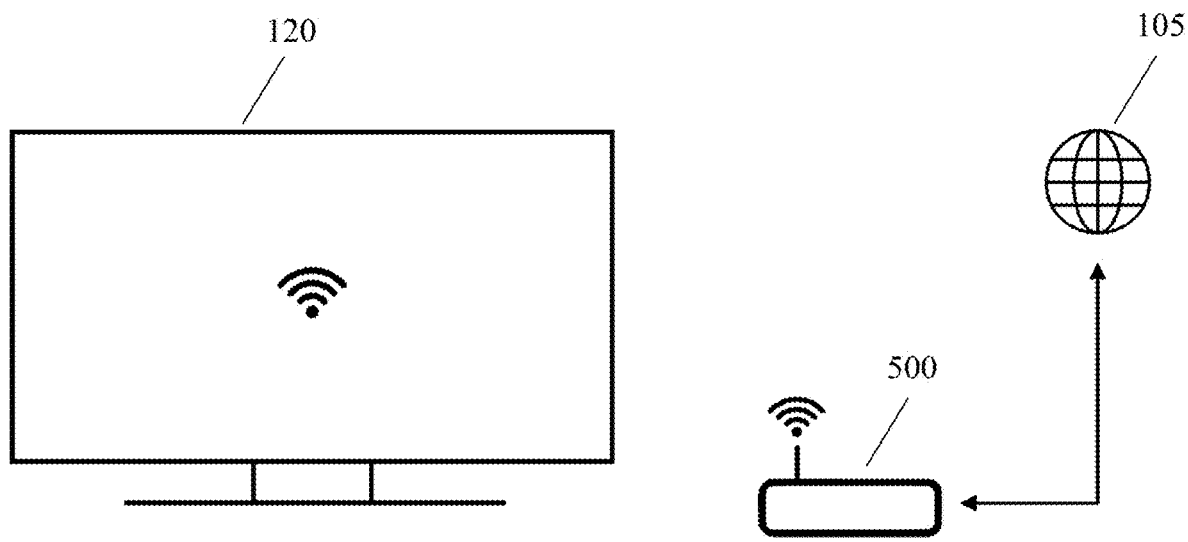
FIG. 1 shows a conventional Wi-Fi wireless network.
Figure 1:
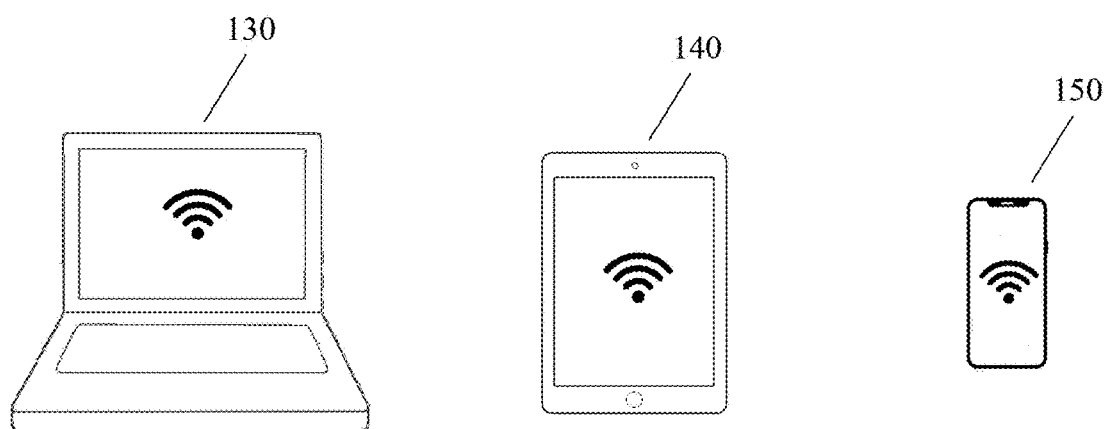

One or more embodiments of the present invention are described in detail with reference to the accompanying figures. For consistency, like elements in the various figures are denoted by like reference numerals. In the following detailed description of the present invention, specific details are described in order to provide a thorough understanding of the present invention. In other instances, aspects that are well-known to one of ordinary skill in the art are not described to avoid obscuring the description of the present invention.

Conventional asset tracking systems use dedicated and complicated hardware and software systems to track physical assets, typically within the confines of a fixed location (e.g., within a warehouse) or from portal-to-portal of one or more fixed locations (e.g., tracking departures from a warehouse and arrivals at a distributor). Some asset tracking systems use simple printed asset tracking tags configured to be optically read by a reading device, such as, for example, a barcode reader or Quick Response ("QR") reader. Other asset tracking systems use asset tracking tags configured to be read by short-range communication devices in the immediate vicinity of the tag using, for example, Near-Field Communication ("NFC"), Bluetooth Low Energy ("BLE"), Radio-Frequency Identification ("RFID"), or other short-range communication technologies. Still other asset tracking systems use asset tracking tags configured to be read at a distance using Long Range ("LoRa") networks or cellular communications. In some cases, the asset tracking system uses asset tracking tags capable of determining their own location using the Global Positioning System ("GPS") and directly reporting their own location to the asset tracking system over a communication network. However, such systems require substantial power, unobstructed access to satellite signals, and communications capabilities to self-report their location.

These conventional asset tracking systems may be referred to as closed-network systems because dedicated hardware and software systems are purposefully deployed and engaged in the asset tracking task. The asset tags must be directly read by a reader or short-range communication device in the immediate vicinity of the tag or the asset tag must be capable of determining its own location and directly reporting its own location to the asset tracking system. Thus, an inherent limitation in conventional closed-network asset tracking systems is the requirement that the tagging, tracking, hardware, and software systems must be intentionally deployed, span the zone of coverage, and purposefully perform and manage the asset tracking task. This requires extensive investment in expensive hardware and software systems and in hiring and training personnel on its usage. Moreover, in a widespread deployment of assets across many sites, perhaps even around the world, it is exceptionally difficult, if even possible, and cost prohibitive to deploy and manage a conventional closed network asset tracking system.

Accordingly, in one or more embodiments of the present invention, a method and system of passive sensor tracking uses observations of one or more Wi-Fi access points to passively track one or more sensors and associated sensor data. A Wi-Fi access point may be used that transmits a management frame including sensor data of a sensor as part of Wi-Fi wireless network discovery. The Wi-Fi access point and/or associated sensor may be disposed on, attached to, or integrated with an asset or placed in a location where sensing is desired. In contrast to closed-network tracking systems, the sensor is passively tracked only when the Wi-Fi access point, that is logically associated with the sensor in the sensor and/or asset tracking database, is encountered by a Wi-Fi enabled wireless device, without requiring an awareness on the part of the user of the wireless device that he or she is participating in the sensor tracking task. In certain embodiments, when one or more wireless devices come into Wi-Fi signaling range of a Wi-Fi access point associated with a sensor, a wireless device reports its encounter with the Wi-Fi access point to a Wi-Fi AP Database, the content of the report and the purpose of the report is typically used to improve location services. The report includes observation data including at least unique identifying information of the Wi-Fi access point encountered and sensor data of the sensor embedded in the management frame transmitted as part of Wi-Fi wireless network discovery. In other embodiments, the sensor and/or asset tracking database may receive observation data directly from one or more direct reporting wireless devices that encounter the Wi-Fi access point and indirectly from a Wi-Fi AP Database that receives observation data from one or more indirect reporting wireless devices that encounter the Wi-Fi access point and report observation data to the Wi-Fi AP Database. In still other embodiments, the sensor and/or tracking database may receive observation data directly from one or more direct reporting wireless devices that encounter the Wi-Fi access point and report the observation data to the sensor and/or tracking databases. The sensor data may be stored in the sensor and/or asset tracking database. In certain embodiments, the sensor and/or asset tracking database may also determine a location of the sensor based, at least in part, on observation data of the associated Wi-Fi access point. The observation data may further include location information of the Wi-Fi access point. In this way, a sensor may be deployed anywhere in the world with a Wi-Fi access point that is not required to associate with any wireless device or provide any network connectivity of any kind. Every smartphone in the world that merely happens to come into Wi-Fi signaling range of the Wi-Fi access point, even if only temporarily, may anonymously and without awareness participate in the sensor tracking task by reporting observation data of the Wi-Fi access point to the sensor and/or tracking database.

The method and system of passive sensor tracking is open-network because it leverages existing infrastructure inherent in smartphones and smartphone operating systems to report the unique identifying information of Wi-Fi access points they encounter as well as their location for improving the accuracy of location-based services. Advantageously, the Wi-Fi wireless network discovery protocol as well as the inherent Wi-Fi access point reporting feature of smartphones may be cooperatively used to passively track sensors associated with Wi-Fi access points, without requiring that the reporting wireless devices authenticate to, associate with, or establish connectivity with the Wi-Fi access point, using publicly accessibly Wi-Fi signals, and in passive scanning applications, completely anonymously with respect to the sensor tracking task. The sensors and associated Wi-Fi access points may be disposed with no inherent communication capabilities and in areas where there are no communication capabilities, relying on the self-reporting feature of one or more wireless devices that merely happen to encounter one or more Wi-Fi access points associated with one or more sensors. Thus, one or more sensors may be deployed and their sensor data may be reported and maintained in a sensor and/or asset tracking database in an open network that relies on one or more wireless devices that merely encounter associated Wi-Fi access points to report the sensor data.

FIG. 1 shows a conventional Wi-Fi wireless network 100. A Wi-Fi access point 500 facilitates wireless connectivity between one or more of the wireless devices and, in configurations that include an integrated router, may serve as the bridge between the wireless devices (e.g., 120, 130, 140, 150) and an upstream network connection, such as, for example, the Internet connection provided by broadband modem 105. In conventional use, a wireless connection may be established between one or more wireless devices (e.g., 120, 130, 140, 150), including, for example, television 120, computer 130, tablet computer 140, smartphone 150, or any other wireless device, and a conventional Wi-Fi access point 500, thereby allowing the wireless devices (e.g., 120, 130, 140, 150) to communicate with one another and/or access the Internet via broadband modem 105. Wi-Fi access points 500 are commonly found in homes, offices, and public places, where they are often referred to as Wi-Fi hotspots. While the number of Wi-Fi access points 500 has not been definitively counted, there are believed to be in excess of thirteen billion Wi-Fi access points (e.g., 500) deployed around the world. Efforts to map Wi-Fi signal coverage suggest that most modern cities are blanketed with publicly accessible Wi-Fi signals. Notwithstanding the above, one of ordinary skill in the art will recognize that a conventional Wi-Fi wireless network 100 does not require a broadband modem 105, Internet connectivity, or any upstream network connectivity and may be used as a purely wireless network to facilitate wireless communications between one or more wireless devices (e.g., 120, 130, 140, 150).

Figure 2A:
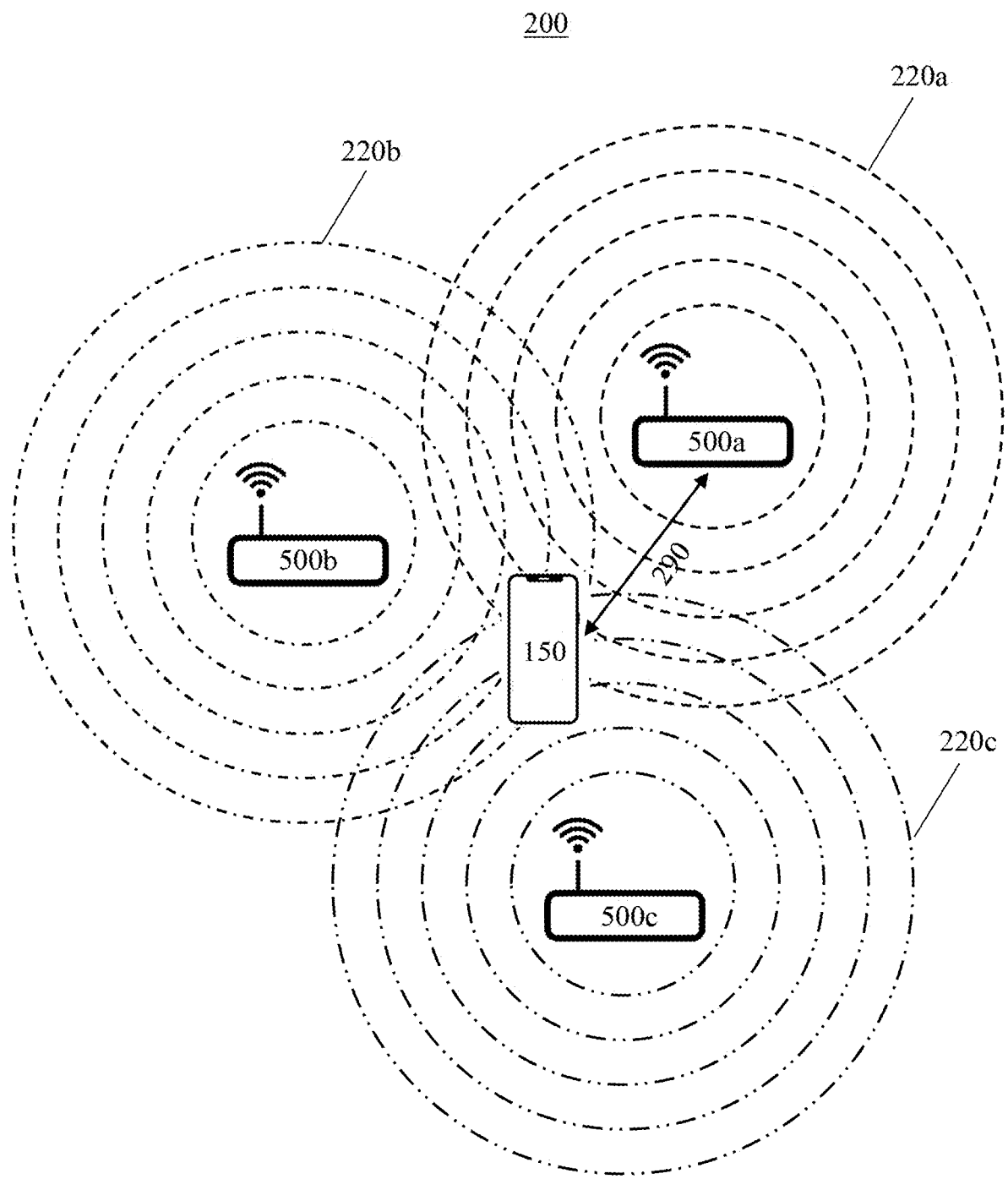
FIG. 2A shows a passive scanning mode as part of the IEEE 802.11 Wi-Fi wireless network discovery process.

FIG. 2A shows a passive scanning mode 200 as part of the IEEE 802.11 Wi-Fi wireless network discovery process. Wi-Fi wireless network discovery is the process by which a wireless device identifies a Wi-Fi wireless network and potentially authenticates to, associates with, and establishes data-exchanging connectivity with an in-range Wi-Fi access point (e.g., 500). In passive scanning mode, one or more wireless devices (e.g., 150) listen for beacon frames (e.g., 220a, 220b, 220c) broadcast at periodic intervals by one or more in-range Wi-Fi access points (e.g., 500a, 500b, 500c) to announce the presence of their respective Wi-Fi wireless networks. A beacon frame (e.g., 220a, 220b, 220c) is a type of Wi-Fi management frame that includes information regarding the broadcasting Wi-Fi access point (e.g., 500a, 500b, 500c) to facilitate potential authentication, association, and connectivity. Each beacon frame (e.g., 220) includes a Service Set Identifier ("SSID"), which is typically a user-given name for the broadcasting Wi-Fi wireless network, and information that uniquely identifies the Wi-Fi access point (e.g., 500a, 500b, 500c) including, but not limited to, a unique Basic Service Set Identifier ("BSSID") or Media Access Control ("MAC") address of the Wi-Fi access point (e.g., 500a, 500b, 500c) or a broadcasting band thereof. Multiple Wi-Fi access points (e.g., 500a, 500b, 500c) may share the same SSID as part of the same wireless network, but each Wi-Fi access point (e.g., 500a, 500b, 500c) will have unique identifying information including, for example, a unique BSSID. Moreover, dual, or multi-band, Wi-Fi access points (e.g., 500) that broadcast on multiple frequency bands, may have a unique BSSID for each frequency band that they broadcast on. Manufacturers are typically assigned blocks of BSSIDs from a governing authority that the manufacturer is allowed to use for the equipment they produce. As such, the BSSID of each and every Wi-Fi access point (e.g., 500), or band thereof, should truly be unique and distinguishable from all others.

In the example depicted in the figure, a wireless device 150 such as, for example, a smartphone, may be located, even if only temporarily, within the broadcast range of one or more Wi-Fi access points 500a, 500b, 500c. Each Wi-Fi access point 500a, 500b, 500c may periodically broadcast their respective beacon frames 220a, 220b, 220c announcing the presence of their respective Wi-Fi wireless networks. Wireless device 150 may listen to, and receive, beacon frames 220a, 220b, 220c from the in-range Wi-Fi access points 500a, 500b, 500c. In conventional applications, a user of wireless device 150 wishing to join a Wi-Fi wireless network may optionally select the SSID, sometimes referred to as the network name, of the Wi-Fi wireless network that they wish to join through the operating system of their device. Sometimes, the wireless device 150 may automatically connect to a previously joined Wi-Fi wireless network automatically based on a user preference. Once authenticated, associated, and connectivity is established, wireless device 150 may communicate 290 with Wi-Fi access point 500a, exchanging data and potentially accessing other networks such as, for example, an upstream Internet connection (e.g., 105 of FIG. 1) through the Wi-Fi access point 500a. It is important to note that, passive scanning 200 is completely anonymous with respect to wireless devices (e.g., 150) that receive beacon frames (e.g., 220a, 220b, 220c) of in-range Wi-Fi access points (e.g., 500a, 500b, 500c) until such time that they choose to authenticate to, and associate with, a particular Wi-Fi access point (e.g., 500a). Unless and until a user of a wireless device 150 selects a specific Wi-Fi access point (e.g., 500a) and Wi-Fi wireless network thereof to authenticate to, associate with, and establish data connectivity with, a wireless device (e.g., 150) may passively receive the Wi-Fi signals being publicly broadcast by in-range Wi-Fi access points (e.g., 500a, 500b, 500c) and any others that it may encounter while remaining completely anonymous. However, wireless devices (e.g., 150) record information relating to all the Wi-Fi access points (e.g., 500) they encounter, even if they do not join a wireless network, typically without awareness on the part of the user, which may be leveraged for the asset tracking task as discussed in more detail herein.

Figure 2B:
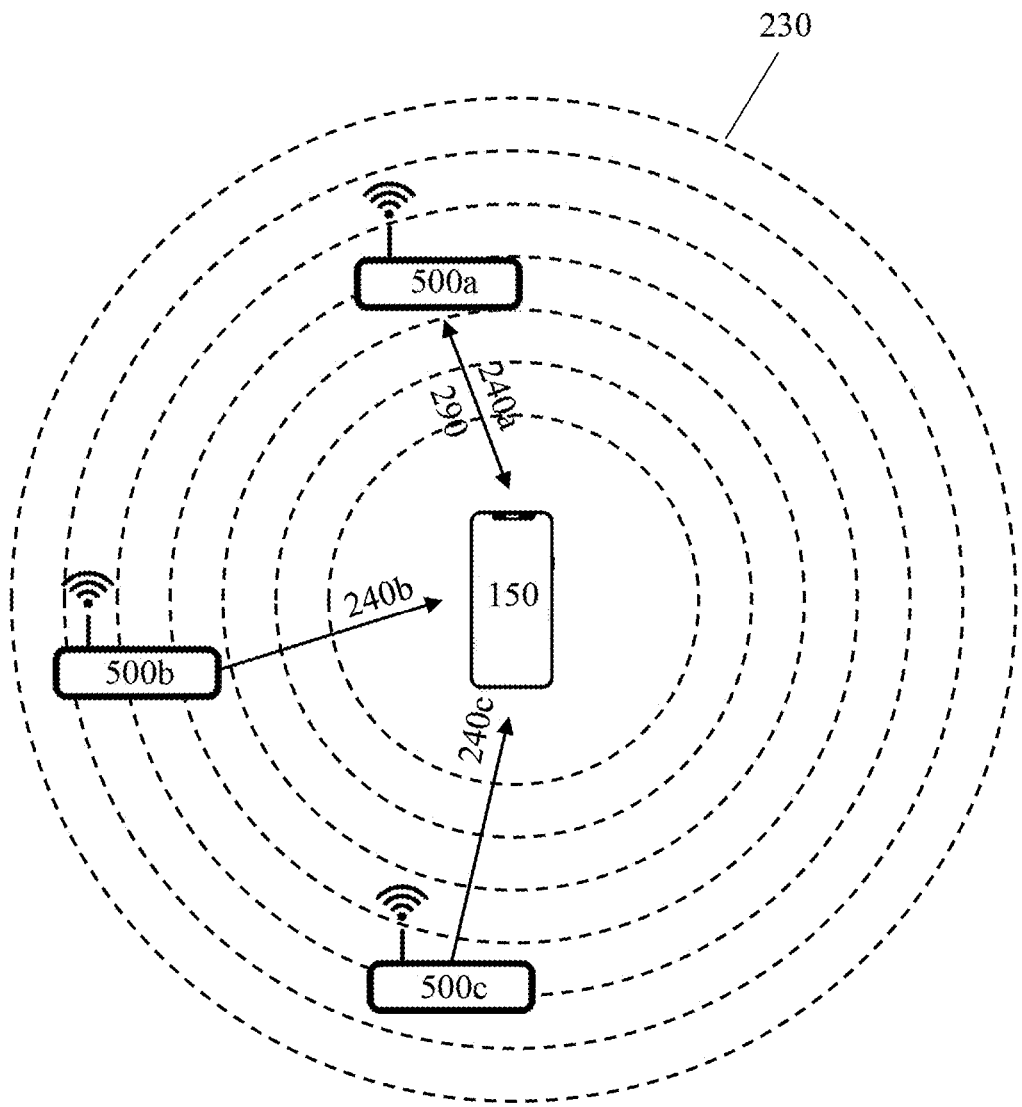
FIG. 2B shows an active scanning mode as part of the IEEE 802.11 Wi-Fi wireless network discovery process.

FIG. 2B shows active scanning mode 205 as part of IEEE 802.11 Wi-Fi wireless network discovery. In contrast to passive scanning mode (e.g., 200 of FIG. 2A), active scanning mode 205 is a type of Wi-Fi wireless network discovery process where a wireless device 150 broadcasts a probe request frame 230 to a specific (e.g., 500a) or all Wi-Fi access points (e.g., 500a, 500b, 500c) that are within Wi-Fi signaling range. A probe request frame 230 is a type of Wi-Fi management frame that may include information about the specific Wi-Fi access point (e.g., 500a) that the wireless device 150 wishes to associate with, sometimes referred to as a directed probe request, or may be a probe request for all available Wi-Fi access points (e.g., 500a, 500b, 500c) within Wi-Fi signaling range, sometimes referred to as a null probe request. Responding in-range Wi-Fi access points 500a, 500b, 500c transmit a probe response frame 240a, 240b, 240c that includes information substantially similar to a beacon frame (e.g., 220 of FIG. 2A) including their unique BSSID and respective SSID.

In contrast to passive scanning (e.g., 200 of FIG. 2A) where each Wi-Fi access point (e.g., 500) broadcasts its respective beacon frames (e.g., 220 of FIG. 2A) on a specific channel, in active scanning mode 205, wireless device 150 may broadcast probe request frames 230 across all available channels for the associated frequency band. In this way, wireless device 150 may, for example, select a Wi-Fi access point (e.g., 500a) that provides the strongest received signal strength and quality for the time being. However, even when a particular wireless device 150 is authenticated to, and associated with, a specific Wi-Fi access point (e.g., 500a), wireless device 150 may go off channel and continue to send probe request frames (e.g., 230) on other channels. By continuing to actively probe for Wi-Fi access points (e.g., 500a, 500b, 500c), wireless device 150 may maintain a list of known Wi-Fi access points (e.g., 500a, 500b, 500c) that may facilitate roaming should the wireless device 150 move out of range of the currently associated Wi-Fi access point (e.g., 500a) or require a better connection. In contrast to passive scanning mode (e.g., 200 of FIG. 2A), active scanning mode 205 only requires a wireless device 150 to send a probe request frame 230 on a specific channel within the designated frequency band and then listen for a comparatively smaller amount of time as compared to passive scanning (e.g., 200 of FIG. 2). As such, active scanning 205 presents a more direct and targeted approach to Wi-Fi wireless network discovery process as compared to the broadcast nature of passive scanning operations (e.g., 200 of FIG. 2A).

Figure 2C:
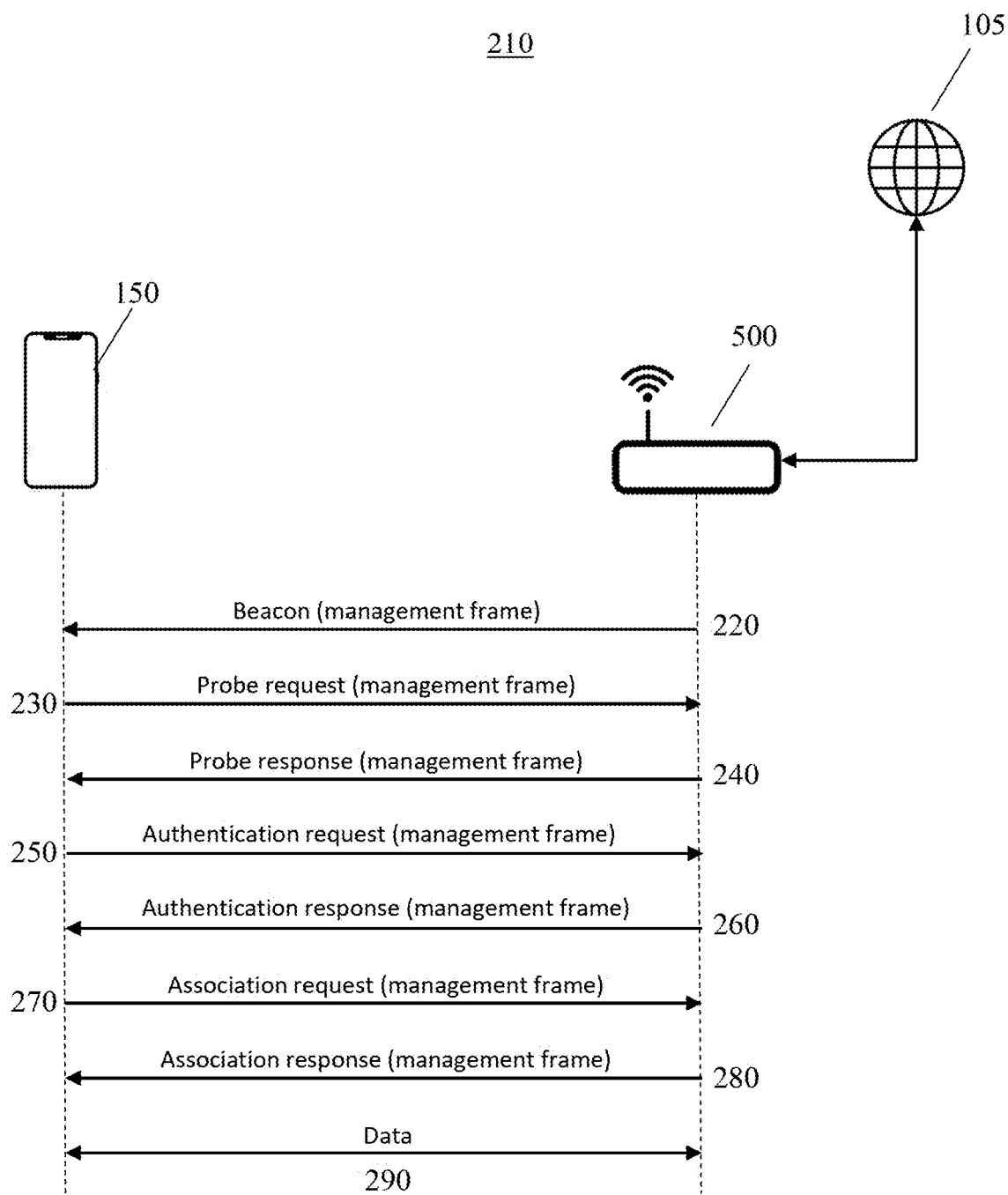
FIG. 2C shows a sequence of IEEE 802.11 management frames typically exchanged between a wireless device and a Wi-Fi access point as part of Wi-Fi wireless network discovery process.

FIG. 2C shows a sequence of IEEE 802.11 management frames 210 typically exchanged between a wireless device 150 and a Wi-Fi access point 500 as part of Wi-Fi wireless network discovery process. A wireless device 150 must successfully identify (e.g., 220, 230, 240), authenticate to (e.g., 250, 260), and associate with (e.g., 270, 280) a Wi-Fi access point 500 in order to transmit data frames (e.g., 290) containing data under the protocol. As previously discussed, Wi-Fi wireless network discovery refers to the process by which a wireless device 150 typically identifies a Wi-Fi wireless network, authenticates to (e.g., 250, 260), associates with (e.g., 270, 280), and established data connectivity (e.g., 290) with an in-range Wi-Fi access point 500 to enable data transfer with other devices and an upstream network connection, such as, for example, the Internet 105.

The IEEE 802.11 standard specifies three different types of frames: management frames, data frames, and control frames, each of which serves a specific purpose under the protocol. For example, management frames are used for supervisory functions including Wi-Fi wireless network discovery, data frames are used to transmit data once authenticated and associated, and control frames are used to control the transmission of data. As noted above, the IEEE 802.11 standard specifies two different scenarios by which a wireless device 150 may identify, authenticate to, associate with, and establish data connectivity with a Wi-Fi access point 500 as part of the Wi-Fi wireless network discovery process.

In passive scanning mode, a wireless device 150 listens for beacon frames 220, a type of management frame, that is broadcast at periodic intervals by in-range Wi-Fi access points 500. The beacon frame 220 announces the presence of the Wi-Fi wireless network and associated Wi-Fi access point 500 and includes information that facilitates potential authentication to, association with, and ultimately data transmission. The information includes, for example, the BSSID and the SSID of the broadcasting Wi-Fi access point 500. For example, the user of a wireless device 150, in this example a smartphone, may open a wireless application on their device, see a list of SSIDs corresponding to in-range Wi-Fi access points (e.g., 500) that are broadcasting their respective beacon frames (e.g., 220), and select a specific SSID of the Wi-Fi wireless network and associated Wi-Fi access point 500 they wish to join. When the user selects the SSID of a specific Wi-Fi access point 500, the wireless device 150 transmits a probe request frame 230, another type of management frame, to the particular Wi-Fi access point 500 that includes the capabilities of the wireless device 150. In the active scanning mode, without necessarily having received a beacon frame 220, the wireless device 150 may transmit a probe request frame 230 that includes the capabilities of the wireless device 150 to a specific Wi-Fi access point 500 or all Wi-Fi access points (e.g., 500) in range. As such, the Wi-Fi wireless network discovery process may be initiated by a Wi-Fi access point 500 that broadcasts beacon frames 220 or a wireless device 150 that transmits a probe request frame 230. Regardless of which, the remainder of the authentication and association protocol is substantially the same.

Subsequent to receipt of the probe request frame 230, if the Wi-Fi access point 500 has compatible parameters, the Wi-Fi access point 500 transmits a probe response frame 240, another type of management frame, to the wireless device 150. The probe response frame 240 includes the parameters typically included in the beacon frame 220 including unique identifying information and capabilities of the Wi-Fi access point 500. It is important to note that, at this stage of the process, the wireless device 150 is unauthenticated to, and unassociated with, the Wi-Fi access point 500, and is not capable of transmitting data in data frames 290 under the protocol. Subsequent to receipt of the probe response frame 240, the wireless device 150 transmits an authentication request frame 250, another type of management frame, to the Wi-Fi access point 500. The authentication protocol establishes whether the wireless device 150 is authenticated to the Wi-Fi access point 500, i.e., ensuring permission or access with respect to encryption (open or shared key encryption). Without discussing the details of the authentication protocol, which is unnecessary for the purpose of describing the claimed invention, it is important to note that a wireless device 150 typically cannot proceed to association and data transfer until it is has been successfully authenticated to the Wi-Fi access point 500, as signified by an authentication response frame 260, another type of management frame, acknowledging successful authentication.

Once authenticated to Wi-Fi access point 500, wireless device 150 transmits an association request frame 270, another type of management frame, to Wi-Fi access point 500. The association request frame 270 signifies a request by the authenticated, but as yet unassociated wireless device 150 to associate with the Wi-Fi access point 500 and enable data transfer via data frames 290. The association request 270 includes information including, for example, capabilities of the wireless device 150. After receipt of the association request 270, the Wi-Fi access point 500 compares the capabilities set out in the association request 270 with the capabilities of the Wi-Fi access point 500 to determine if they match. If there is a mismatch, the Wi-Fi access point 500 determines whether the differences are an issue that prevents association and data transfer. If the differences are not substantive, the Wi-Fi access point 500 transmits an association response 280, another type of management frame, acknowledging successful association. Once the association response 280, signifying successful association with Wi-Fi access point 500, is received, wireless device 150 may exchange data 290 with Wi-Fi access point 500 in data frames under the protocol that are routed over a bridged network connection, typically the Internet 105, to its final destination. It is important to note that, in order for a wireless device 150 to transmit data with Wi-Fi access point 500, other than management frames, the wireless device 150 must authenticate to, and associate with, Wi-Fi access point 500, thereby enabling wireless device 150 to transmit and receive data 290. And similarly, Wi-Fi access point 500 cannot transfer data in data frames 290 to wireless device 150 until wireless device 150 has authenticated to, and associated with, Wi-Fi access point 500.

Figure 3B:
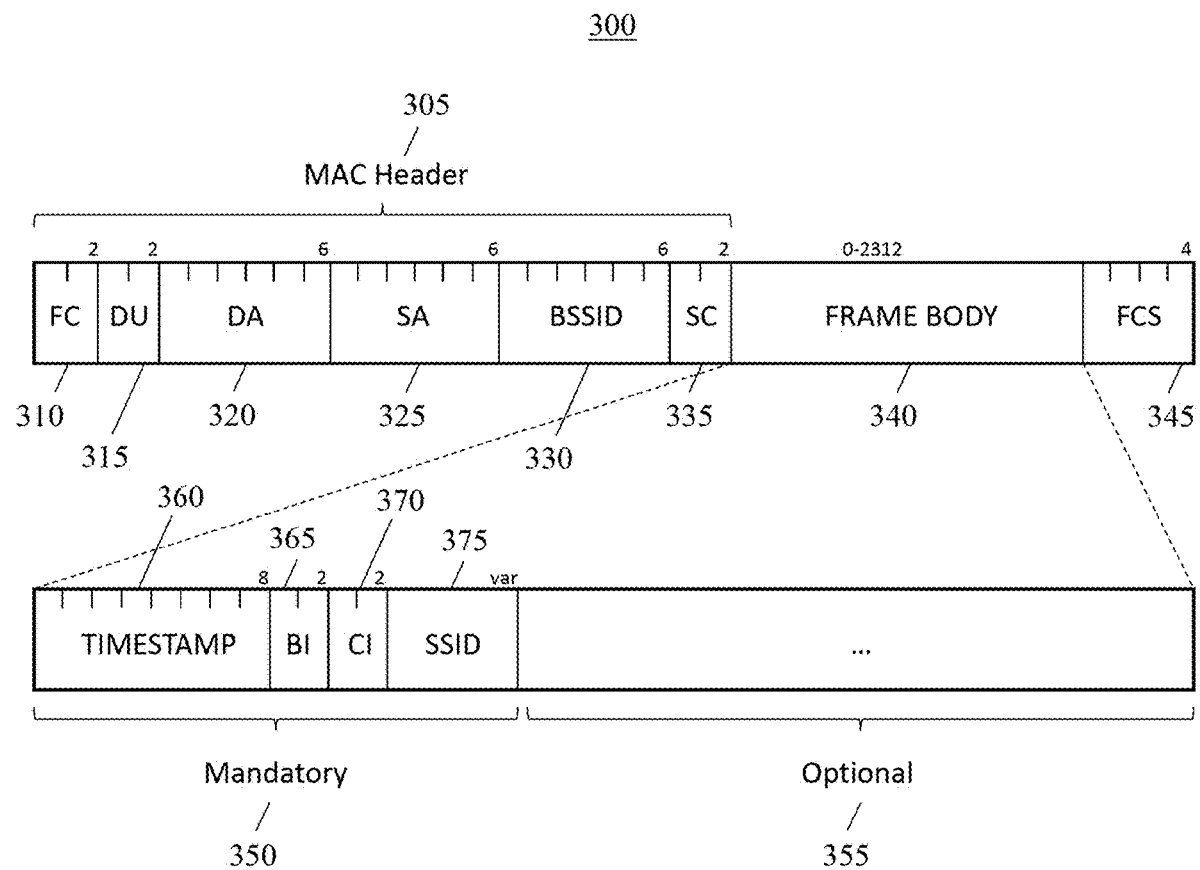
FIG. 3B shows the structure of a conventional IEEE 802.11 management frame representative of the type of management frames transferred between a wireless device and a Wi-Fi access point.

FIG. 3A shows the subtypes of IEEE 802.11 management frames. In a conventional management frame (e.g., 300 of FIG. 3B), the first octet is defined as the Frame Control field (e.g., 310 of FIG. 3B). The first three subfields of the Frame Control field (e.g., 310 of FIG. 3B) are present in all IEEE 802.11 frames and include the protocol version (not shown), the type of frame, and the subtype of frame. The type of frame subfield indicates whether the frame is a management frame, data frame, or control frame. The subtype of frame subfield indicates the particular subtype of frame within the type. In the figure, the various subtypes of management frames are shown. The subtype bits 310 represent the binary encoded subtype described by the subtype description 320. For purposes of the discussion that follows, emphasis will be placed on the beacon frame and probe response frame subtypes of management frames. Notwithstanding, as can be seen by the enumerated list of management frames, other management frames used for supervisory purposes relating to identification, authentication, and association by Wi-Fi wireless devices (e.g., 150) may be used in accordance with one or more embodiments of the present invention.

FIG. 3B shows the structure of a conventional IEEE 802.11 management frame 300 representative of the type of management frames transferred between a wireless device (e.g., 150) and a Wi-Fi access point (e.g., 500). The conventional management frame 300 includes a number of predetermined fields that are defined by the specification for their protocol-defined purpose. For example, MAC header 305 of management frame 300, includes Frame Control ("FC") field 310, Duration ("DU") field 315, Destination Address ("DA") field 320, Source Address ("SA") field 325, BSSID 330, and Sequence Control ("SC") field 335. Management frame 300 further includes the Frame Body field 340 that includes a number of subfields, including some that may vary based on the subtype (e.g., 310 of FIG. 3A) of management frame 300. For example, Frame Body 340 includes mandatory subfields 350 including Timestamp subfield 360, Beacon Interval ("BI") subfield 365, Compatibility Information ("CI") subfield 370, SSID subfield 375, and potentially Supported Rates subfield (not shown). Frame Body field 340 may also include one or more optional subfields 355 that also may vary based on the subtype (e.g., 310 of FIG. 3A) of management frame 300. The end of management frame 300 includes a Frame Check Sequence ("FCS") field 345 that includes an error-detecting code. During Wi-Fi wireless network discovery, beacon frames, probe response frames, and other management frames are in the form of conventional management frame 300, for the purpose of furthering identification, authentication to, and association with, a Wi-Fi access point (e.g., 500).

Figure 4A:
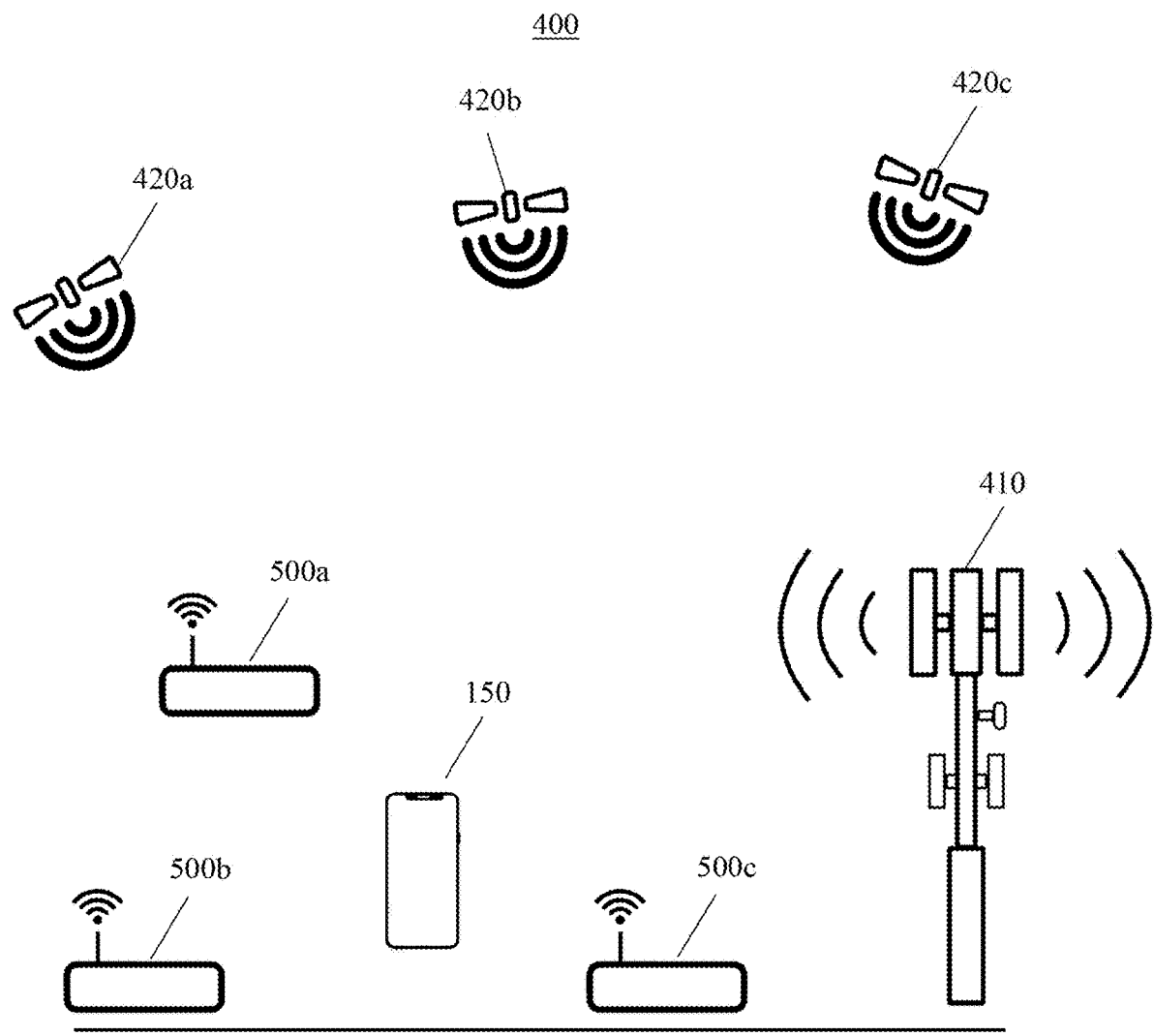
FIG. 4A shows various technologies that may be used to determine a location of a wireless device and one or more Wi-Fi access points.

FIG. 4A shows various technologies that may be used to determine a location of a wireless device (e.g., 150) and one or more Wi-Fi access points (e.g., 500a, 500b, 500c). A wireless device 150, which may be a smartphone as depicted in the example or any other type or kind of wireless device, may establish a cellular connection with one or more cell towers 410 providing cellular network connectivity (if the wireless device it possesses cellular capabilities). An established connection to a particular cell tower 410 may, in some circumstances, be used to establish a location of wireless device 150 within a determinable radius of the particular cellular tower 410. Further, patterns of connectivity to one or more cell towers 410 may be used to establish a location or potentially even the movement of wireless device 150 within a determinable radius. However, these techniques are rarely used outside of law enforcement. Instead, wireless devices 150 typically rely on GPS signals to determine their own location. Most wireless devices 150 include a GPS receiver (not independently shown) capable of receiving one or more GPS signals (not shown) from one or more GPS satellites (e.g., 420a, 420b, 420c) in Earth orbit. Typically, there are at least four GPS satellites (e.g., 420) visible overhead to a wireless device (e.g., 150) no matter where it is located, anywhere around the globe. Each GPS satellite 420a, 420b, 420c transmits a GPS signal (not shown) that includes information about the satellite's current position and the current time at regular intervals. The GPS receiver of wireless device 150 receives one or more of these GPS signals and calculates how far away it is from each satellite 420a, 420b, 420c based in part on how long it took for each respective GPS signal to arrive. If the wireless device 150 receives the GPS signal from at least three GPS satellites 420a, 420b, 420c, the location of the wireless device 150 may be determined with a high degree of accuracy by the process referred to as trilateration. The GPS-derived location of wireless device 150 may be determined continuously, periodically, or upon the execution of software that requires location services, such as, for example, navigation software or a web browser used to search nearby places. The accuracy of GPS is within a radius of approximately 16 feet under open skies and good conditions but worsens near structures and obstructions.

In some cases, a wireless device 150 may use one or more in-range Wi-Fi access points 500a, 500b, 500c to improve the accuracy of the GPS location determination and, in instances when GPS is not available, determine its location based on Wi-Fi positioning alone. As part of the Wi-Fi wireless network discovery process, wireless device 150 typically determines the received signal strength, sometimes referred to as Received Signal Strength Indication ("RSSI"), of the Wi-Fi signals broadcast by the in-range Wi-Fi access points 500a, 500b, 500c. Assuming, for the purpose of this discussion, that the location of one or more Wi-Fi access points 500a, 500b, 500c are already known to a certain degree of accuracy, the identified Wi-Fi access points 500a, 500b, 500c and received signal strengths may be used to refine the accuracy of the GPS location determination and, in instances when GPS is not available, determine the location of the wireless device 150 based on Wi-Fi positioning alone. For example, the known location of a Wi-Fi access point 500a and/or the received signal strength of the Wi-Fi signal received from it may be used alone or in combination with the known location and/or received signal strength of other Wi-Fi access points 500b, 500c to refine or determine the location of wireless device 150 by one or more processes such as, for example, RSSI, fingerprinting, angle of arrival, time of flight, or other positioning techniques including trilateration and triangulation. It is important to note that the received signal strength of the Wi-Fi signals received by wireless device 150 from one or more Wi-Fi access points 500a, 500b, 500c are determined without requiring wireless device 150 to authenticate to, associate with, or otherwise establish connectivity with any particular Wi-Fi access point 500a, 500b, 500c. As such, a wireless device (e.g., 150) may receive publicly broadcast Wi-Fi signals of in-range Wi-Fi access points (e.g., 500a, 500b, 500c) that it does not use or otherwise associate with in any way.

Figure 4B:
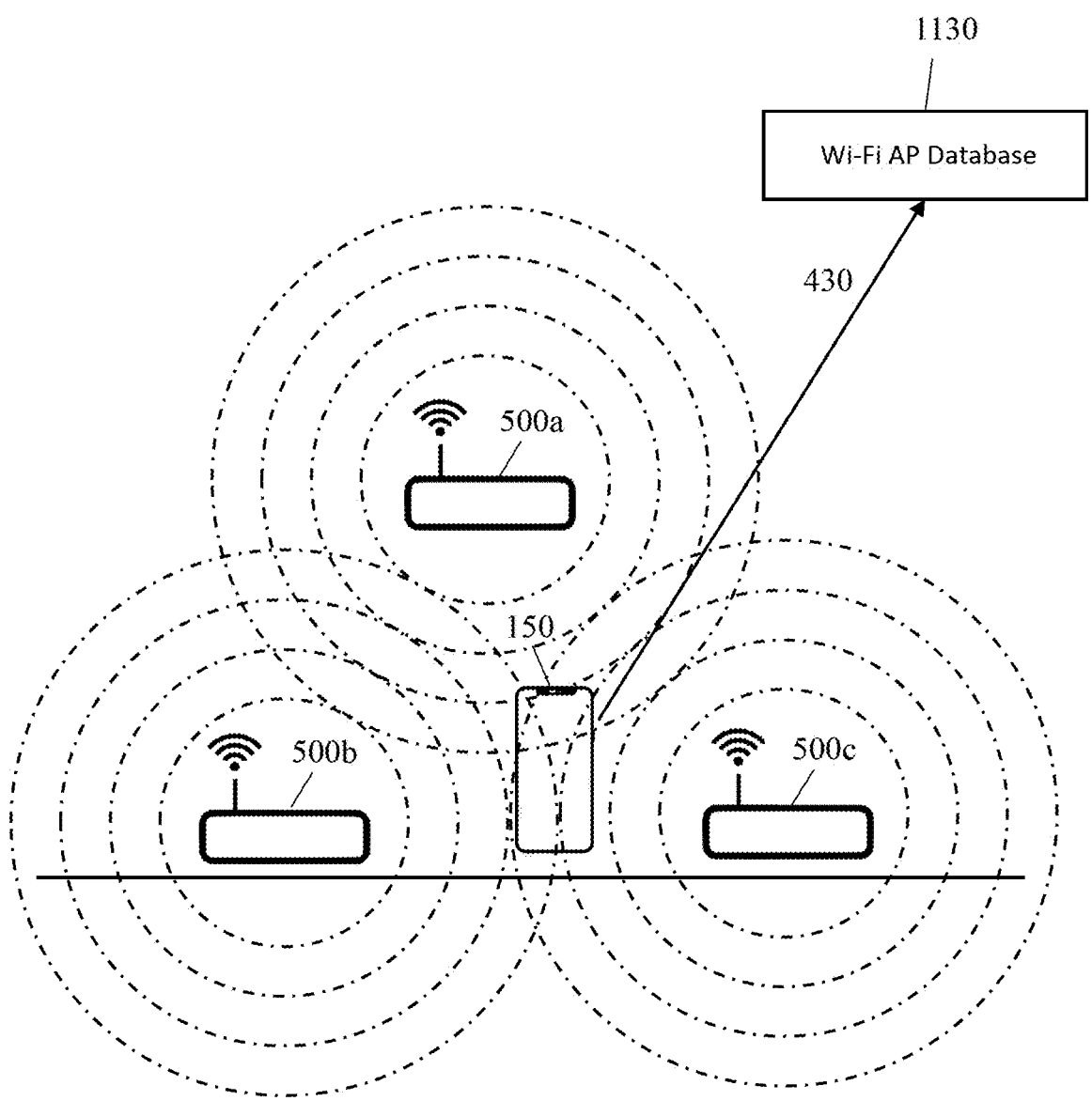
FIG. 4B shows a diagram of a wireless device reporting observations of one or more Wi-Fi access points it encounters to a Wi-Fi AP Database.

Continuing, FIG. 4B shows a diagram of a wireless device 150 reporting observations of Wi-Fi access points 500a, 500b, 500c it encounters to a Wi-Fi AP Database 1030. In the discussion of FIG. 4A, an assumption was made that the location of one or more Wi-Fi access points (e.g., 500a, 500b, 500c) were known to a certain degree of accuracy. This assumption holds true because wireless devices (e.g., 150) report any in-range Wi-Fi access points (e.g., 500) they encounter as well as location information to the original equipment manufacturer, operating system developer, and/or third-party software developer who maintain a database, referred to herein as a Wi-Fi AP Database 1130, of observations of Wi-Fi access points (e.g., 500a, 500b, 500c). The Wi-Fi AP Database 1030 stores reported observation data 430 of Wi-Fi access points (e.g., 500a, 500b, 500c) that are conventionally used to enhance location services (e.g., significant locations, location-based suggestions, location-based alerts, popular near me, and the like) of end users. While this benefits the user of the wireless device 150 in providing improved services, each wireless device (e.g., 150) reports information relating to the location of one or more Wi-Fi access points (e.g., 500) it encounters on an ongoing and continuous basis, typically without awareness on the part of the user. For example, this is commonly performed in the background as part of, for example, Apple® iOS®, Google® Android®, or Microsoft® location-based services and it is typically made available to third-party software developers for commercial use. In addition, many third-party software companies maintain their own Wi-Fi AP Database 1130 of observation data including the unique identifying information and location information of one or more Wi-Fi access points (e.g., 500), some of which commercially offer access to their database for a fee. For example, Cisco Systems®, Facebook®, WhatsApp®, XMode®, Ruckus®, and Skyhook® offer commercial versions of a Wi-Fi AP Database 1130. It is important to note that the information stored in such databases is typically obtained anonymously through publicly accessible Wi-Fi access point (e.g., 500) signals and in accordance with the terms and conditions of use of most smartphones, that typically provide the user with the option of opting-out of participation in such services. Further, the reports of observation data are typically anonymous, and no record of the reporting wireless device 150 is maintained. Thus, every user of a wireless device 150, such as a smartphone, reports observation data of Wi-Fi access points (e.g., 500) they encounter to a Wi-Fi AP Database 1130 on an ongoing and continuous basis, often without an awareness on the part of the user they are doing so, however, the user benefits from the enhanced location determination when browsing the web for nearby offerings or other location services. This behavior may be leveraged to use the existing infrastructure inherent in smartphones to report sensor data in accordance with one or more embodiments of the present invention, described in more detail herein.

Figure 5:
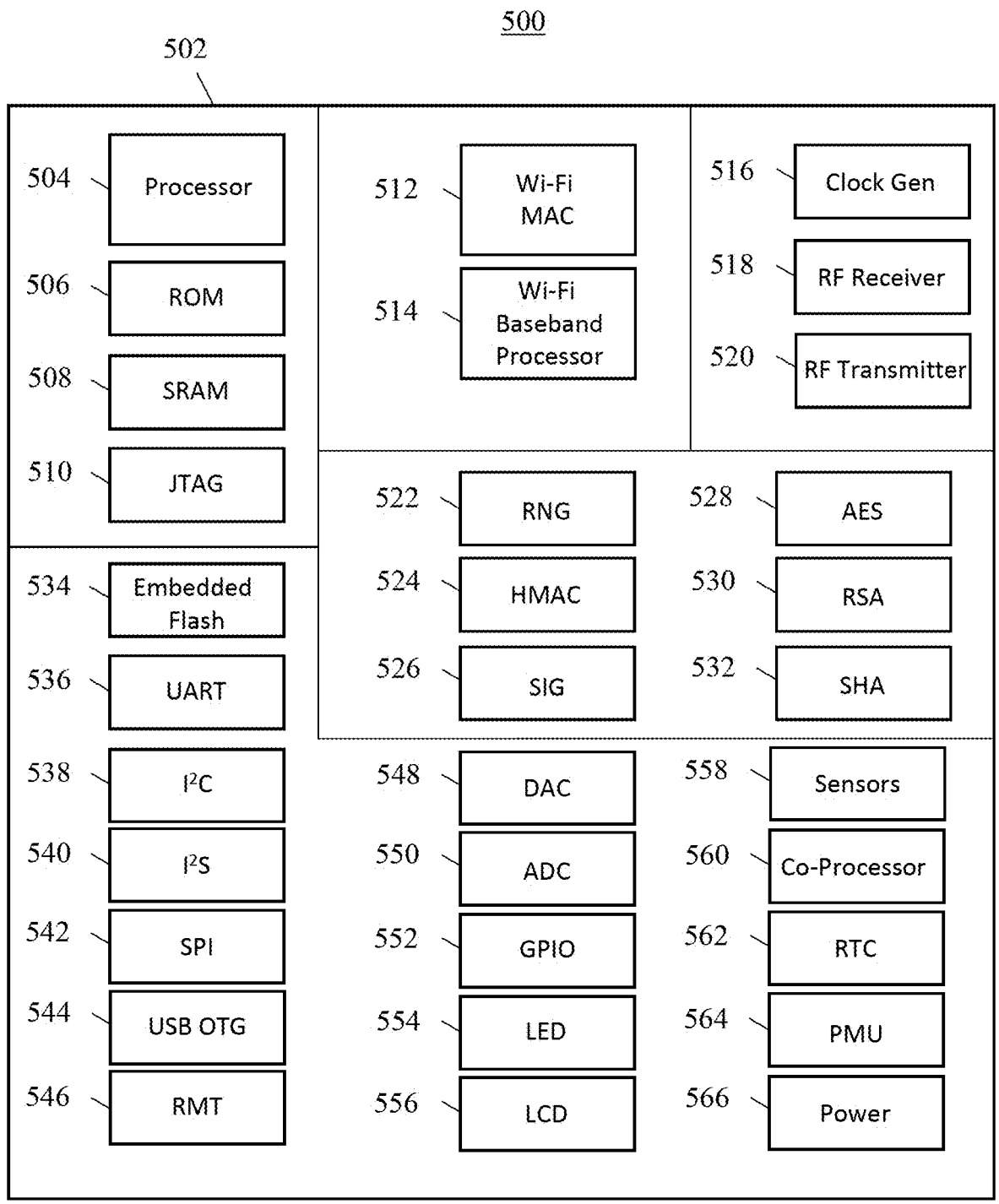
FIG. 5 shows a block diagram of a conventional Wi-Fi access point.

FIG. 5 shows a block diagram of a conventional Wi-Fi access point 500. A conventional Wi-Fi access point 500 includes one or more rigid Printed Circuit Boards ("PCBs") 502 on which a plurality of components are disposed. Wi-Fi access point 500 typically includes a processor 504 that serves as the primary computational and processing engine of the device, read-only memory ("ROM") 506 that includes software instructions that governs boot up and core functionality of the device, Static Random Access Memory ("SRAM") 508 that stores data and instructions during runtime, and a Joint Test Action Group ("JTAG") 510 interface for debugging the device. Wi-Fi access point 500 includes a Wi-Fi MAC 512 that implements the full IEEE 802.11 Wi-Fi MAC protocol and a Wi-Fi baseband processor 514 that manages radio functionality of the device. Wi-Fi access point 500 includes a radio frequency ("RF") receiver 518 that demodulates RF signals to baseband signals and converts them to the digital domain, a RF transmitter 520 that modulates baseband signals to RF signals and drives the RF signals onto an antenna (not shown), and a clock generator 516 that generates clock signals for the receiver 518 and transmitter 520. For security and implementation of authentication (e.g., 250, 260 of FIG. 2C) under the protocol, Wi-Fi access point 500 includes a random number generator ("RNG") 522, Hash-based Message Authentication Code ("HMAC") 524, Advanced Encryption Standard ("AES") cryptographic encryption accelerator 528, Rivest-Shamir-Adleman ("RSA") cryptographic encryption accelerator 530, and Secure Hash Algorithm ("SHA") 532 cryptographic encryption accelerator, and potentially others. Digital signatures 526, as well as flash encryption and secure boot signatures 534 may be used to protect the integrity of the software of the device at boot up or during runtime.

Wi-Fi access point 500 typically includes a plurality of peripheral interfaces that are used to flash, program, debug, control, or operate the device including, Universal Asynchronous Receiver-Transmitter ("UART") 536, I²C 538, I²S 540, Serial Peripheral Interface ("SPI") 543, Universal Serial Bus ("USB") On the Go ("OTG") 544, and infrared remote control ("RMT") 546. In addition, Wi-Fi access point 500 includes an Digital-to-Analog Converter ("DAC") 548, a Analog-to-Digital Converter ("ADC") 550, a plurality of General Purpose Inputs and Outputs ("GPIOs") 552, a Light Emitting Diode ("LED") interface 554, a Liquid Crystal Display ("LCD") interface 556, and one or more sensors 558. In addition, Wi-Fi access point 500 includes various housekeeping components, including, for example, a co-processor 560 typically used to wake the device up from a low power state, a real time clock ("RTC") 562 to keep time, a Power Management Unit ("PMU") 564 to control the power state of the device, and a power supply 566 that powers the device. The assembled PCB 502, and components disposed thereon, are typically disposed within a mechanical case (not shown) that includes one or more external antennae (not shown).

Figure 6:
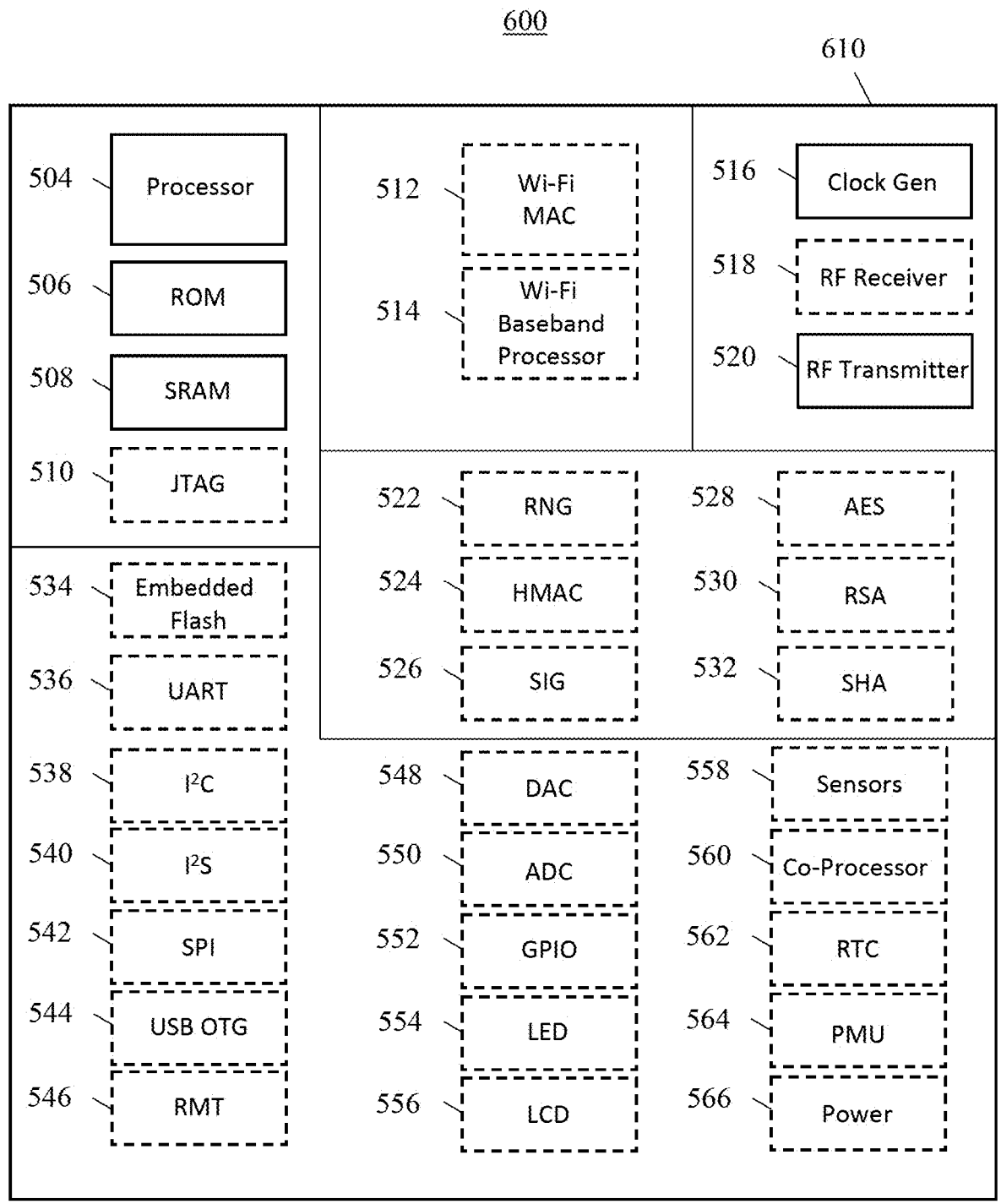
FIG. 6 shows a block diagram of a pseudo Wi-Fi access point in accordance with one or more embodiments of the present invention.

FIG. 6 shows a block diagram of a pseudo Wi-Fi access point 600 in accordance with one or more embodiments of the present invention. In recognition of the fact that the full functionality of a conventional Wi-Fi access point (e.g., 500 of FIG. 5) may not be not necessary for the sensor tracking task and in further recognition of the fact that many sensor tracking applications may benefit from a device having reduced power consumption in a smaller and potentially unique footprint, a pseudo, or dummy, Wi-Fi access point 600 may be used for the sensor tracking task in accordance with one or more embodiments of the present invention.

For the purpose of this disclosure, a pseudo Wi-Fi access point 600 is any device that is capable of participating in at least part of the Wi-Fi wireless network discovery process by broadcasting beacon frames (e.g., 220 of FIG. 2C or 220s of FIG. 8), probe response frames (e.g., 240 of FIG. 2C or 240s of FIG. 8), or other management frames (not shown) including its unique identifying information and additional information, but is not required to participate in authentication (e.g., 250, 260 of FIG. 2C), association (e.g., 270, 280 of FIG. 2C), or data transfer (e.g., 290 of FIG. 2C) under the protocol. In essence, a pseudo Wi-Fi access point 600 is only required to participate in a portion of the Wi-Fi wireless network discovery process that enables one or more wireless devices (e.g., 150 of FIG. 11) to observe a pseudo Wi-Fi access point 600 and report the encounter with the pseudo Wi-Fi access point 600 as if it were a bona fide conventional Wi-Fi access point (e.g., 500 of FIG. 5). From the perspective of the one or more wireless devices (e.g., 150 of FIG. 11) that encounter a pseudo Wi-Fi access point 600, it may appear to be a bona fide conventional Wi-Fi access point (e.g., 500 of FIG. 5), at least with respect to identification. As such, a pseudo Wi-Fi access point 600 may communicate at least the unique identifying information (e.g., BSSID) of the pseudo Wi-Fi access point 600 and additional data to one or more wireless devices (e.g., 150 of FIG. 11) in a similar manner to the way a conventional Wi-Fi access point (e.g., 500 of FIG. 5) would convey its own unique identifying information (e.g., its BSSID) as part of the Wi-Fi wireless network discovery process, thereby enabling the sensor tracking task, without requiring more.

In certain embodiments, a pseudo Wi-Fi access point 600 may not require one or more components or features to reduce the size, complexity, and power consumption of the device for use in the sensor and/or asset tracking task. For example, a pseudo Wi-Fi access point 600 may not require various cryptographic encryption accelerators (e.g., 522, 524, 526, 528, 530, 532 of FIG. 5) that are used for authentication (e.g., 250, 260 of FIG. 2C), since pseudo Wi-Fi access point 600 is not required to authenticate any wireless device (e.g., 150 of FIG. 11). In addition, a pseudo Wi-Fi access point 600 may not require one or more interfaces including, for example, embedded flash 534, UART 536, I²C 540, I²S 540, SPI 542, USB OTG 544, RMT 546, GPIO 552, LED 554, LCD 556, or sensors 558. In addition, a pseudo Wi-Fi access point 600 may not require one or more co-processors 560, RTC 562, PMU 564, or external power supply 566. As such, in such embodiments, a pseudo Wi-Fi access point 600 may exclude one or more of the above-noted components or features that are not required for the sensor tracking task.

In other embodiments, a pseudo Wi-Fi access point 600 may be implemented by incorporating only those components or features necessary for the sensor and/or asset tracking task in a System On a Chip ("SOC") 610, Field Programmable Gate Array ("FPGA") (not shown), configurable processor (not shown), or Application Specific Integrated Circuit ("ASIC") or other highly integrated device. In such embodiments, any one or more of the components or features of a conventional Wi-Fi access point (e.g., 500 of FIG. 5) required to enable the sensor and/or asset tracking task may be integrated as part of the SOC 610. The reduced complexity of a pseudo Wi-Fi access point 600 allows for greater integration and reduced power consumption, enabling new small form factors that are advantageous to the sensor and/or asset tracking task, including the use of flexible substrates and/or integration with other devices or systems. As such, in such embodiments, a pseudo Wi-Fi access point 600 may exclude one or more of the above-noted components or features that are not required for the sensor tracking task.

In still other embodiments, a pseudo Wi-Fi access point 600 may be a modified version of a conventional Wi-Fi access point (e.g., 500 of FIG. 5) or SOC (not shown) where any one or more of the above-noted components or features may be disabled or turned off. As such, in such embodiments, a pseudo Wi-Fi access point 600 may disable one or more of the above-noted components or features a conventional Wi-Fi access point (e.g., 500 of FIG. 5) that are not required for the sensor tracking task.

One of ordinary skill in the art will recognize that any pseudo Wi-Fi access point 600, or variation thereof, capable of participating in at least part of the Wi-Fi wireless network discovery protocol as if it were a bona fide conventional Wi-Fi access point (e.g., 500 of FIG. 5) may be used in the sensor tracking task in accordance with one or more embodiments of the present invention. Further, in certain embodiments, a pseudo Wi-Fi access point 600 may be said to spoof, or emulate, beacon frames (e.g., 220s of FIG. 8), probe response frames (e.g., 240s of FIG. 8), or other management frames (not shown) since a pseudo Wi-Fi access point 600 is not a bona fide conventional Wi-Fi access point (e.g., 500 of FIG. 5) capable of authenticating to, associating with, and performing data transfer under the protocol. In a given application, a combination of one or more conventional Wi-Fi access points (e.g., 500 of FIG. 5) and/or one or more pseudo Wi-Fi access points 600 may be used in the sensor and/or asset tracking task. For example, in certain embodiments, only pseudo Wi-Fi access points 600 may be used as part of one or more methods of passive sensor tracking. In other embodiments, only conventional Wi-Fi access points (e.g., 500 of FIG. 5) may be used as part of one or more methods of passive sensor tracking. In still other embodiments, one or more conventional Wi-Fi access points (e.g., 500 of FIG. 5) and one or more pseudo Wi-Fi access points 600 may be used as part of one or more methods of passive sensor tracking. One of ordinary skill in the art will recognize that the methods of passive sensor tracking disclosed herein may be flexibly adapted for a given application or design in accordance with one or more embodiments of the present invention.

One of ordinary skill in the art, having the benefit of this disclosure, will appreciate that one or more wireless devices (e.g., 150 of FIG. 11) that encounter a pseudo Wi-Fi access point (e.g., 600 of FIG. 7A) will not be able to distinguish it from a conventional Wi-Fi access point (e.g., 500 of FIG. 7A) for the purposes of the identification portions of the Wi-Fi wireless network discovery process in accordance with one or more embodiments of the present invention. As such, a pseudo Wi-Fi access point (e.g., 600 of FIG. 7A) will appear, and be reported, as if it is a conventional Wi-Fi access point (e.g., 500 of FIG. 7A). One of ordinary skill in the art will further recognize that, for the sensor tracking task, either a conventional Wi-Fi access point (e.g., 500 of FIG. 7A) or pseudo Wi-Fi access point (e.g., 600 of FIG. 7A) may be used in accordance with one or more embodiments of the present invention.

Figure 7A:
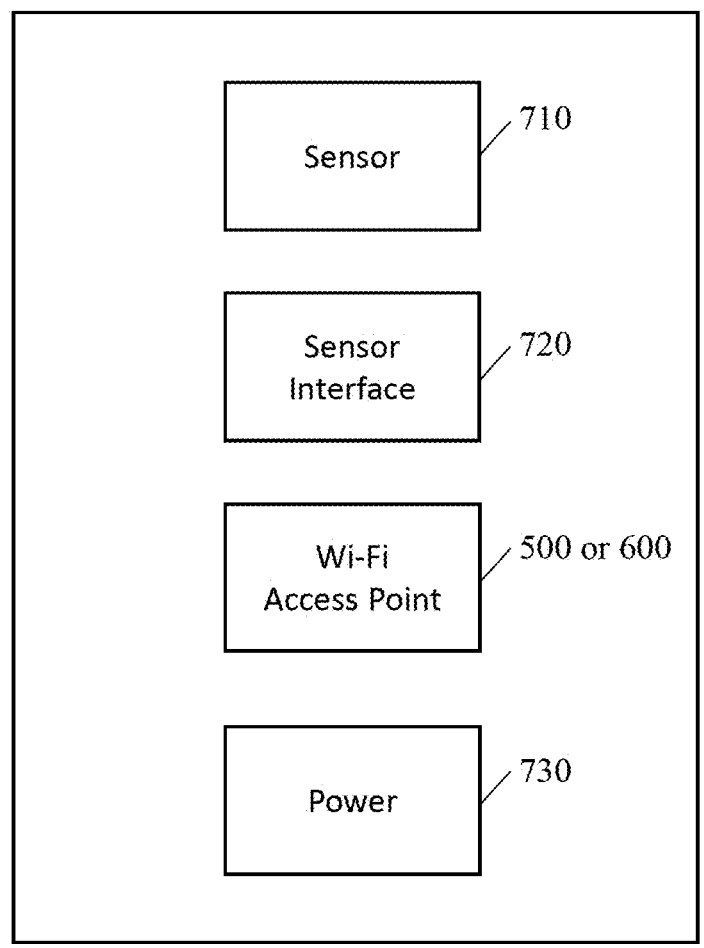
FIG. 7A shows a block diagram of a Wi-Fi access point-coupled sensor device in accordance with one or more embodiments of the present invention.

FIG. 7A shows a block diagram of a Wi-Fi access point-coupled sensor system 700 in accordance with one or more embodiments of the present invention. A Wi-Fi access point-coupled sensor system 700 may include one or more sensors 710, a sensor interface 720, and a conventional Wi-Fi access point (e.g., 500 of FIG. 5) or a pseudo Wi-Fi access point (e.g., 600 of FIG. 6). One of ordinary skill in the art will recognize that these components and the functions they perform may be flexibly configured based on an application or design. As such, the description that follows is to facilitate understanding, but is not intended to be limiting. For the sake of clarity, any device or system that facilitates a Wi-Fi access point transmitting a management frame comprising sensor data may constitute a Wi-Fi access point-coupled sensor system 700 for use in the sensor tracking task in accordance with one or more embodiments of the present invention.

A sensor 710 may be any type or kind of sensor that senses a physical property of its environment and generates output (not independently illustrated) corresponding to the physical property sensed. The output generated by a sensor 710 may vary based on the type or kind of sensor or sensors 710 used based on an application or design. In certain embodiments, one or more sensors 710 may be integrated with the Wi-Fi access point (e.g., 500 or 600 of FIG. 7A) or another component of Wi-Fi access point-coupled sensor system 700. In other embodiments, sensor 710 may be a discrete device configured to interface with a Wi-Fi access point (e.g., 500 or 600 of FIG. 7A) by way of sensor interface 720.

In one or more embodiments of the present invention, a sensor 710 may be, for example, an acoustic sensor, an ultrasonic sensor, an infrared sensor, a light sensor, a color sensor, an electric sensor, a continuity sensor, a resistance sensor, an inductance sensor, a capacitance sensor, an electric field sensor, a magnetic sensor, a temperature sensor, a thermal sensor, a mechanical sensor, a pressure sensor, a humidity sensor, a proximity sensor, a contact sensor, a tilt sensor, a chemical sensor, a moisture sensor, a smoke sensor, a gas sensor, an alcohol sensor, a seismic sensor, a distance sensor, a touch sensor, a GPS receiver, or combinations of one or more thereof. One of ordinary skill in the art will recognize that any type or kind of sensor, or combinations thereof, capable of outputting sensed data may be used in accordance with one or more embodiments of the present invention.

Sensor interface 720 may convert output of one or more sensors 710 into sensor data (not shown) suitable for being disposed in a management frame (e.g., 300 of FIG. 7B) transmitted by the Wi-Fi access point (e.g., 500 or 600 of FIG. 7A) of the Wi-Fi access point-coupled sensor system 700. Sensor interface 720 make take output of one or more sensors 710, the form or format of which may vary based on the type or kind of sensor or sensors 710 used, and produce sensor data in a form or format capable of being disposed in a management frame (e.g., 300 of FIG. 7B) transmitted by the Wi-Fi access point (e.g., 500 or 600 of FIG. 7A) of the Wi-Fi access point-coupled sensor system 700 as part of Wi-Fi wireless network discovery. For example, a temperature sensor 710 may sense the temperature and output an electrical signal corresponding to temperature. Sensor interface 720 may input this electrical signal and generate sensor data (not shown) corresponding to the sensed temperature. In one or more embodiments of the present invention, sensor interface 720 may generate sensor data (not shown) continuously, periodically, upon predetermined intervals, at a specific time or date, or upon a predetermined triggering condition. One of ordinary skill in the art will appreciate that the timing of updates to sensor data (not shown) may vary based on the application or design and the corresponding type or kind of power supply 730 used. For example, if sensor system 700 is powered 730 by a battery-powered supply, the timing of updates to sensor data (not shown) may be adjusted to achieve maximum operating life under battery power. In non-battery powered 730 applications, where available power is not constrained, the timing of updates to sensor data (not shown) may vary based on the application or design. One of ordinary skill in the art will recognize that the manner and frequency of updating sensor data (not shown) may vary based on an application or design in accordance with one or more embodiments of the present invention. In addition, one of ordinary skill in the art will recognize that sensor interface 720 facilitates disposing data in a management frame (e.g., 300 of FIG. 7B) transmitted by the Wi-Fi access point (e.g., 500 or 600 of FIG. 7A) of the Wi-Fi access point-coupled sensor system 700. As such, sensor interface 720, and the function it performs, may be integrated or distributed among other components of the system 700.

Wi-Fi access point-coupled sensor system 700 may use a conventional Wi-Fi access point (e.g., 500 of FIG. 5) or a pseudo Wi-Fi access point (e.g., 600 of FIG. 6) that may be coupled to sensor 710 by way of sensor interface 720. The conventional Wi-Fi access point (e.g., 500 of FIG. 5) or pseudo Wi-Fi access point (e.g., 600 of FIG. 6) of sensor system 700 may transmit one or more beacon frames (e.g., 220 of FIG. 2C or 220s of FIG. 8), probe response frames (e.g., 240 of FIG. 2C or 240s of FIG. 8), or other management frames comprising the sensor data (not shown) of sensor 710 as part of Wi-Fi wireless network discovery. As such, whenever one or more wireless devices (e.g., 150 of FIG. 11) merely happen to come into Wi-Fi signaling range of the Wi-Fi access point (e.g., 500 or 600 of FIG. 7A) of sensor system 700, one or more wireless devices (e.g., 150 of FIG. 11) may receive one or more management frames (e.g., 300 of FIG. 7B) from the Wi-Fi access point (e.g., 500 or 600 of FIG. 7A) comprising sensor data (not shown). The one or more wireless devices (e.g., 150 of FIG. 11) may report observation data relating to their encounter with the Wi-Fi access point (e.g., 500 or 600 of FIG. 7A), including the unique identifying information of the Wi-Fi access point (e.g., 500 or 600 of FIG. 7A), sensor data (not shown) of sensor 710, and potentially additional information obtained from one or more management frames (e.g., 300 of FIG. 7B) transmitted by the Wi-Fi access point (e.g., 500 or 600 of FIG. 7A), without requiring an awareness on the part of a user of a wireless device (e.g., 150 of FIG. 11) that it even received, and reported, sensor data (not shown).

In certain embodiments, sensor system 700 may be a conventional Wi-Fi access point (e.g., 500 of FIG. 5) or a pseudo Wi-Fi access point (e.g., 600 of FIG. 6) that includes one or more integrated sensors 710 (e.g., 558 of FIG. 5 or FIG. 6) and software modified to place the sensor data (not shown) in a management frame (e.g., 300 of FIG. 7B) transmitted by the conventional Wi-Fi access point (e.g., 500 of FIG. 5) or pseudo Wi-Fi access point (e.g., 600 of FIG. 6) of the Wi-Fi access point-coupled sensor system 700. In other embodiments, a conventional Wi-Fi access point (e.g., 500 of FIG. 5) or a pseudo Wi-Fi access point (e.g., 600 of FIG. 6) may receive output of a discrete sensor 710 via one or more interfaces, including, for example, GPIOs (e.g., 552 of FIG. 5 or FIG. 6). In such embodiments, the software (e.g., 506 of FIG. 5 or FIG. 6) executing thereon, in combination with the processor (e.g., 504 of FIG. 5 or FIG. 6), and potentially an ADC (e.g., 550 of FIG. 5 or FIG. 6) or DAC (e.g., 548 of FIG. 5 or FIG. 6) may serve as the sensor interface 720 and the software (e.g., 506 of FIG. 5 or FIG. 6) may be modified to place the sensor data (not shown) in a management frame (e.g., 300 of FIG. 7B) transmitted by the conventional Wi-Fi access point (e.g., 500 of FIG. 5) or pseudo Wi-Fi access point (e.g., 600 of FIG. 6). In still other embodiments, sensor system 700 may be implemented by incorporating one or more of the above-noted components or features, including a conventional Wi-Fi access point (e.g., 500 of FIG. 5) or a pseudo Wi-Fi access point (e.g., 600 of FIG. 6), in a SOC, FPGA, configurable processor, or ASIC, or other type of system not shown, potentially with one or more discrete sensors 710. One of ordinary skill in the art will recognize any combination of components or features, in any configuration or form factor, capable of placing sensor data (not shown) in a management frame (e.g., 300 of FIG. 7B) broadcast by a Wi-Fi access point (e.g., 500 or 600 of FIG. 7A) may be used as a Wi-Fi access point-coupled sensor system 700 in accordance with one or more embodiments of the present invention.

Figure 7B:
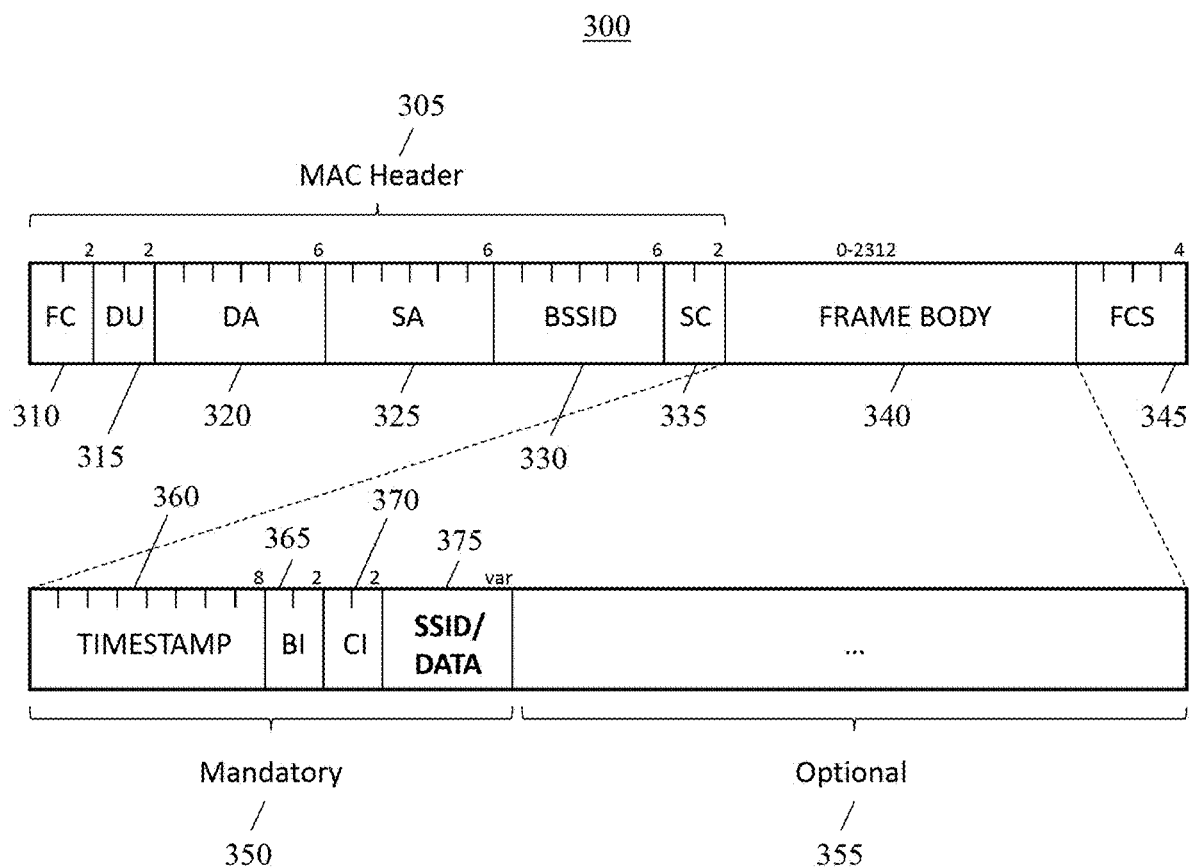
FIG. 7B shows an example of a management frame transmitted by a conventional Wi-Fi access point or a pseudo Wi-Fi access point in accordance with one or more embodiments of the present invention

Continuing, FIG. 7B shows an example of a management frame 300 transmitted by a Wi-Fi access point (e.g., 500 or 600 of FIG. 7A) of a Wi-Fi access point-coupled sensor system (e.g., 700 of FIG. 7A) in accordance with one or more embodiments of the present invention. Since the Wi-Fi access point (e.g., 500 or 600 of FIG. 7A) is only required to participate in, at least part of, Wi-Fi wireless network discovery in order to transmit unique identifying information, sensor data, and potentially location information, a beacon frame (e.g., 220 of FIG. 2C or 220s of FIG. 8), probe response frame (e.g., 240 of FIG. 2C or 240s of FIG. 8), or other management frame, having the same format as a conventional management frame (e.g., 300 of FIG. 3B) may be used. However, the beacon frame (e.g., 220 of FIG. 2C or 220s of FIG. 8), probe response frame (e.g., 240 of FIG. 2C or 240s of FIG. 8), or other management frame may include sensor data in one or more fields of a management frame 300 transmitted as part of Wi-Fi wireless network discovery.

In the example depicted in the figure, sensor data may be disposed in the SSID field 375. The SSID field 375 may advantageously be used because both beacon frames (e.g., 220 of FIG. 2C or 220s of FIG. 8) and probe response frames (e.g., 240 of FIG. 2C or 240s of FIG. 8) transmitted as part of Wi-Fi wireless network discovery include unique identifying information of the Wi-Fi access point (e.g., 500 or 600 of FIG. 7A), including BSSID 330, and SSID 375, which in this example, may include sensor data rather than the name of a wireless network. In this way, additional information may be disposed in certain fields, in either numeric or alphanumeric form, with or without encoding of a beacon frame (e.g., 220 of FIG. 2C or 220s of FIG. 8), probe response frame (e.g., 240 of FIG. 2C or 240s of FIG. 8), or other management frame. While any field of management frame 300 may potentially be used, the one or more fields selected to dispose additional information, such as, for example, sensor data, may be selected such that they are field or fields reported by a wireless device (e.g., 150 of FIG. 11) that encounters the Wi-Fi access point (e.g., 500 or 600 of FIG. 7A), typically as part of the inherent reporting feature used for improving location services. Continuing the example depicted in the figure, BSSID field 330 may be used to uniquely identify the Wi-Fi access point (e.g., 500 or 600 of FIG. 7A) and sensor data may be obtained from SSID field 375.

When a wireless device (e.g., 150 of FIG. 11) encounters the Wi-Fi access point (e.g., 500 or 600 of FIG. 7A), the wireless device (e.g., 150 of FIG. 11) reports observation data including, at least, BSSID 330 and SSID 375 of the Wi-Fi access point (e.g., 500 or 600 of FIG. 7A) it encountered. The beacon frame (e.g., 220 of FIG. 2C or 220s of FIG. 8), probe response frame (e.g., 240 of FIG. 2C or 240s of FIG. 8) or other management frame (not shown) transmitted by the Wi-Fi access point (e.g., 500 or 600 of FIG. 7A) may include additional data, such as, for example, sensor data, in the SSID field 375. The wireless device (e.g., 150 of FIG. 11) may report observation data including the unique identifying information, BSSID 330, of the Wi-Fi access point (e.g., 500 or 600 of FIG. 7A) and additional data, such as, for example, sensor data, stored within the SSID 375, to a sensor and/or asset tracking database (e.g., 1110 of FIG. 11) and/or a Wi-Fi AP Database (e.g., 1130 of FIG. 11), which may then be used as part of the sensor or asset tracking task. One of ordinary skill in the art will appreciate that the use of the SSID field 375 is merely exemplary and other fields may be used in accordance with one or more embodiments of the present invention.

Figure 8:
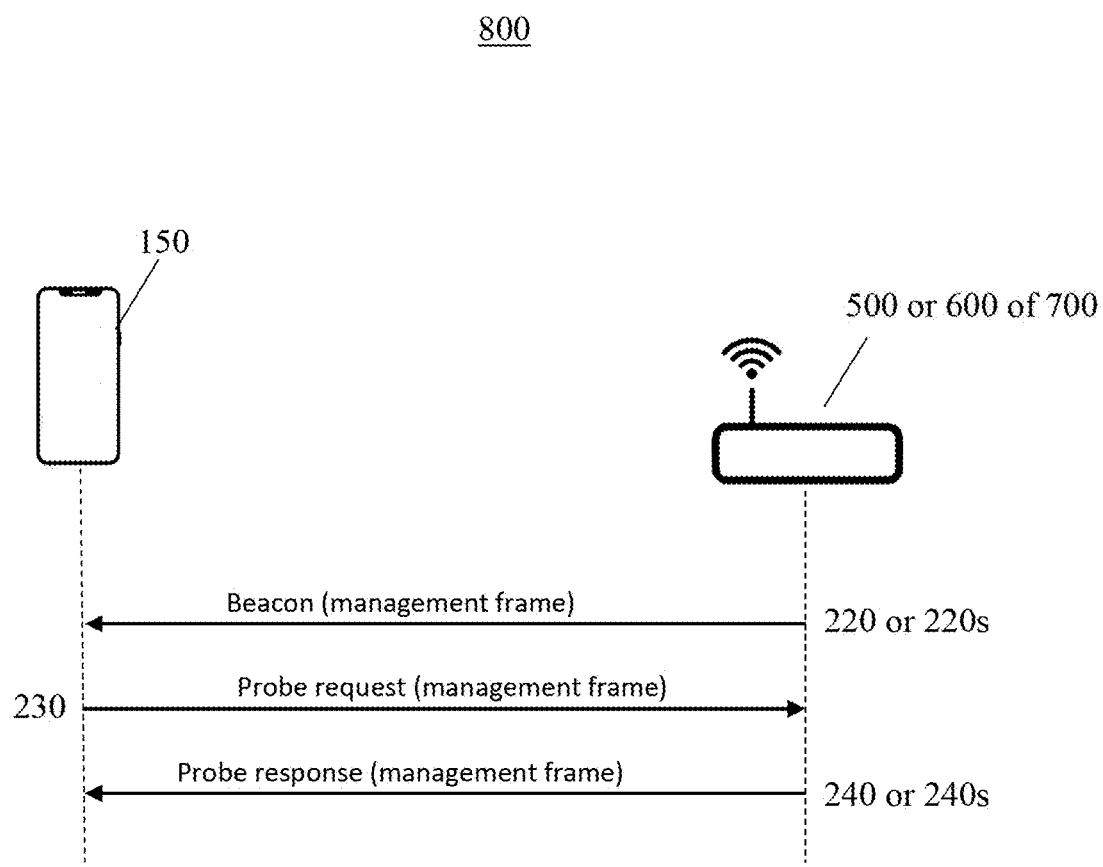
FIG. 8 shows a sequence of management frames exchanged between a wireless device or a pseudo Wi-Fi access point as part of Wi-Fi wireless network discovery in accordance with one or more embodiments of the present invention.

FIG. 8 shows a sequence of management frames exchanged between a wireless device 150 and a Wi-Fi access point (e.g., 500 or 600 of FIG. 7A) as part of Wi-Fi wireless network discovery in accordance with one or more embodiments of the present invention. As previously discussed, a Wi-Fi access point (e.g., 500 or 600 of FIG. 7A) of a Wi-Fi access point-coupled sensor system (e.g., 700 of FIG. 7A) is only required to participate, in a limited manner, in the Wi-Fi wireless network discovery process. The Wi-Fi access point (e.g., 500 or 600 of FIG. 7A) may transmit a beacon frame 220 or pseudo, spoofed, or emulated beacon frame 220s, probe response frame 240 or pseudo, spoofed, or emulated probe response frame 240s, or other management frame (not shown) that appear to be a bona fide management frame (e.g., 300 of FIG. 3B) to the receiving wireless device 150, but may be non-traditional management frame (e.g., 300 of FIG. 7B) including additional data, such as sensor data (e.g., 375). However, the Wi-Fi access point (e.g., 500 or 600 of FIG. 7A) is not required to allow a wireless device 150 to authenticate to (e.g., 250, 260 of FIG. 2C), associate with (e.g., 270, 280 of FIG. 2C), or transfer data (e.g., 290 of FIG. 2C) under the protocol with the Wi-Fi access point (e.g., 500 or 600 of FIG. 7A). In addition, the Wi-Fi access point (e.g., 500 or 600 of FIG. 7A) is not required to provide any upstream network connectivity or any network connectivity of any kind. As such, in certain embodiments, the Wi-Fi access point (e.g., 500 or 600 of FIG. 7A) does not allow a wireless device 150 to authenticate to (e.g., 250, 260 of FIG. 2C), associate with (e.g., 270, 280 of FIG. 2C), or transfer data (e.g., 290 of FIG. 2C) under the protocol with the Wi-Fi access point (e.g., 500 or 600 of FIG. 7A) and the Wi-Fi access point (e.g., 500 or 600 of FIG. 7A) does not provide upstream network connectivity. In such embodiments, a wireless device 150 cannot proceed to authentication or association and, in certain embodiments, will not receive anything from the Wi-Fi access point (e.g., 500 or 600 of FIG. 7A) other than one or more beacon frames 220 or 220s, probe response frames 240 or 240s, or other management frames (not shown) that include sensor data. One of ordinary skill in the art will recognize that, in certain embodiments, only portions of the Wi-Fi wireless network discovery process may be required for the sensor or asset tracking task when using a Wi-Fi access point (e.g., 500 or 600 of FIG. 7A) in accordance with one or more embodiments of the present invention.

Figure 9A:
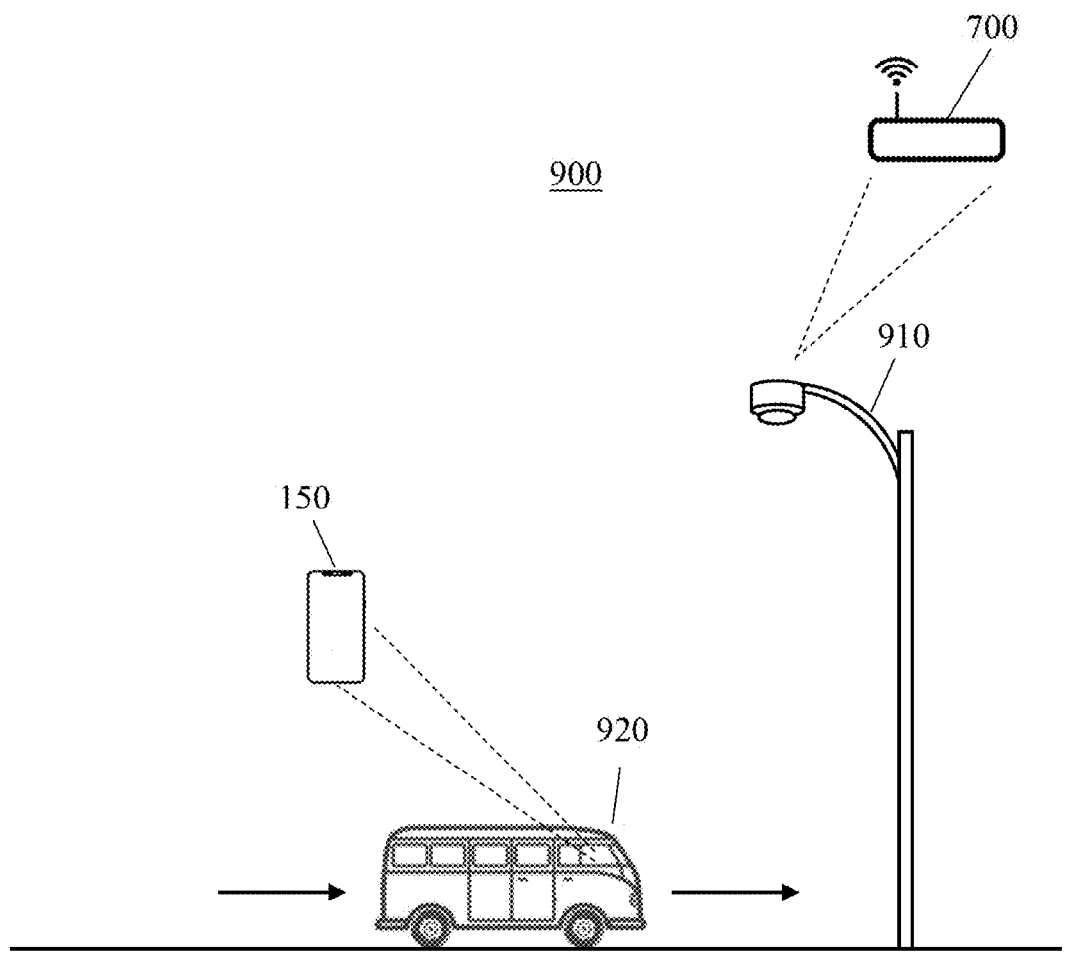
FIG. 9A shows an example of an application of passive sensor tracking in accordance with one or more embodiments of the present invention.

FIG. 9A shows an example of an application of passive sensor tracking in accordance with one or more embodiments of the present invention. For the purposes of illustration, consider the example of a streetlight fixture 910 with a Wi-Fi access point-coupled sensor system 700 disposed thereon, attached thereto, or integrated therewith. A sensor (e.g., 710 of FIG. 7A) may be configured to sense the condition of a light bulb of the streetlight 910. In such a configuration, for the purpose of example only, the sensor (e.g., 710 of FIG. 7A) may be a continuity sensor, where the lack of electrical continuity may indicate that the light bulb of streetlight 910 is burned out. It is important to recognize that Wi-Fi access point-coupled sensor system 700 has no communication capabilities, is not required to provide a wireless network, or upstream network connectivity of any kind. Notwithstanding, when a passenger vehicle 920 drives by the streetlight 910, the driver's smartphone, wireless device 150, may receive a beacon frame (e.g., 220 of FIG. 2C or 220s of FIG. 8), probe response frame (e.g., 240 of FIG. 2C or 240s of FIG. 8), or other management frame from the Wi-Fi access point (e.g., 500 or 600 of FIG. 7A) of system 700. In certain embodiments, wireless device 150 is not required to authenticate to, or associate with, the Wi-Fi access point (e.g., 500 or 600 of FIG. 7A) of system 700 and the Wi-Fi access point (e.g., 500 or 600 of FIG. 7A) of system 700 is not required to provide any upstream network connectivity. In other embodiments, wireless device 150 cannot authenticate to, or associate with, the Wi-Fi access point (e.g., 500 or 600 of FIG. 7A) of system 700 and the Wi-Fi access point (e.g., 500 or 600 of FIG. 7A) of system 700 does not provide any upstream network connectivity. By simply coming within Wi-Fi signaling range, wireless device 150 has received, potentially without awareness, sensor data in a beacon frame (e.g., 220 of FIG. 2C or 220s of FIG. 8), probe response frame (e.g., 240 of FIG. 2C or 240s of FIG. 8), or other management frame transmitted by the Wi-Fi access point (e.g., 500 or 600 of FIG. 7A) of system 700.

Figure 9B:
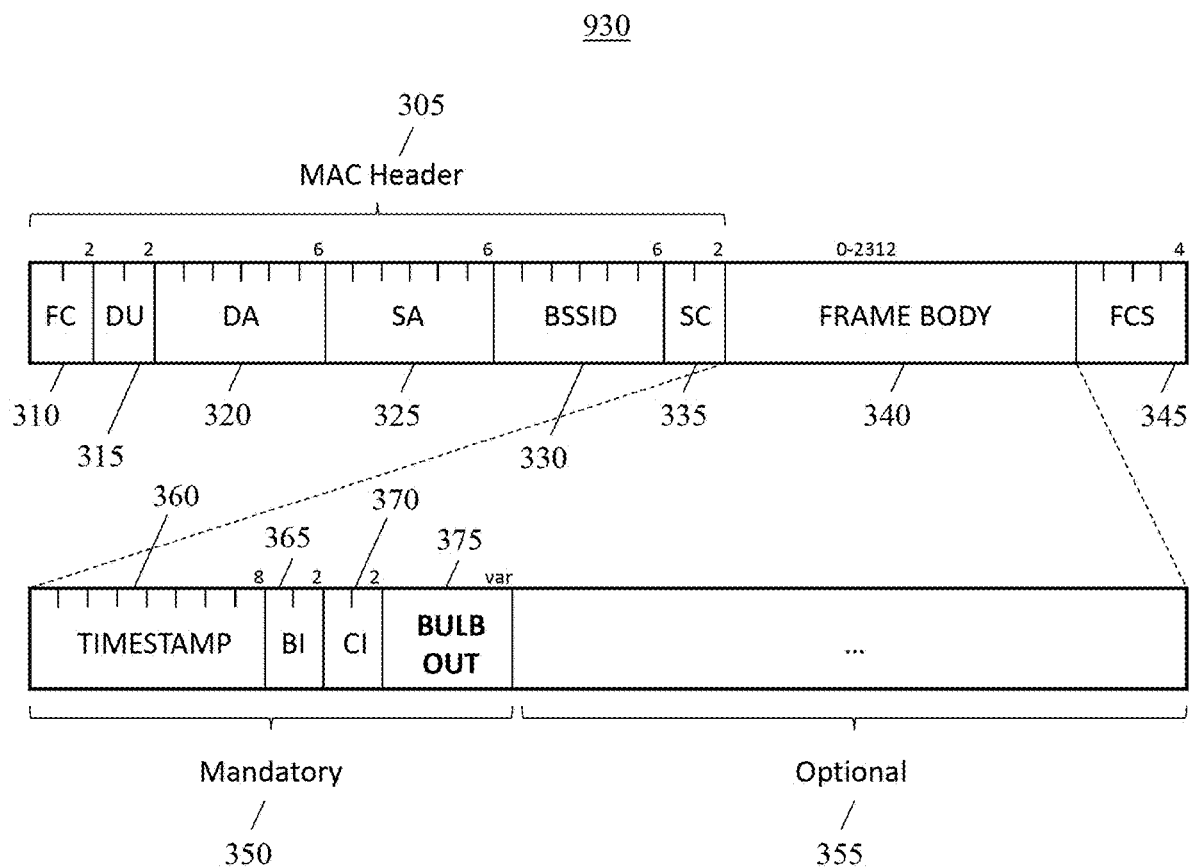
FIG. 9B shows an example of a management frame including sensor data in accordance with one or more embodiments of the present invention.

Continuing, FIG. 9B shows an example of a management frame 300 including sensor data (e.g., 375) transmitted by a Wi-Fi access point (e.g., 500 or 600 of FIG. 7A) of system (e.g., 700 of FIG. 9A) in accordance with one or more embodiments of the present invention. As shown in the example depicted in the figure, SSID subfield 375 may contain sensor data, in this instance, a textual indicator of whether the light bulb of streetlight (e.g., 910 of FIG. 9A) is functional or burned out. In the example, continuity may indicate the light bulb is functional and a lack of continuity may indicate the light bulb is burned out. Here, for purposes of illustration, we will assume that the sensor data includes an indication that the light bulb is burned out. The sensor data may be numeric or alphanumeric, explicit or encoded, and may be customized based on the type or kind of sensor and the type of sensed data it provides. Here, since the SSID is a textual field 375, an alphanumeric representation of the sensor output, "BULB OUT", may be placed in SSID subfield 375. One of ordinary skill in the art will recognize that sensor system (e.g., 700 of FIG. 9A) may include hardware and software, such as firmware that allows for the customizable presentation of sensor data based on a sensed physical property. In the example, the firmware may place the appropriate alphanumeric data corresponding to the binary continuity state of the light bulb in SSID subfield 375. One of ordinary skill in the art will recognize that the representation of data constituting sensor data may vary based on the type or kind of sensor, the field or fields used in the management frame, the encoding, if any, the encryption, if any, and any other factor that may influence the representation of the data in accordance with one or more embodiments of the present invention. In addition, as previously discussed, one of ordinary skill in the art will recognize that other field or fields may be used in accordance with one or more embodiments of the present invention.

Continuing, FIG. 9C shows an example of observation data of one or more Wi-Fi access points (e.g., 500 or 600 of FIG. 7A) reported by one or more wireless devices (e.g., 150) based on an encounter in accordance with one or more embodiments of the present invention. As previously discussed, one or more wireless devices (e.g., 150a of FIG. 9A) may report, via a cellular or any other network connection, observation data relating to one or more Wi-Fi access points (e.g., 500 or 600 of FIG. 7A) they encounter. Each report of observation data may include, at least, unique identifying information, such as, for example, the BSSID, of a Wi-Fi access point (e.g., 500 or 600 of FIG. 7A) encountered, sensor data, and in some embodiments, location information. In certain embodiments, the observation data for a given Wi-Fi access point (e.g., 500 or 600 of FIG. 7A) may include the unique identifying information of the Wi-Fi access point Wi-Fi access point (e.g., 500 or 600 of FIG. 7A) and sensor data of the corresponding sensor (e.g., 710 of FIG. 7A) associated therewith. In the example depicted in the figure, the sensor data may be disposed in the SSID field (e.g., 375 of FIG. 9B) and may include data corresponding to an operational state of a lightbulb of a streetlight (e.g., 910 of FIG. 9A). For purposes of illustration, the sensor data includes an indication that the lightbulb of the streetlight (e.g., 910 of FIG. 9A) is burned out, i.e., BULB OUT. It is important to recognize that the one or more reporting wireless devices (e.g., 150 of FIG. 9A) may not have any awareness that they are participating in the sensor and/or asset tracking task. From the perspective of the one or more wireless devices (e.g., 150 of FIG. 9A), they merely record information relating to one or more Wi-Fi access points that encounter, in this example, Wi-Fi access point (e.g., 500 or 600 of FIG. 7A) of a sensor system (e.g., 700 of FIG. 9A), and report observation data to a Wi-Fi AP Database (e.g., 1130 of FIG. 11), typically for the purpose of enhancing location services, and/or to a sensor and/or tracking database (e.g., 1110 of FIG. 11) in accordance with one or more embodiments of the present invention. Because the sensor data may be placed in a field that is typically used for a different purpose, but is reported as part of typical observation data, the Wi-Fi AP Database (e.g., 1130 of FIG. 11) may receive and store sensor data, without even knowing that they are doing so. From the perspective of the Wi-Fi AP Database (e.g., 1130 of FIG. 11), the sensor data stored in the SSID, may be assumed to be the actual name of the wireless network of the Wi-Fi access point, however, the sensor and/or asset tracking database (e.g., 1110 of FIG. 11) recognizes the contents of the field to be sensor data.

Continuing, FIG. 9D shows an example of sensor data stored or generated by a sensor tracking database in accordance with one or more embodiments of the present invention. A sensor and/or tracking database (e.g., 1110 of FIG. 11) may receive observation data of a Wi-Fi access point (e.g., 500 or 600 of FIG. 7A) from a Wi-Fi AP Database (e.g., 1130 of FIG. 11) and/or directly from one or more reporting wireless devices (e.g., 150*a* of FIG. 11). Because the sensor tracking database (e.g., 1110 of FIG. 11) has associated the unique identifying information of a Wi-Fi access point (e.g., 500 or 600 of FIG. 7A) with a sensor (e.g., 710 of FIG. 7A), the sensor and/or tracking database (e.g., 1110 of FIG. 11) may receive observation data including the unique identifying information of a Wi-Fi access point Wi-Fi access point (e.g., 500 or 600 of FIG. 7A) and know that they sensor data is disposed in, in this example, the SSID field. As such, when the sensor and/or tracking database (e.g., 1110 of FIG. 11) receives a request from, for example, a client portal (e.g., 1120 of FIG. 11) to provide the sensor data of a specific sensor, the sensor tracking database (e.g., 1110 of FIG. 11) may query the unique identifying information of the Wi-Fi access point (e.g., 500 or 600 of FIG. 7A) associated with the sensor (e.g., 710 of FIG. 7A) and obtain the data from the SSID field and report it as the last reported sensor data value. In this instance, it would report that the lightbulb of the streetlight (e.g., 910 of FIG. 9A) is burned out. Advantageously, a sensor (e.g., 710 of FIG. 7A) may be deployed, without any inherent communication capabilities, in a location with no network connectivity of any kind, and passively track the sensor (e.g., 710 of FIG. 7A). The one or more wireless devices (e.g., 150) that merely happen to come into range of the Wi-Fi access point (e.g., 500 or 600 of FIG. 7A) become the passive sensor tracking infrastructure, potentially without awareness that they are doing so, thereby enabling the determination of sensor data of remote sensors that are potentially disposed in areas where there is network connectivity of any kind.

Figure 10A:
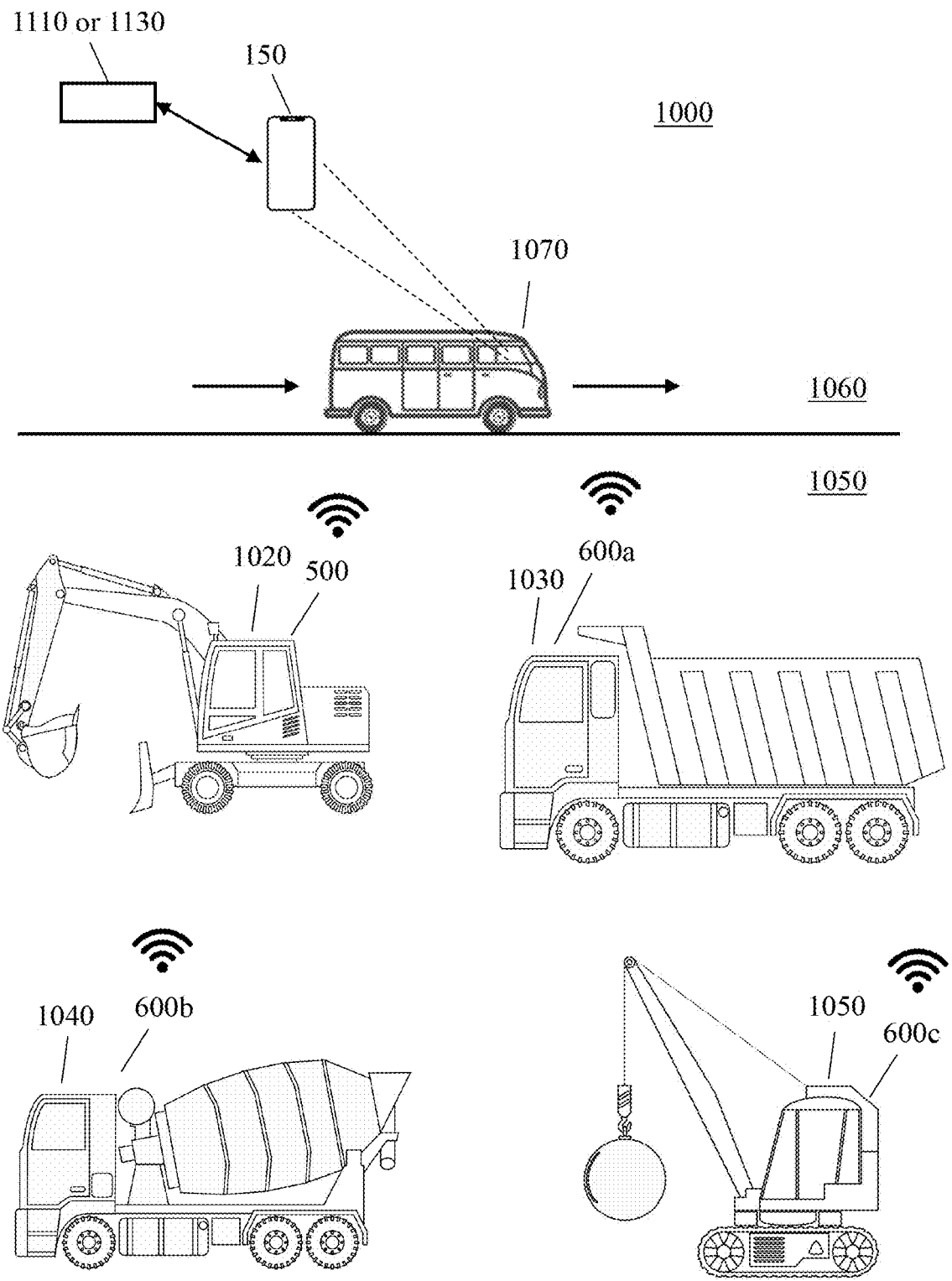
FIG. 10A shows an example of an application of passive sensor tracking using observations of one or more pseudo Wi-Fi access points in accordance with one or more embodiments of the present invention.

FIG. 10A shows an example of an application of passive sensor and/or asset tracking 1000 in accordance with one or more embodiments of the present invention. In addition to conveying sensor data, in one or more embodiments of the present invention, the location of the sensor may be tracked using one or more methods of passive asset tracking. In one or more embodiments of the present invention, one or more Wi-Fi access points (e.g., 500, 600*a*, 600*b*, 600*c*) may be disposed on, attached to, or integrated with one or more moveable sensors/assets (e.g., 1020, 1030, 1040, 1050) to be passively tracked in accordance with one or more embodiments of the present invention. As previously discussed, in one or more embodiments of the present invention, one or more conventional Wi-Fi access points (e.g., 500 of FIG. 7A) may be exclusively used, one or more pseudo Wi-Fi access points (e.g., 600 of FIG. 7A) may be exclusively used, or a mixture of one or more conventional Wi-Fi access points (e.g., 500 of FIG. 7A) and one or more pseudo Wi-Fi access points (e.g., 600 of FIG. 7A) may be used. As such, the example showing use of a conventional Wi-Fi access point 500 and a plurality of pseudo Wi-Fi access points 600*a*, 600*b*, 600*c* is merely for the purpose of illustration and is not limiting. Notwithstanding, one of ordinary skill in the art will appreciate that any combination of one or more conventional Wi-Fi access points (e.g., 500 of FIG. 7A) and/or one or more pseudo Wi-Fi access points (e.g., 600 of FIG. 7A), some of which may be sensor enabled, may be used in accordance with one or more embodiments of the present invention. Advantageously, one or more moveable sensors/assets (e.g., 1020, 1030, 1040, 1050) may be passively tracked by one or more wireless devices 150 that merely happen to come in range, even if only temporarily, of a Wi-Fi access point (e.g., 500, 600*a*, 600*b*, 600*c*) even though a wireless device 150, or user thereof, may not even know that they are participating in the sensor and/or asset tracking task.

For example, in the example depicted in the figure, wireless device 150 may be a smartphone carried on a user's person while in a motor vehicle 1070 driving down a street 1060. The user's smartphone 150 may, without requiring awareness on the part of the user, report observations of the in-range conventional Wi-Fi access points (e.g., 500) and/or pseudo Wi-Fi access points (e.g., 600*a*, 600*b*, 600*c*) it encounters, even if only temporarily, to a sensor and/or asset tracking database (e.g., 1110 of FIG. 11) and/or a Wi-Fi AP Database (e.g., 1130 of FIG. 11), depending on an application or design. The sensor and/or asset tracking database (e.g., 1110 of FIG. 11) may use one or more observations to determine a location of a sensor/asset (e.g., 1020, 1030, 1040, 1050). Advantageously, the moveable sensors/assets (e.g., 1020, 1030, 1040, 1050) and associated Wi-Fi access point (e.g., 500, 600*a*, 600*b*, 600*c*) do not require any network connectivity, may be deployed anywhere in the world, and the existing installation/infrastructure of users of smartphones 150 may be used to passively track the sensor data, in some embodiments, locations of the moveable sensors/assets (e.g., 1020, 1030, 1040, 1050) in an open-network configuration. For the sake of clarity, each sensor/asset may include a conventional Wi-Fi access point (e.g., 500 of FIG. 7A) or a pseudo Wi-Fi access point (e.g., 600 of FIG. 7A) and in some applications, some sensors/assets (e.g., 1020) may be deployed with a conventional Wi-Fi access point (e.g., 500 of FIG. 7A) and other sensor/assets (e.g., 1030, 1040, 1050) may be deployed with a pseudo Wi-Fi access point (e.g., 600 of FIG. 7A).

As such, for the purpose of this disclosure, passive sensor or asset tracking means tracking a sensor/asset (e.g., 1020, 1030, 1040, 1050) based on observations of one or more Wi-Fi access points (e.g., 500 or 600 of FIG. 7A) without requiring any particular wireless device 150 to authenticate to, associate with, or establish connectivity with any particular Wi-Fi access points (e.g., 500, 600*a*, 600*b*, 600*c*).

Moreover, passive asset tracking does not require a Wi-Fi access point (e.g., 500 or 600 of FIG. 7A) associated with a sensor/asset (e.g., 1020, 1030, 1040, 1050) to provide any network connectivity of any kind at any time.

Figure 11:
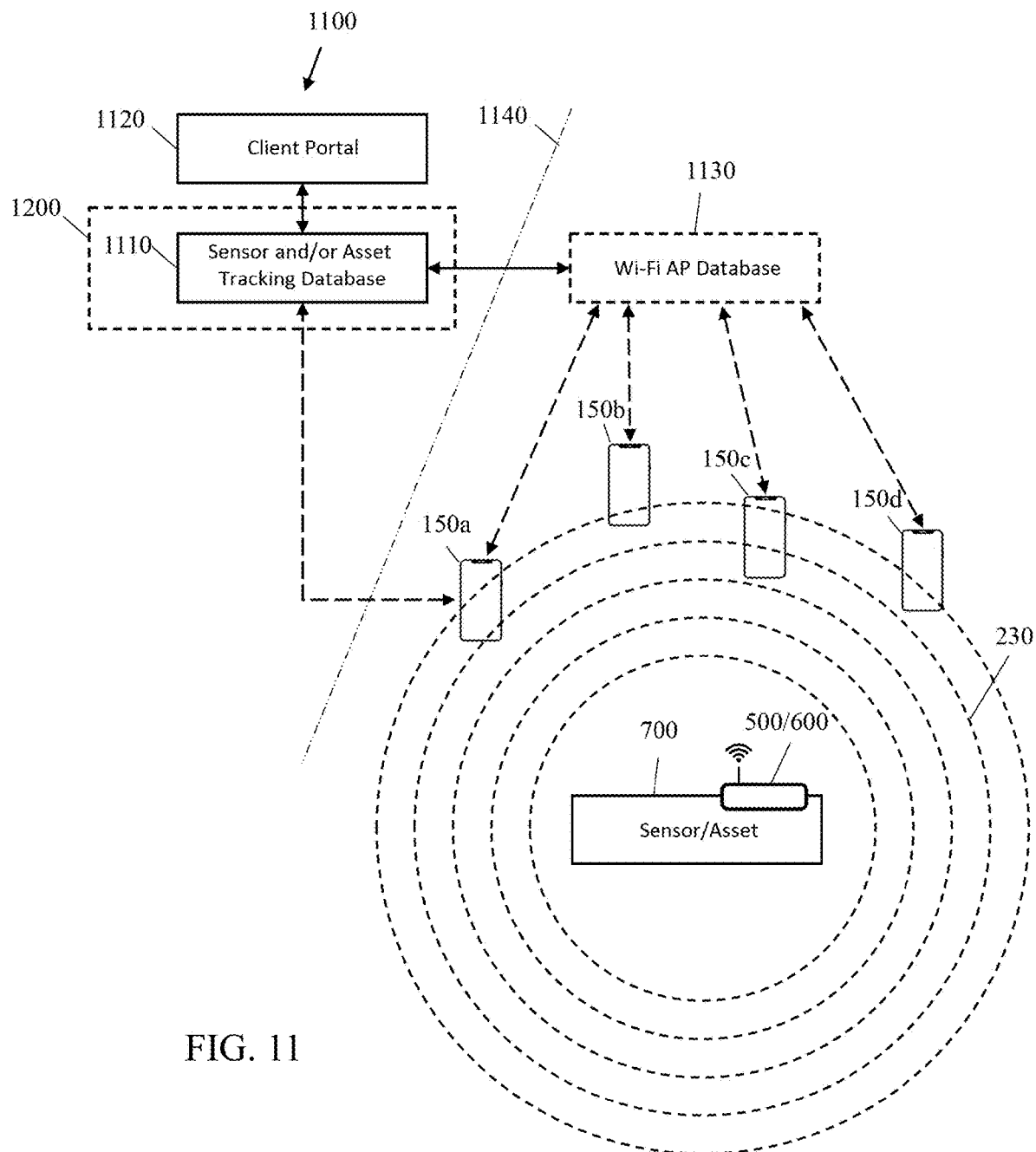
FIG. 11 shows a system for passive sensor tracking in accordance with one or more embodiments of the present invention.

In certain embodiments, one or more wireless devices 150 may report observation data of an encounter with a Wi-Fi access point (e.g., 500, 600a, 600b, 600c) associated with a moveable sensor/asset (e.g., 1020, 1030, 1040, 1050) to a Wi-Fi AP Database (e.g., 1130 of FIG. 11). A sensor and/or asset tracking database (e.g., 1110 of FIG. 11) may receive observation data from the Wi-Fi AP Database (e.g., 1130 of FIG. 11) comprising unique identifying information, sensor data, and in some embodiments, location information that may be used to determine a location of one or more moveable sensors/assets (e.g., 1020, 1030, 1040, 1050).

In other embodiments, one or more direct reporting wireless devices 150 may report first observation data of an encounter with a Wi-Fi access points (e.g., 500, 600a, 600b, 600c) associated with a moveable sensor/asset (e.g., 1020, 1030, 1040, 1050) to the sensor and/or asset tracking database (e.g., 1110 of FIG. 11) and one or more indirect reporting wireless devices (e.g., 150) may report second observation data to a Wi-Fi AP Database (e.g., 1130 of FIG. 11). The Wi-Fi AP Database (e.g., 1130 of FIG. 11) may receive second observation data from one or more indirect reporting wireless devices (e.g., 150) that encounter one or more Wi-Fi access points (e.g., 500, 600a, 600b, 600c) associated with one or more sensors/assets (e.g., 1020, 1030, 1040, 1050).

In still other embodiments, one or more wireless devices 150 may report observation data of an encounter with a Wi-Fi access point (e.g., 500, 600a, 600b, 600c) associated with a sensor/asset (e.g., 1020, 1030, 1040, 1050) to the sensor and/or asset tracking database (e.g., 1110 of FIG. 11). In all such embodiments, the Wi-Fi wireless network discovery process, as well as the reporting of observations of Wi-Fi access points (e.g., 500, 600a, 600b, 600c) may be advantageously used to passively track one or more sensors/assets (e.g., 1020, 1030, 1040, 1050) without requiring that any wireless device 150 authenticate to, associate with, or join any particular Wi-Fi access point (e.g., 500, 600a, 600b, 600c), using publicly accessible Wi-Fi signals, and in passive scanning applications, anonymously with respect to the sensor and/or asset tracking task. In addition, a Wi-Fi access point (e.g., 500, 600a, 600b, 600c) associated with one or more sensors/assets (e.g., 1020, 1030, 1040, 1050) are not required to provide any network connectivity of any kind at any time.

Returning to the example depicted in the figure, one or more Wi-Fi access points (e.g., 500, 600a, 600b, 600c) may be disposed on, attached to, or integrated with one or more sensors/assets 1020, 1030, 1040, 1050 that may be deployed in the field 1050. For the purpose of illustration only, capital construction equipment is shown as examples of moveable assets to be tracked. However, one of ordinary skill in the art will recognize that any moveable asset may be tracked in accordance with one or more embodiments of the present invention. It is important to recognize that Wi-Fi access points (e.g., 500, 600a, 600b, 600c) are not required to participate in any particular wireless network or provide any upstream network connectivity or any network connectivity of any kind. Advantageously, the Wi-Fi access points (e.g., 500, 600a, 600b, 600c) are only be required to participate in a portion of the Wi-Fi wireless network discovery process as part of the sensor or asset tracking task. Specifically, each conventional Wi-Fi access point (e.g., 500) may broadcast beacon frames (e.g., 220 of FIG. 2C) in passive scanning mode (e.g., 200 of FIG. 2A) and/or respond to probe request frames (e.g., 240 of FIG. 2C) with probe response frames (e.g., 240 of FIG. 2C) as part of active scanning mode (e.g., 205 of FIG. 2B). Similarly, each pseudo Wi-Fi access point (e.g., 600a, 600b, 600c) may be disposed on, attached to, or integrated with assets 1030, 1040, 1050 may broadcast pseudo, spoofed, or emulated beacon frames (e.g., 220s of FIG. 8) in passive scanning mode (e.g., 200 of FIG. 2A) and/or respond to probe request frames (e.g., 230 of FIG. 8) with pseudo, spoofed, or emulated probe response frames (e.g., 240s of FIG. 8) as part of active scanning mode (e.g., 205 of FIG. 2B). The beacon frames, conventional or pseudo, (e.g., 220 of FIG. 2C or 220s of FIG. 8) or probe response frames, conventional or pseudo, (e.g., 240 of FIG. 2C or 240s of FIG. 8) include information that uniquely identifies the Wi-Fi access point (e.g., 500, 600a, 600b, 600c), and by proxy, a particular sensor/asset (e.g., 1020, 1030, 1040, 1050) itself. It is important to recognize that each moveable sensor/asset (e.g., 1020, 1030, 1040, 1050) to be tracked is not required to have any communications capabilities of any kind whatsoever other than the ability to participate in, at least part of, the Wi-Fi wireless network discovery process. One of ordinary skill in the art will recognize that the beacon frame (e.g., 220 of FIG. 2C or 220s of FIG. 8), probe response frame (e.g., 240 of FIG. 2C or 240s of FIG. 8), or other management frame (not shown) may contain other information that may be used as part of the sensor and/or asset tracking task in one or more embodiments of the present invention.

In certain embodiments, in passive scanning mode (e.g., 200 of FIG. 2A), the Wi-Fi access point (e.g., 500, 600a, 600b, 600c) may be physically and logically associated with sensors/assets 1020, 1030, 1040, 1050 respectively and broadcast beacon frames (e.g., 220 of FIG. 2C or 220s of FIG. 8) at regular intervals, each of which includes information that uniquely identifies the particular Wi-Fi access point (e.g., 500, 600a, 600b, 600c) and, to those who recognize the association, the sensor/asset (e.g., 1020, 1030, 1040, 1050) logically associated with it in the sensor and/asset tracking database (e.g., 1110 of FIG. 11). One or more wireless devices 150 may come in-range of one or more Wi-Fi access point (e.g., 500, 600a, 600b, 600c) and receive one or more beacon frames (e.g., 220 of FIG. 2C or 220s of FIG. 8). As previously discussed, wireless devices 150 report, via a cellular or other connection, observation data. Each report of observation data includes, at least, unique identifying information, such as, for example, the BSSID, of a Wi-Fi access point (e.g., 500, 600a, 600b, 600c) encountered, sensor data, and in some embodiments, location information of the Wi-Fi access point (e.g., 500, 600a, 600b, 600c) encountered. The location information may include coordinates such as latitude and longitude or other information that may be used to determine a location. In certain embodiments, the observation data for a given Wi-Fi access point (e.g., 500, 600a, 600b, 600c) may include one or more of the time, date, current location, speed, and direction of travel of the reporting wireless device 150 at or near the time of the encounter, and SSID, received signal strength, or other information pertaining to the Wi-Fi access point (e.g., 500, 600a, 600b, 600c) encountered. In addition, observation data may include any of the above-noted information from other in-range conventional Wi-Fi access points (e.g., 500) or pseudo Wi-Fi access point (e.g., 600) encountered at or near the same time that the given Wi-Fi access point (e.g., 500, 600a, 600b, 600c) of interest was encountered. The observation data is reported to an original equipment manufacturer of the wireless device 150, an operating system developer of an operating system executing on the wireless device 150, or third-party software developer that maintain a Wi-Fi AP Database (e.g., 1130 of FIG. 11), and/or a dedicated sensor and/or asset tracking database (e.g., 1110 of FIG. 11) of the present invention that is used to track assets.

While the observation reporting aspect of wireless devices 150 is typically used to improve the accuracy of location-based services, here, the observation data provides data and, in some embodiments, information that may be used to estimate the location of one or more Wi-Fi access point (e.g., 500, 600a, 600b, 600c) at a particular time and date without requiring the purposeful participation of any particular wireless device 150 in any particular Wi-Fi wireless network. As such, this information may be used to determine the location of one or more Wi-Fi access points (e.g., 500, 600a, 600b, 600c) and, by proxy, one or more moveable sensors/assets 1020, 1030, 1040, 1050 with substantial accuracy, that may be further refined with well-known location refinement techniques typically used by wireless devices 150 in place of, or to enhance, GPS location determination or location-based services.

In other embodiments, in active scanning mode (e.g., 205 of FIG. 2B), one or more wireless devices 150 may transmit a probe request frame (e.g., 230 of FIG. 2C) that is not directed to any particular Wi-Fi access point (e.g., 500, 600a, 600b, 600c), requesting that all in-range Wi-Fi access points announce their presence. In response, in-range Wi-Fi access point (e.g., 500, 600a, 600b, 600c) may transmit a probe response frame (e.g., 240 of FIG. 2C or 240s of FIG. 8) which includes information that uniquely identifies the responding Wi-Fi access point (e.g., 500, 600a, 600b, 600c), sensor data, and, in some embodiments, location information. As previously discussed, wireless devices 150 report, via a cellular or other connection, observation data including, at least, unique identifying information, such as, for example, the BSSID, of one or more Wi-Fi access points (e.g., 500, 600a, 600b, 600c) encountered and location information of the one or more Wi-Fi access point (e.g., 500, 600a, 600b, 600c) encountered. The location information may include coordinates such as latitude and longitude or other information that may be used to determine a location. In certain embodiments, the observation data for a given Wi-Fi access point (e.g., 500, 600a, 600b, 600c) may include one or more of the time, date, current location, speed, and direction of travel of the reporting wireless device 150 at or near the time of the encounter, and SSID, received signal strength, or other information pertaining to the Wi-Fi access point (e.g., 500, 600a, 600b, 600c) encountered. In addition, observation data may include any of the above-noted information from other in-range Wi-Fi access points (e.g., 500 or 600) encountered at or near the same time that the given Wi-Fi access point (e.g., 500, 600a, 600b, 600c) of interest was encountered. The observation data may be reported to an original equipment manufacturer of the wireless device 150, an operating system developer of an operating system executing on the wireless device 150, or third-party software developer that maintain a Wi-Fi AP Database (e.g., 1130 of FIG. 11), and/or a dedicated sensor and/or asset tracking database (e.g., 1110 of FIG. 11) of the present invention that is used to track sensors/assets. Mobile operating systems used on smartphones 150 typically include existing infrastructure to report observation data to the operating system developer's Wi-Fi AP Database (e.g., 1130 of FIG. 11) in the background without requiring awareness on the part of the user.

While a single wireless device 150 is depicted in the figure, one of ordinary skill in the art will recognize that any number of wireless devices 150 may come in and out of range of the sensors/assets 1020, 1030, 1040, 1050 over time, each of which may independently report observation data of in-range Wi-Fi access point (e.g., 500, 600a, 600b, 600c) they encounter (and other information that may be useful to the sensor and/or asset tracking task). In fact, the tracking accuracy may improve as a function of the number of observations that take place over time, or potentially provide additional information such as movement of sensors/assets 1020, 1030, 1040, 1050 throughout the day, or the speeds at which they are moving, or even when they leave a boundary of the job site 1050.

Continuing, FIG. 10B shows an example of observation data 1080 of one or more Wi-Fi access point (e.g., 500, 600a, 600b, 600c) reported by a wireless device (e.g., 150 of FIG. 10A) based on an encounter in accordance with one or more embodiments of the present invention. As previously discussed, wireless devices (e.g., 150 of FIG. 10A) may report, via a cellular or any other network connection, observation data. Each report of observation data may include, at least, unique identifying information, such as, for example, the BSSID, of one or more Wi-Fi access point (e.g., 500, 600a, 600b, 600c) encountered, sensor data, and in some embodiments, location information of the one or more Wi-Fi access point (e.g., 500, 600a, 600b, 600c) encountered. In certain embodiments, the observation data for a given Wi-Fi access point (e.g., 500, 600a, 600b, 600c) may include one or more of the time, date, current location, speed, and direction of travel of the reporting wireless device (e.g., 150 of FIG. 10A) at or near the time of the encounter, and SSID, received signal strength, or other information pertaining to the Wi-Fi access point (e.g., 500, 600a, 600b, 600c) encountered. In addition, observation data may include any of the above-noted information from other in-range Wi-Fi access points (e.g., 500 or 600) encountered at or near the same time that the given Wi-Fi access point (e.g., 500, 600a, 600b, 600c) of interest was encountered. The observation data may be reported directly to the sensor and/or asset tracking database (e.g., 1110 of FIG. 11) or to a Wi-Fi AP Database (e.g., 1130 of FIG. 11).

The unique identifying information may include any information that may be used to uniquely identify a Wi-Fi access point (e.g., 500, 600a, 600b, 600c) encountered including any unique fields of the beacon frames (e.g., 220 of FIG. 2C or 220s of FIG. 8), probe response frames (e.g., 240 of FIG. 2C or 240s of FIG. 8), or other management frames transmitted therefrom that may be used or repurposed to convey sensor data or other information regarding the Wi-Fi access point (e.g., 500, 600a, 600b, 600c) or the sensor/asset (e.g., 1020, 1030, 1040, 1050) associated therewith. For example, due to the unique nature of the BSSID, the BSSID of a Wi-Fi access point (e.g., 500, 600a, 600b, 600c) may be used to uniquely identify Wi-Fi access point (e.g., 500, 600a, 600b, 600c) encountered and a sensor/asset (e.g., 1020, 1030, 1040, 1050) it is physically disposed on, attached or, or integrated with and logically associated with in the sensor and/or asset tracking database (e.g., 1110 of FIG. 11). However, the MAC address, SSID, and/or other fields contained with the management frames may be used to further identify a Wi-Fi access point (e.g., 500, 600a, 600b, 600c) as a sensor and/or asset tracking type of Wi-Fi access point or otherwise exploited for use in the sensor and/or asset tracking task. One of ordinary skill in the art will recognize any information transmitted from a Wi-Fi access point (e.g., 500, 600a, 600b, 600c) as part of a beacon frame (e.g., 220 of FIG. 2C or 220s of FIG. 8), probe response frame (e.g., 240 of FIG. 2C or 240s of FIG. 8), or other management frame that may be used to uniquely identify the Wi-Fi access point (e.g., 500, 600*a*, 600*b*, 600*c*) may be used in accordance with one or more embodiments of the present invention.

The location information may include coordinates representing a location such as latitude and longitude reported for the Wi-Fi access point (e.g., 500, 600*a*, 600*b*, 600*c*) or any other information that may be used to determine the location of the Wi-Fi access point (e.g., 500, 600*a*, 600*b*, 600*c*). For example, other information that may be used to determine a location of a particular Wi-Fi access point (e.g., 500, 600*a*, 600*b*, 600*c*) may include RSSI, fingerprinting, angle of arrival, time of flight, or other data related to the Wi-Fi access point (e.g., 500, 600*a*, 600*b*, 600*c*) of interest or any information related to other nearby in-range Wi-Fi access points (e.g., 500 or 600) that facilitate positioning.

One of ordinary skill in the art will recognize that the type and kind of information reported by a reporting wireless device (e.g., 150 of FIG. 11) based on an encounter with a Wi-Fi access point (e.g., 500, 600*a*, 600*b*, 600*c*) may vary based on an application or design in accordance with one or more embodiments of the present invention, but must include at least unique identifying information of the encountered Wi-Fi access point (e.g., 500, 600*a*, 600*b*, 600*c*) and location information related thereto.

Continuing, FIG. 10C shows an example of asset data 1090 stored or generated by sensor and/or asset tracking database (e.g., 1110 of FIG. 11) in accordance with one or more embodiments of the present invention. Sensor and/or asset tracking database (e.g., 1110 of FIG. 11) may associate unique identifying information, such as, for example, the BSSID, of a particular Wi-Fi access point (e.g., 500 of FIG. 10A) with a particular asset (e.g., 1020 of FIG. 10A) on which it is disposed, attached to, or integrated with to identify the sensor/asset (e.g., 1020 of FIG. 10A). Once associated, sensor and/or asset tracking database (e.g., 1110 of FIG. 11) may use observation data that is reported, directly or indirectly, by one or more wireless devices (e.g., 150 of FIG. 11) that encounter the Wi-Fi access point (e.g., 500 of FIG. 10A) to passively track the sensor/asset (e.g., 1020 of FIG. 10A), in many instances without an awareness by wireless devices (e.g., 150 of FIG. 11), or users thereof, that they are participating in the asset tracking task.

Sensor and/or asset tracking database (e.g., 1110 of FIG. 11) may receive and store observation data obtained directly from a direct reporting wireless device (e.g., 150*a* of FIG. 11) that reports an encounter with a Wi-Fi access point (e.g., 500 or 600 of FIG. 11) or observation data obtained from a Wi-Fi AP Database (e.g., 1130 of FIG. 11). The observation data includes, at least, unique identifying information, such as, for example, the BSSID, of one or more Wi-Fi access point (e.g., 500 or 600 of FIG. 11) encountered and location information of the one or more Wi-Fi access point (e.g., 500 or 600 of FIG. 11) encountered. Senso and/or asset tracking database (e.g., 1110 of FIG. 11) may also store one or more of a last known location for a Wi-Fi access point (e.g., 500 of FIG. 10A) and sensor/asset (e.g., 1020 of FIG. 10A) associated therewith, a history of last known locations for the Wi-Fi access point (e.g., 500 of FIG. 10A) and sensor/asset (e.g., 1020 of FIG. 10A) associated therewith, and a current location for the Wi-Fi access point (e.g., 500 of FIG. 10A) and sensor/asset (e.g., 1020 of FIG. 10A) associated therewith. Sensor and/or asset tracking database (e.g., 1110 of FIG. 11) may also receive and store one or more of the time, date, current location, speed, and direction of travel of the reporting wireless device (e.g., 150 of FIG. 11) at or near the time of the encounter, and SSID, received signal strength, or other information pertaining to the Wi-Fi access point (e.g., 500 or 600 of FIG. 11) encountered. In addition, sensor and/or asset tracking database (e.g., 1110 of FIG. 11) may receive and store any of the above-noted information from other in-range Wi-Fi access points (e.g., 500 or 600) encountered at or near the same time that the Wi-Fi access point (e.g., 500 or 600 of FIG. 11) of interest was encountered.

In certain embodiments, sensor and/or asset tracking database (e.g., 1110 of FIG. 11) may determine a location for a moveable sensor/asset (e.g., 700 of FIG. 11) to be tracked based on the last known reported location of its associated Wi-Fi access point (e.g., 500 or 600 of FIG. 11). However, sensor and/or asset tracking database (e.g., 1010 of FIG. 11) may use one or more of historical data about the location of the Wi-Fi access point (e.g., 500 or 600 of FIG. 11), the times, dates, last known locations, and received signal strengths to the Wi-Fi access point (e.g., 500 or 600 of FIG. 11), and the times, dates, locations, last known locations, and received signal strengths to known Wi-Fi access points (e.g., 500 or 600) in the vicinity of the Wi-Fi access point (e.g., 500 or 600 of FIG. 11) of interest. Depending on the information available, well known GPS, Wi-Fi, location services, trilateration, triangulation, and any other positioning techniques may be used to determine or refine the accuracy of the location determination of the particular Wi-Fi access point (e.g., 500 or 600 of FIG. 11) of interest and, by association, the location of the sensor/asset (e.g., 700 of FIG. 11). As such, sensor and/or asset tracking database (e.g., 1110 of FIG. 11) may develop a historical trend of location and potentially other information relating to the particular sensor/asset (e.g., 700 of FIG. 11) over a period of time. Thus, tracking accuracy may increase based on the number of observations obtained by the sensor and/or asset tracking database (e.g., 1110 of FIG. 11).

For purposes of example, sensor and/or asset tracking database (e.g., 1110 of FIG. 11) may include a data structure that includes a time, a date, a GPS or current location, for example, a latitude ("GPS LAT") and a longitude ("GPS LNG"), SSID, BSSID, and a received signal strength of an discovered conventional Wi-Fi access point (e.g., 500 of FIG. 11) or pseudo Wi-Fi access point (e.g., 600 of FIG. 11) as part of each report, received directly or indirectly, from a wireless device (e.g., 150 of FIG. 11) that encounters an in-range conventional Wi-Fi access point (e.g., 500 of FIG. 11) or pseudo Wi-Fi access point (e.g., 600 of FIG. 11). The BSSID of the discovered conventional Wi-Fi access point (e.g., 500 of FIG. 11) or pseudo Wi-Fi access point (e.g., 600 of FIG. 11) may be associated with, or used to reference, a particular sensor/asset (e.g., 700) being tracked within sensor and/or asset tracking database (e.g., 1110 of FIG. 11). Sensor and/or asset tracking database (e.g., 1110 of FIG. 11) may receive, calculate, or estimate a last known ("AP LK") position of the discovered Wi-Fi access point (e.g., 500 or 600 of FIG. 11). If a last know position of a Wi-Fi access point (e.g., 500 or 600 of FIG. 11) is not known, it may be estimated by the GPS or current location of the most recent wireless device (e.g., 150 of FIG. 11) that reported an observation of Wi-Fi access point (e.g., 500 or 600 of FIG. 11) or determined or further refined with well-known positioning techniques. Sensor and/or asset tracking database (e.g., 1110 of FIG. 11) may, based on available information, calculate a current ("AP CUR") location for one or more Wi-Fi access point (e.g., 500 or 600 of FIG. 11), and by relation, the associated sensors/assets (e.g., 700 of FIG. 11) thereof. One of ordinary skill in the art will appreciate that calculating a location based on the last known location of one or more Wi-Fi access points (e.g., 500 or 600), if any, the GPS or current locations of one or more wireless devices (e.g., 150 of FIG. 11) reporting the encounter with the Wi-Fi access point (e.g., 500 or 600 of FIG. 11), if available, and their relative received signal strengths, and potentially other information relating thereto, may be used to determine and/or refine the location determination of one or more Wi-Fi access point (e.g., 500 or 600 of FIG. 11), and sensors/assets (e.g., 700 of FIG. 11) associated therewith, using well-known positioning and location refinement techniques. The calculated current location may be stored in a sensor and/or asset tracking database (e.g., 1110 of FIG. 11) as the best estimate of where a particular Wi-Fi access point (e.g., 500 or 600 of FIG. 11), and by relation, the associated sensor/asset (e.g., 700 of FIG. 11) may be located. The accuracy of the location determination may be enhanced with more observations by other wireless devices (e.g., 150) that come into range of the Wi-Fi access point (e.g., 500 or 600 of FIG. 11) over time.

One of ordinary skill in the art will recognize that sensor and/or asset tracking database (e.g., 1110 of FIG. 11) may receive, generate, or store any other relevant data relating to a Wi-Fi access point (e.g., 500 or 600 of FIG. 11), a sensor/asset (e.g., 700 of FIG. 11) associated therewith, or any other information relevant to the asset tracking task based on an application or design in accordance with one or more embodiments of the present invention.

Figure 10D:
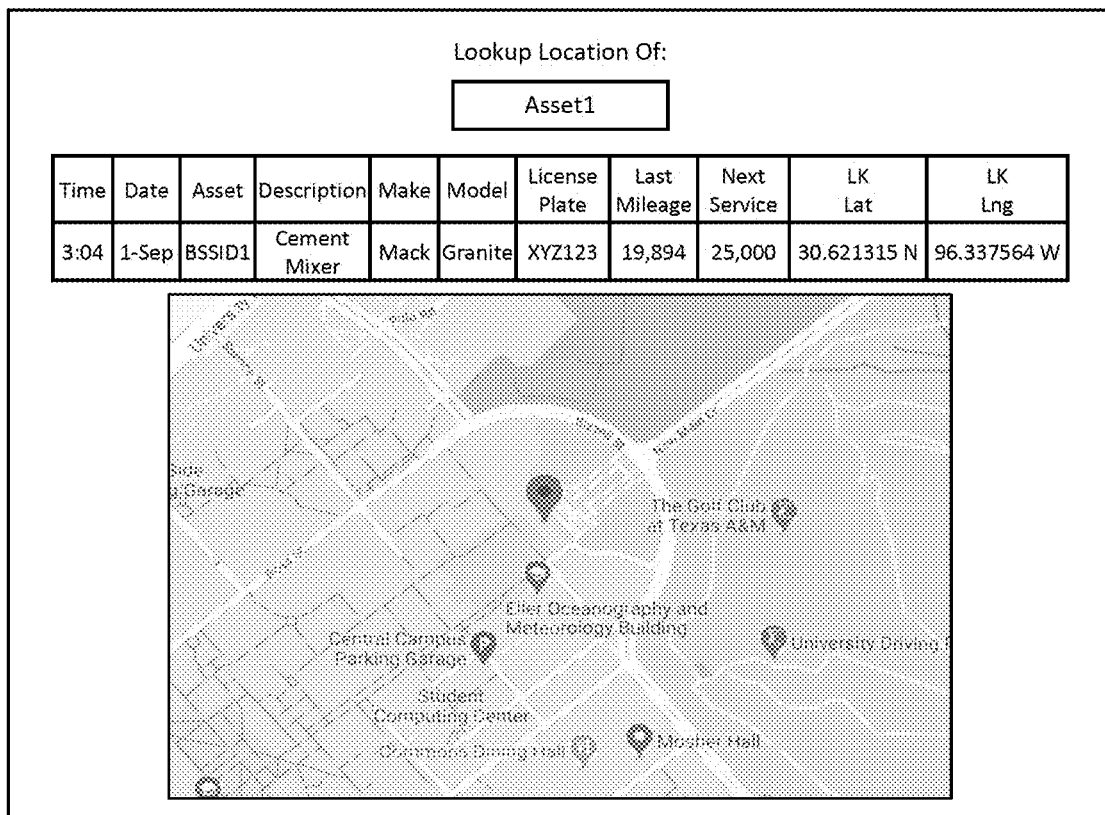
FIG. 10D shows an example of a client portal to a sensor and/or asset tracking database in accordance with one or more embodiments of the present invention.

FIG. 10D shows an example of a client portal 1120 to a sensor and/or asset tracking database (e.g., 1110 of FIG. 11) in accordance with one or more embodiments of the present invention. A user (not shown) may access the data contained within sensor and/or asset tracking database (e.g., 1110 of FIG. 11) via client portal 1120. Client portal 1120 may provide the user with the ability to access at least some of the data stored in sensor and/or asset tracking database (e.g., 1110 of FIG. 11). For example, a user may inquire as to the value of sensor data or a location of a specific sensor/asset, such as, for example, Asset1, which is a cement mixer truck. Client portal 1120 lodges the query with sensor and/or asset tracking database (e.g., 1110 of FIG. 11), receives the requested data, which in this case, may include the unique identifying information of the asset (e.g., 1120 of FIG. 11) as well as its last known location and optionally a map showing the last known location. One of ordinary skill in the art will recognize that the interface, interaction with, and display of, data by client portal 1120 may vary based on an application or design in accordance with one or more embodiments of the present invention.

FIG. 11 shows a system 1100 for passive sensor and/or asset tracking using observations of one or more Wi-Fi access point 500 or 600 in accordance with one or more embodiments of the present invention. The system 1100 may include a software application comprising a sensor and/or asset tracking database 1110 executing on a computing system 1200 and a client portal 1120 that provides sensor and/or asset tracking clients (not shown) access to data stored in sensor and/or asset tracking database 1110.

In certain embodiments, sensor and/or asset tracking database 1110 may be a database software application comprising a backend that performs housekeeping software functions, a database management system ("DBMS") that provides data processing functions, a data store (the literal database) that contains observation and other data, one or more administrative interfaces, and one or more other interfaces to the data contained in database 1110. One of ordinary skill in the art will recognize that sensor and/or asset tracking database 1110 may include other software, functions, and features, well known in the art, necessary to deploy a database-type application in accordance with one or more embodiments of the present invention. In certain embodiments, client portal 1120 may be a web-based portal (not independently illustrated) that provides access to data stored in sensor and/or asset tracking database 1110. In other embodiments, client portal 1120 may be a stand-alone software application (not independently illustrated) that provides access to data stored in sensor and/or asset tracking database 1110. In still other embodiments, client portal 1120 may be an interface integrated with sensor and/or asset tracking database 1110 to provide frontend access to sensor and/or asset tracking database 1110. One of ordinary skill in the art will recognize that client portal 1120 may include other software, functions, and features, well known in the art, necessary to access and use data contained in the database in accordance with one or more embodiments of the present invention.

At the outset, it is important to recognize that everything depicted to the right of the symbolic line of demarcation 1140 in the figure (included solely to enhance understanding), with the exception of conventional Wi-Fi access point 500 or pseudo Wi-Fi access point 600 disposed on, attached to, or integrated with sensor 720, represents existing infrastructure representative of the smartphone ecosystem of users and infrastructure. The behavior of the wireless devices (e.g., 150) that participate in this ecosystem, including their inherent reporting features of Wi-Fi access points encountered, may be leveraged to passively track assets, potentially without awareness, in accordance with one or more embodiments of the present invention. Importantly, wireless devices (e.g., 150) cannot distinguish between a conventional Wi-Fi access point (e.g., 500) and a pseudo Wi-Fi access point (e.g., 600) with respect to the identification of Wi-Fi wireless networks and associated Wi-Fi access points.

In certain embodiments, sensor and/or asset tracking database 1110 may obtain observation data indirectly from a third-party Wi-Fi AP Database 1130 that receives observations from one or more wireless devices (e.g., 150*b*, 150*c*, 150*d*), typically based on reports of observation data used to improve the accuracy of location services. In such embodiments, Wi-Fi AP Database 1130 may be a database independently established, operated, and maintained separate and apart from sensor and/or asset tracking database 1110 by an original equipment manufacturer of a wireless device (e.g., 150), an operating system developer of an operating system executing on a wireless device (e.g., 150), or a third-party software developer. For example, in certain embodiments, Wi-Fi AP Database 1130 may be Apple® iOS®, Google® Android®, or Microsoft® location-based services databases typically used to improve location determination accuracy for their respective end users. In other embodiments, Wi-Fi AP Database 1130 may be a database of observations including the unique identifying information of Wi-Fi access points (e.g., 500 or 600 of FIG. 11) and information relating to the locations of Wi-Fi access points (e.g., 500 or 600 of FIG. 11) that are commercially offered by third-parties including, for example Cisco Systems®, Facebook®, WhatsApp®, XMode®, Ruckus®, and Skyhook®. One or more wireless devices (e.g., 150*a*) may report observation data to Wi-Fi AP Database 1130 for storage in their database and sensor and/or asset tracking database 1110 may obtain observation data from Wi-Fi AP Database 1130 for use with the asset tracking task, without requiring an awareness on the part of the Wi-Fi AP Database 1130, the reporting wireless devices (e.g., 150*b*, 150*c*,

150*d*), or users thereof, that they are participating in the asset tracking task. The observation data reported to the Wi-Fi AP Database 1130 and the observation data obtained by the sensor and/or asset tracking database 1110 may or may not be the same, but the observation data obtained by sensor and/or asset tracking database 1110 includes at least the unique identifying information and location information of a Wi-Fi access point (e.g., 500 or 600 of FIG. 11) encountered that is associated with a sensor/asset 720. As such, observation data obtained by sensor and/or asset tracking database 1110 may be subset, superset, or different that observation data stored by Wi-Fi AP Database 1130 in accordance with one or more embodiments of the present invention.

In other embodiments, sensor and/or asset tracking database 1110 may obtain observation data directly from one or more direct reporting wireless devices (e.g., 150*a*) and may also obtain observation data from Wi-Fi AP Database 1130, that receives observations from one or more indirect reporting wireless devices (e.g., 150*b*, 150*c*, 150*d*). In such hybrid embodiments, observation data may be reported directly to sensor and/or asset tracking database 1110 and/or reported indirectly to sensor and/or asset tracking database 1110 by way of Wi-Fi AP Database 1130. Sensor and/or asset tracking database 1110 may give preference to, or value, observation data reported directly differently from observation data reported indirectly. The preference may be used in the location determination made by sensor and/or asset tracking database 1110.

In still other embodiments, sensor and/or asset tracking database 1110 may obtain observation data directly from one or more direct reporting wireless devices (e.g., 150*a*). In such embodiments, one or more wireless devices (e.g., 150*a*) may report observation data directly to sensor and/or asset tracking database 1110 for use in the asset tracking task. The report of observation data may be received and processed as discussed in more detail herein and stored in sensor and/or asset tracking database 1110, which may serve as the functional equivalent, and in lieu of, a Wi-Fi AP Database 1130.

For purposes of illustration, one or more Wi-Fi access point (e.g., 500 or 600 of FIG. 11) may be disposed on, attached to, or integrated with one or more moveable sensors/assets (e.g., 700) that are desired to be tracked. The unique identifying information of a Wi-Fi access point (e.g., 500 or 600 of FIG. 11) may be used to uniquely identify a sensor/asset 700 that it is physically and logically associated with the sensor 700 in the sensor and/or asset tracking database 1110. The one or more sensors/assets 700 may then be deployed in the field and need not be co-located. Advantageously, the deployed Wi-Fi access points (e.g., 500 or 600 of FIG. 11) do not require any network or communication connectivity of any kind, nor are they required to receive GPS signals, they simply must either broadcast conventional or pseudo beacon frames (e.g., 220 of FIG. 2C or 220*s* of FIG. 8) or respond to probe request frames (e.g., 230 of FIG. 2C) with conventional or pseudo probe response frames (e.g., 240 of FIG. 2C or 240*s* of FIG. 8) as part of the Wi-Fi wireless network discovery process, each frame of which includes unique identifying information of the conventional Wi-Fi access point 500 or pseudo Wi-Fi access point 600, depending on a given application.

When one or more wireless devices (e.g., 150) come into range of one or more Wi-Fi access point (e.g., 500 or 600 of FIG. 11) disposed on, attached to, or integrated with one or more sensors/assets 700, each in-range Wi-Fi access point (e.g., 500 or 600 of FIG. 11) may either broadcast, conventional or pseudo, their respective beacon frame (e.g., 220 of FIG. 2C or 220*s* of FIG. 8) or respond to a probe request frame (e.g., 230 of FIG. 2C) with a probe response frame (e.g., 240 of FIG. 2C or 240*s* of FIG. 8), each of which includes information that may be used by sensor and/or asset tracking database 1110 to uniquely identify the Wi-Fi access point (e.g., 500 or 600 of FIG. 11) and other information that may be useful to the asset tracking task, including custom use of certain information in the beacon frame (e.g., 220 of FIG. 2C or 220*s* of FIG. 8) or probe response frame (e.g., 240 of FIG. 2C or 240*s* of FIG. 8). The one or more wireless devices 150 may report observation data of the in-range Wi-Fi access point (e.g., 500 or 600 of FIG. 11) encountered directly to the sensor and/or asset tracking database 1110 and/or to the Wi-Fi AP Database 1130 based on an application or design.

As previously discussed, wireless devices 150 report, via a cellular or other connection, observation data. Observation data includes, at least, unique identifying information, such as, for example, the BSSID, of the one or more Wi-Fi access point (e.g., 500 or 600 of FIG. 11) encountered and location information of the one or more Wi-Fi access point (e.g., 500 or 600 of FIG. 11) encountered. The location information may include coordinates such as latitude and longitude or other information that may be used to determine a location of a Wi-Fi access point (e.g., 500 or 600 of FIG. 11) encountered. In certain embodiments, the observation data for a given Wi-Fi access point (e.g., 500 or 600 of FIG. 11) may include one or more of the time, date, current location, speed, and direction of travel of the reporting wireless device 150 at or near the time of the encounter, and SSID, received signal strength, or other information pertaining to the Wi-Fi access point (e.g., 500 or 600 of FIG. 11) encountered. In addition, observation data may include any of the above-noted information from other in-range Wi-Fi access points (e.g., 500 or 600) encountered at or near the same time that the given Wi-Fi access point (e.g., 500 or 600 of FIG. 11) of interest was encountered. In some cases, the current location of the reporting wireless device 150 at or near the time of the encounter may be used, potentially in combination with other information, to establish a location of an encountered Wi-Fi access point (e.g., 500 or 600 of FIG. 11) as of the time and date of the encounter.

The observation data may be reported directly to a Wi-Fi AP Database 1130 maintained by an original equipment manufacturer of the wireless device 150, an operating system developer of an operating system executing on the wireless device 150, or third-party software developer and/or a dedicated sensor and/or asset tracking database 1110 of the present invention that is used to track assets. The one or more wireless devices 150 may report their encounter with in-range Wi-Fi access point (e.g., 500 or 600 of FIG. 11) at approximately the time of the encounter or at a later time if a wireless device 150 does not have network capabilities at the time of the encounter. Sensor and/or asset tracking database 1110 may use observation data obtained directly from one or more wireless devices (e.g., 150*a*) and/or data obtained from Wi-Fi AP Database 1130 (e.g., originating from 150*b*, 150*c*, 150*d*) to identify and locate one or more sensors/assets (e.g., 700), the data of which may be stored in sensor and/or asset tracking database 1110. Depending on the type of data received, sensor and/or asset tracking database 1110 may manipulate, extrapolate, or generate additional data stored therein based on available relevant information.

While various embodiments of system 1200 have been disclosed, one of ordinary skill in the art will recognize that a subset, superset, or combination of functions or features thereof, may be integrated, distributed, or excluded, in whole or in part, based on an application or design in accordance with one or more embodiments of the present invention and the disclosure is not intended to limit the types, kinds, or arrangements of system 1200 that may be implemented, including those that include, integrate, distribute, separate, or exclude various aspects or features in accordance with one or more embodiments of the present invention.

Figure 12:
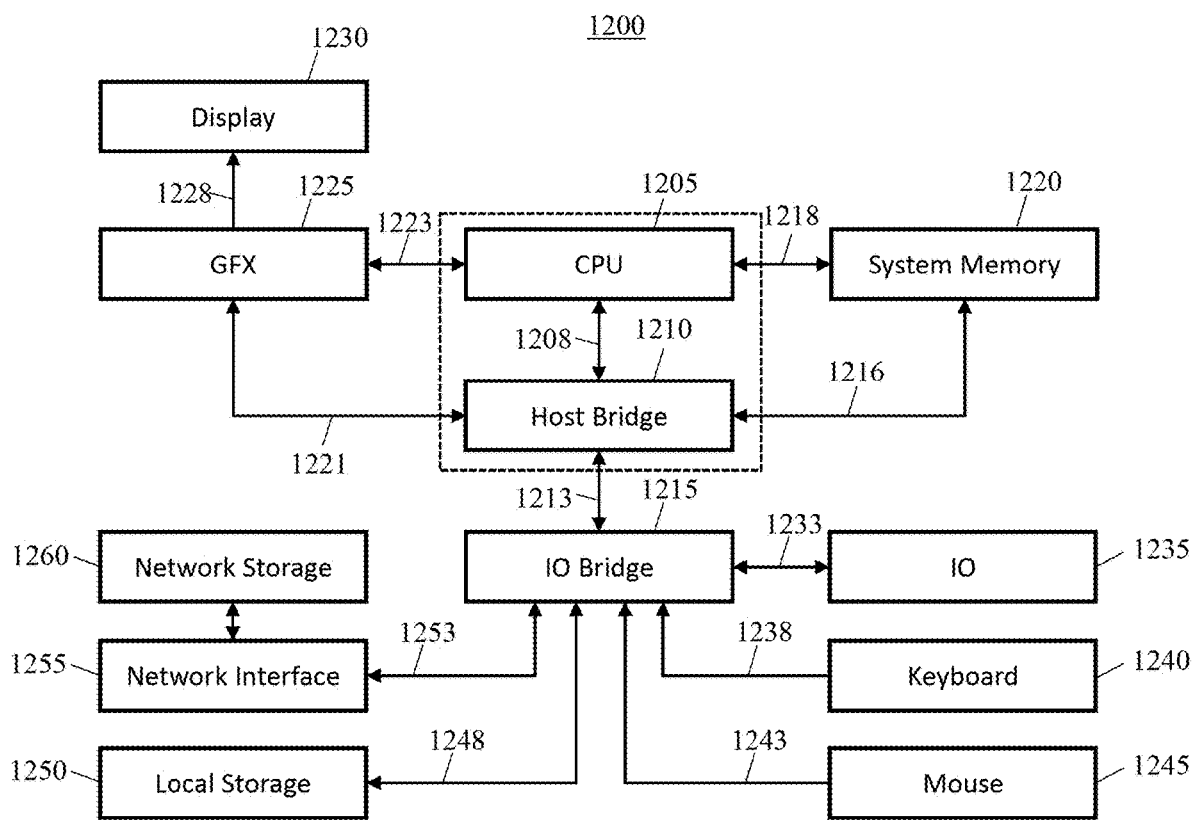
FIG. 12 shows a computing system in accordance with one or more embodiments of the present invention.

FIG. 12 shows a computing system 1200 in accordance with one or more embodiments of the present invention. One or more of sensor and/or asset tracking database (e.g., 1110 of FIG. 11) and client portal (e.g., 1120 of FIG. 11) may be software applications containing software instructions that, when executed by a processor of one or more computing systems 1200, perform one or more of the methods described herein. One of ordinary skill in the art will recognize that a computing system 1200 disclosed herein is merely exemplary of a computing system that may be used to execute any of the above-noted software methods and other computing systems that are well known in the art may be used in accordance with one or more embodiments of the present invention.

Computing system 1200 may include one or more central processing units, sometimes referred to as processors (hereinafter referred to in the singular as "CPU" or plural as "CPUs") 1205, host bridge 1210, input/output ("IO") bridge 1215, graphics processing units (singular "GPU" or plural "GPUs") 1225, and/or application-specific integrated circuits (singular "ASIC or plural "ASICs") (not shown) disposed on one or more printed circuit boards (not shown) that perform computational operations. Each of the one or more CPUs 1205, GPUs 1225, or ASICs (not shown) may be a single-core (not independently illustrated) device or a multi-core (not independently illustrated) device. Multi-core devices typically include a plurality of cores (not shown) disposed on the same physical die (not shown) or a plurality of cores (not shown) disposed on multiple die (not shown) that are collectively disposed within the same mechanical package (not shown).

CPU 1205 may be a general-purpose computational device typically configured to execute software instructions. CPU 1205 may include an interface 1208 to host bridge 1210, an interface FIG to system memory 1220, and an interface 1223 to one or more IO devices, such as, for example, one or more GPUs 1225. GPU 1225 may serve as a specialized computational device typically configured to perform graphics functions related to frame buffer manipulation. However, one of ordinary skill in the art will recognize that GPU 1225 may be used to perform non-graphics related functions that are computationally intensive. In certain embodiments, GPU 1225 may interface 1223 directly with CPU 1205 (and interface 1218 with system memory 1220 through CPU 1205). In other embodiments, GPU 1225 may interface 1221 with host bridge 1210 (and interface 1216 or 1218 with system memory 1220 through host bridge 1210 or CPU 1205 depending on the application or design). In still other embodiments, GPU 1225 may interface 1233 with IO bridge 1215 (and interface 1216 or 1218 with system memory 1220 through host bridge 1210 or CPU 1205 depending on the application or design). The functionality of GPU 1225 may be integrated, in whole or in part, with CPU 1205.

Host bridge 1210 may be an interface device that interfaces between the one or more computational devices and IO bridge 1215 and, in some embodiments, system memory 1220. Host bridge 1210 may include an interface 1208 to CPU 1205, an interface 1213 to IO bridge 1215, for embodiments where CPU 1205 does not include an interface 1218 to system memory 1220, an interface 1216 to system memory 1220, and for embodiments where CPU 1205 does not include an integrated GPU 1225 or an interface 1223 to GPU 1225, an interface 1221 to GPU 1225. The functionality of host bridge 1210 may be integrated, in whole or in part, with CPU 1205. IO bridge 1215 may be an interface device that interfaces between the one or more computational devices and various IO devices (e.g., 1240, 1245) and IO expansion, or add-on, devices (not independently illustrated). IO bridge 1215 may include an interface 1213 to host bridge 1210, one or more interfaces 1233 to one or more IO expansion devices 1235, an interface 1238 to keyboard 1240, an interface 1243 to mouse 1245, an interface 1248 to one or more local storage devices 1250, and an interface 1253 to one or more network interface devices 1255. The functionality of IO bridge 1215 may be integrated, in whole or in part, with CPU 1205 and/or host bridge 1210. Each local storage device 1250, if any, may be a solid-state memory device, a solid-state memory device array, a hard disk drive, a hard disk drive array, or any other non-transitory computer readable medium. Network interface device 1255 may provide one or more network interfaces including any network protocol suitable to facilitate networked communications.

Computing system 1200 may include one or more network-attached storage devices 1260 in addition to, or instead of, one or more local storage devices 1250. Each network-attached storage device 1260, if any, may be a solid-state memory device, a solid-state memory device array, a hard disk drive, a hard disk drive array, or any other non-transitory computer readable medium. Network-attached storage device 1260 may or may not be collocated with computing system 1200 and may be accessible to computing system 1200 via one or more network interfaces provided by one or more network interface devices 1255.

One of ordinary skill in the art will recognize that computing system 1200 may be a conventional computing system or an application-specific computing system (not shown). In certain embodiments, an application-specific computing system (not shown) may include one or more ASICs (not shown) that perform one or more specialized functions in a more efficient manner. The one or more ASICs (not shown) may interface directly with CPU 1205, host bridge 1210, or GPU 1225 or interface through IO bridge 1215. Alternatively, in other embodiments, an application-specific computing system (not shown) may be reduced to only those components necessary to perform a desired function in an effort to reduce one or more of chip count, printed circuit board footprint, thermal design power, and power consumption. The one or more ASICs (not shown) may be used instead of one or more of CPU 1205, host bridge 1210, IO bridge 1215, or GPU 1225. In such systems, the one or more ASICs may incorporate sufficient functionality to perform certain network and computational functions in a minimal footprint with substantially fewer component devices.

As such, one of ordinary skill in the art will recognize that CPU 1205, host bridge 1210, IO bridge 1215, GPU 1225, or ASIC (not shown) or a subset, superset, or combination of functions or features thereof, may be integrated, distributed, or excluded, in whole or in part, based on an application, design, or form factor in accordance with one or more embodiments of the present invention. Thus, the description of computing system 1200 is merely exemplary and not intended to limit the type, kind, or configuration of component devices that constitute a computing system 1200 suitable for executing software methods in accordance with one or more embodiments of the present invention. Notwithstanding the above, one of ordinary skill in the art will recognize that computing system 1200 may be a standalone, laptop, desktop, industrial, server, blade, or rack mountable system and may vary based on an application or design.

In one or more embodiments of the present invention, a method of passive sensor tracking may only use observations of conventional Wi-Fi access points (e.g., 500 of FIG. 7A) or pseudo Wi-Fi access points (e.g., 600 of FIG. 7A) received from a Wi-Fi AP Database (e.g., 1130 of FIG. 11). A conventional Wi-Fi access point (e.g., 500 of FIG. 7A) or a pseudo Wi-Fi access point (e.g., 600 of FIG. 7A) may transmit a management frame (e.g., 300 of FIG. 7B) that includes sensor data of a sensor (e.g., 710 of FIG. 7A) as part of Wi-Fi wireless network discovery.

In one or more embodiments of the present invention, Wi-Fi AP Database (e.g., 1130 of FIG. 11) may be a database of observation data reported by one or more reporting wireless devices (e.g., 150b, 150c, 150d of FIG. 11) of one or more Wi-Fi access points (e.g., 500 or 600 of FIG. 7A) encountered. The observation data reported may include the unique identifying information of the one or more Wi-Fi access points (e.g., 500 or 600 of FIG. 7A) encountered and additional data associated therewith, potentially including sensor data and/or location information of the one or more Wi-Fi access points (e.g., 500 or 600 of FIG. 7A) encountered. A Wi-Fi AP Database (e.g., 1130 of FIG. 11) may be established, operated, and maintained separate and apart from a sensor and/or asset tracking database (e.g., 1110 of FIG. 11). In certain embodiments, a Wi-Fi AP Database (e.g., 1130 of FIG. 11) may be a database of observation data maintained by an original equipment manufacturer of a wireless device (e.g., 150 of FIG. 11). In other embodiments, a Wi-Fi AP Database (e.g., 1130 of FIG. 11) may be a database of observation data maintained by an operating system developer of an operating system executing on a wireless device (e.g., 150 of FIG. 11). For example, the Wi-Fi AP Database (e.g., 1130 of FIG. 11) may be an Apple® iOS®, Google® Android®, or Microsoft® location services database typically used to improve the location determination accuracy for their respective end users. In still other embodiments, a Wi-Fi AP Database (e.g., 1130 of FIG. 11) may be a database of observation data maintained by a software developer. For example, the Wi-Fi AP Database (e.g., 1130 of FIG. 11) may be a database of observation data commercially offered by Cisco Systems®, Facebook®, WhatsApp®, XMode®, Ruckus®, and Skyhook®. In still other embodiments, Wi-Fi AP Database (e.g., 1130 of FIG. 11) may be any other type or kind of database of observation data in accordance with one or more embodiments of the present invention.

For the purpose of this disclosure, a conventional Wi-Fi access point (e.g., 500 of FIG. 7A) or a pseudo Wi-Fi access point (e.g., 600 of FIG. 7A) point that spoofs, or emulates, at least portions of the Wi-Fi wireless network discovery process may be used. Notwithstanding, one of ordinary skill in the art will recognize that any type or kind of device capable of spoofing, or emulating, at least portions of the Wi-Fi network discovery process by either broadcasting beacon frames (e.g., 220 of FIG. 2C) or probe response frames (e.g., 240 of FIG. 2C) may be used in accordance with one or more embodiments of the present invention.

The method may include associating unique identifying information of a Wi-Fi access point (e.g., 500 or 600 of FIG. 7A) with a sensor (e.g., 710 of FIG. 7A) in an sensor and/or asset tracking database (e.g., 1110 of FIG. 11). The Wi-Fi access point-coupled sensor system (e.g., 700 of FIG. 7A) may be disposed on, attached to, or otherwise integrated with an asset or placed in a location where sensing is desired. The unique identifying information may be any information that uniquely identifies the Wi-Fi access point (e.g., 500 or 600 of FIG. 7A) including, for example, the BSSID of the Wi-Fi access point (e.g., 500 or 600 of FIG. 7A). The unique identifying information may be entered into the sensor and/or asset tracking database (e.g., 1110 of FIG. 11) and logically associated with the sensor (e.g., 710 of FIG. 7A) for purposes of participating in the sensor and/or asset tracking task. In addition, any other information relating to the Wi-Fi access point (e.g., 500 or 600 of FIG. 7A), sensor (e.g., 710 of FIG. 7A), or potentially asset may be stored in the same or a related record of the sensor and/or asset tracking database (e.g., 1110 of FIG. 11).

The method may include receiving, at the sensor and/or asset tracking database (e.g., 1110 of FIG. 11), observation data (e.g., 940 of FIG. 9C) from a Wi-Fi AP Database (e.g., 1130 of FIG. 11) comprising the unique identifying information of the Wi-Fi access point (e.g., 500 or 600 of FIG. 7A), sensor data, and in some embodiments, location information of the Wi-Fi access point (e.g., 500 or 600 of FIG. 7A). The Wi-Fi AP Database (e.g., 1130 of FIG. 11) may receive observation data from one or more wireless devices (e.g., 150b, 150c, and 150d of FIG. 11) that encounter the Wi-Fi access point (e.g., 500 or 600 of FIG. 7A) and report unique identifying information of the Wi-Fi access point (e.g., 500 or 600 of FIG. 7A), sensor data, and in some embodiments, location information of the Wi-Fi access point (e.g., 500 or 600 of FIG. 7A) to the Wi-Fi AP Database (e.g., 1130 of FIG. 11). In certain embodiments, the location information of the Wi-Fi access point (e.g., 500 or 600 of FIG. 7A) may comprise a latitude and a longitude of the Wi-Fi access point (e.g., 500 or 600 of FIG. 7A). In other embodiments, the location information of the Wi-Fi access point (e.g., 500 or 600 of FIG. 7A) may comprise a latitude and a longitude of the reporting wireless device (e.g., 150b, 150c, 150d of FIG. 11) at or near the time of its encounter with the Wi-Fi access point (e.g., 500 or 600 of FIG. 7A) of interest. In still other embodiments, the location information of the Wi-Fi access point (e.g., 500 or 600 of FIG. 7A) may comprise a received signal strength of the Wi-Fi access point (e.g., 500 or 600 of FIG. 7A) measured by the reporting wireless device (e.g., 150b, 150c, or 150d of FIG. 11) at or near the time of its encounter with the Wi-Fi access point (e.g., 500 or 600 of FIG. 7A) of interest. In still other embodiments, the location information of the Wi-Fi access point (e.g., 500 or 600 of FIG. 7A) may comprise a latitude and a longitude of one or more other Wi-Fi access points (e.g., other nearby 500 or 600 not shown in FIG. 11) near the Wi-Fi access point (e.g., 500 or 600 of FIG. 7A) at or near the time of a reporting wireless device's (e.g., 150b, 150c, 150d of FIG. 11) encounter with the Wi-Fi access point (e.g., 500 or 600 of FIG. 7A). In still other embodiments, the location information of the Wi-Fi access point (e.g., 500 or 600 of FIG. 7A) may comprise a location, a received signal strength, any of the above-noted information, or any other information related to one or more other Wi-Fi access points (e.g., other nearby 500 or 600 not shown in FIG. 11) near the Wi-Fi access point (e.g., 500 or 600 of FIG. 7A) at or near the time of a reporting wireless device's (e.g., 150b, 150c, 150d of FIG. 11) encounter with the Wi-Fi access point (e.g., 500 or 600 of FIG. 7A).

The method may include storing the sensor data in the sensor and/or asset tracking database (e.g., 1110 of FIG. 11). The method may include providing a user access to sensor data in the sensor and/or asset tracking database (e.g., 1110 of FIG. 11). The method may include determining, by the sensor and/or asset tracking database (e.g., 1110 of FIG. 11), a location of the sensor (e.g., 710 of FIG. 7A) based, at least in part, on observation data of the Wi-Fi access point (e.g., 500 or 600 of FIG. 7A). In certain embodiments, determining the location of the sensor (e.g., 710 of FIG. 7A) may include using a latitude and longitude of Wi-Fi access point (e.g., 500 or 600 of FIG. 7A) as the location of the sensor (e.g., 710 of FIG. 7A). In other embodiments, determining the location of the sensor (e.g., 710 of FIG. 7A) may include using a latitude and longitude of a reporting wireless device (e.g., 150*b*, 150*c*, 150*d* of FIG. 11) at or near the time of its encounter with Wi-Fi access point (e.g., 500 or 600 of FIG. 7A) as the location of the sensor (e.g., 710 of FIG. 7A). In still other embodiments, determining the location of the sensor (e.g., 710 of FIG. 7A) may include using a received signal strength of the Wi-Fi access point (e.g., 500 or 600 of FIG. 7A) measured by a reporting wireless device (e.g., 150*b*, 150*c*, or 150*d* of FIG. 11) at or near the time of its encounter with the Wi-Fi access point (e.g., 500 or 600 of FIG. 7A) to determine the location of sensor (e.g., 710 of FIG. 7A). Using well-known Wi-Fi positioning techniques, the received signal strength may be used to determine or enhance the location determination of the Wi-Fi access point (e.g., 500 or 600 of FIG. 7A). For example, the received signal strength may be used to determine a radius of a location of a reporting wireless device (e.g., 150*b*, 150*c*, or 150*d* of FIG. 11) which may be used by itself or in combination with other location information to determine or enhance the location determination of the Wi-Fi access point (e.g., 500 or 600 of FIG. 7A). In still other embodiments, determining the location of the sensor (e.g., 710 of FIG. 7A) may include using a latitude and longitude of one or more other Wi-Fi access points (e.g., other nearby 500 or 600 not shown in FIG. 11) encountered by a reporting wireless device (e.g., 150*b*, 150*c*, 150*d* of FIG. 11) at or near the time of its encounter with the Wi-Fi access point (e.g., 500 or 600 of FIG. 7A) to determine the location of the sensor (e.g., 710 of FIG. 7A). Using well known Wi-Fi positioning techniques, the locations of nearby Wi-Fi access points (e.g., other nearby 500 or 600 not shown in FIG. 11) may be used alone or in combination to determine or enhance the location determination of the Wi-Fi access point (e.g., 500 or 600 of FIG. 7A). In still other embodiments, determining the location of the sensor (e.g., 710 of FIG. 7A) may include using a location, a received signal strength, any of the above-noted information, or any other information related to one or more other Wi-Fi access points (e.g., other nearby 500 or 600 not shown in FIG. 11) near the Wi-Fi access point (e.g., 500 or 600 of FIG. 7A) at or near the time of a reporting wireless device's (e.g., 150*b*, 150*c*, 150*d* of FIG. 11) encounter with the Wi-Fi access point (e.g., 500 or 600 of FIG. 7A) to determine the location of the sensor (e.g., 710 of FIG. 7A). Using well known Wi-Fi positioning techniques, the received signal strengths of nearby Wi-Fi access points (e.g., other nearby 500 or 600 not shown in FIG. 11) may be used alone or in combination to determine or enhance the location determination of the Wi-Fi access point (e.g., 500 or 600 of FIG. 7A).

One of ordinary skill in the art will recognize that historical location information, reporting wireless device (e.g., 150*b*, 150*c*, 150*d* of FIG. 11) location information, conventional Wi-Fi access point (e.g., 500 of FIG. 7A) or pseudo Wi-Fi access point (e.g., 600 of FIG. 7A) location information, other nearby Wi-Fi access point (e.g., other nearby 500 or 600 not shown in FIG. 11) location information, received signal strength of the Wi-Fi access point (e.g., 500 or 600 of FIG. 7A) location information, received signal strength of other nearby Wi-Fi access point (e.g., other nearby 500 or 600 not shown in FIG. 11) location information, and any other information may be used, alone or in combination, with known positioning techniques, including, but not limited to, smartphone positioning, network-based positioning, hybrid positioning, GPS positioning, cellular positioning, Wi-Fi positioning, triangulation, trilateration, time of arrival, angle of arrival, and any other positioning technique or combination thereof may be used in accordance with one or more embodiments of the present invention. Further, one of ordinary skill in the art will recognize that the positioning technique(s) used may vary based on the type or kind of observation data available at the time of the location determination.

The method may further include storing the location of the sensor (e.g., 710 of FIG. 7A) in the sensor and/or asset tracking database (e.g., 1110 of FIG. 11). The method may further include providing a user access, via a client portal (e.g., 1120 of FIG. 11), to the location of the sensor (e.g., 710 of FIG. 7A) stored in the sensor and/or asset tracking database (e.g., 1110 of FIG. 11). In certain embodiments, a client portal (e.g., 1120 of FIG. 11) may include a software interface for querying and receiving information from the sensor and/or asset tracking database (e.g., 1110 of FIG. 11). The client portal (e.g., 1120 of FIG. 11) may be part of the same computing system as that of the sensor and/or asset tracking database (e.g., 1010 of FIG. 10A) or a separate and distinct computing system (e.g., 1200 of FIG. 12) or wireless device (e.g., 150) that connects to the sensor and/or asset tracking database (e.g., 1110 of FIG. 11) over a network connection. The client portal (e.g., 1120 of FIG. 11) may be a web-based portal to the sensor and/or asset tracking database (e.g., 1110 of FIG. 11) or a stand-alone software application providing access to the sensor and/or asset tracking database (e.g., 1110 of FIG. 11) via a network connection.

Advantageously, there is no communication between the sensor and/or asset tracking database (e.g., 1110 of FIG. 11) and the one or more wireless devices (e.g., 150*b*, 150*c*, or 150*d* of FIG. 11) that report an encounter with the Wi-Fi access point (e.g., 500 or 600 of FIG. 7A), comprising observation data, to the Wi-Fi AP Database (e.g., 1130 of FIG. 11), thereby enabling passive sensor and/or asset tracking in an open network environment where there is no required network connectivity. In this open network configuration, the existing infrastructure represented by the ecosystem of wireless devices (e.g., 150), such as, for example, smartphones, and the inherent reporting features wireless device operating systems or other software (e.g., 150) to report observation data of the Wi-Fi access point (e.g., 500 or 600 of FIG. 7A) they encounter may be leveraged to passive track assets (e.g., 1020 of FIG. 11), without requiring an awareness on the part of the wireless device (e.g., 150), or user thereof, that they are participating in the asset tracking task. Further, the one or more wireless devices (e.g., 150*b*, 150*c*, 150*d* of FIG. 11), or users thereof, may not be aware that they are participating in the asset tracking task. The wireless devices (e.g., 150*b*, 150*c*, 150*d* of FIG. 11) simply report observation data of Wi-Fi access points (e.g., 500 or 600 of FIG. 7A) they encounter to the Wi-Fi AP Database (e.g., 1130 of FIG. 11), typically as part of their participation in location services.

In one or more embodiments of the present invention, a method of passive sensor tracking may use first observation data received directly from one or more direct reporting wireless devices (e.g., 150a of FIG. 11) and second observation data received from a Wi-Fi AP Database (e.g., 1130 of FIG. 11) that receives observation data from one or more indirect reporting wireless devices (e.g., 150b, 150c, 150d of FIG. 11). A conventional Wi-Fi access point (e.g., 500 of FIG. 7A) or a pseudo Wi-Fi access point (e.g., 600 of FIG. 7A) may transmit a management frame (e.g., 300 of FIG. 7B) that includes sensor data of a sensor (e.g., 710 of FIG. 7A) as part of Wi-Fi wireless network discovery.

In one or more embodiments of the present invention, a Wi-Fi AP Database (e.g., 1130 of FIG. 11) may be a database of observation data including the unique identifying information of Wi-Fi access points (e.g., 500 or 600 of FIG. 7A), sensor data, and in some embodiments, location information of the Wi-Fi access points (e.g., 500 or 600 of FIG. 7A) encountered by one or more indirect reporting wireless devices (e.g., 150b, 150c, 150d of FIG. 11). A Wi-Fi AP Database (e.g., 1130 of FIG. 11) may be established, operated, and maintained separate and apart from a sensor and/or asset tracking database (e.g., 1110 of FIG. 11). In certain embodiments, a Wi-Fi AP Database (e.g., 1130 of FIG. 11) may be a database of observation data maintained by an original equipment manufacturer of a wireless device (e.g., 150 of FIG. 11). In other embodiments, a Wi-Fi AP Database (e.g., 1130 of FIG. 11) may be a database of observation data maintained by an operating system developer of an operating system executing on a wireless device (e.g., 150 of FIG. 11). For example, the Wi-Fi AP Database (e.g., 1130 of FIG. 11) may be an Apple® iOS®, Google® Android®, or Microsoft® location services database typically used to improve the location determination accuracy for their respective end users. In still other embodiments, a Wi-Fi AP Database (e.g., 1130 of FIG. 11) may be a database of observation data maintained by a software developer. For example, the Wi-Fi AP Database (e.g., 1130 of FIG. 11) may be a database of observation data commercially offered by Cisco Systems®, Facebook®, WhatsApp®, X-Mode®, Ruckus®, and Skyhook®. In still other embodiments, Wi-Fi AP Database (e.g., 1130 of FIG. 11) may be any other type or kind of database of observation data in accordance with one or more embodiments of the present invention.

For the purpose of this disclosure, a Wi-Fi access point (e.g., 500 or 600 of FIG. 7A) that spoofs, or emulates, at least portions of the Wi-Fi wireless network discovery process may be used. Notwithstanding, one of ordinary skill in the art will recognize that any type or kind of device capable of spoofing, or emulating, at least portions of the Wi-Fi network discovery process by either broadcasting beacon frames (e.g., 220 of FIG. 2C or 220s of FIG. 8) or probe response frames (e.g., 240 of FIG. 2C or 240s of FIG. 8) including sensor data may be used in accordance with one or more embodiments of the present invention.

The method may include associating unique identifying information of a Wi-Fi access point (e.g., 500 or 600 of FIG. 7A) with a sensor (e.g., 710 of FIG. 7A) in an sensor and/or asset tracking database (e.g., 1110 of FIG. 11). The sensor (e.g., 710 of FIG. 7A) may be disposed on, attached to, or integrated with an asset or placed in a location where sensing is desired. The unique identifying information may be any information that uniquely identifies Wi-Fi access point (e.g., 500 or 600 of FIG. 7A) including, for example, the BSSID of the Wi-Fi access point (e.g., 500 or 600 of FIG. 7A). The unique identifying information may be entered into the sensor and/or asset tracking database (e.g., 1110 of FIG. 11) and logically associated with the sensor (e.g., 710 of FIG. 7A) for purposes of participating in the sensor and/or asset tracking task. In addition, any other information relating to the Wi-Fi access point (e.g., 500 or 600 of FIG. 7A) or asset associated therewith may be stored in the same or a related record of the sensor and/or asset tracking database (e.g., 1110 of FIG. 11).

The method may include receiving, at the sensor and/or asset tracking database (e.g., 1110 of FIG. 11), first observation data observation data from one or more direct reporting wireless devices (e.g., 150a of FIG. 11) that encounter the Wi-Fi access point (e.g., 500 or 600 of FIG. 7A) comprising the unique identifying information of the Wi-Fi access point (e.g., 500 or 600 of FIG. 7A), sensor data of the sensor (e.g., 710 of FIG. 7A), and in some embodiments, first location information of the Wi-Fi access point (e.g., 500 or 600 of FIG. 7A).

The method may include receiving, at the sensor and/or asset tracking database (e.g., 1110 of FIG. 11), second observation data from a Wi-Fi AP Database (e.g., 1130 of FIG. 11) comprising the unique identifying information of the Wi-Fi access point (e.g., 500 or 600 of FIG. 7A), sensor data of the sensor (e.g., 710 of FIG. 7A), and in some embodiments, location information of the Wi-Fi access point (e.g., 500 or 600 of FIG. 7A). The Wi-Fi AP Database (e.g., 1130 of FIG. 11) may receive observation data from one or more indirect reporting wireless devices (e.g., 150b, 150c, 150d of FIG. 11) that encounter the Wi-Fi access point (e.g., 500 or 600 of FIG. 7A) and report unique identifying information of the Wi-Fi access point (e.g., 500 or 600 of FIG. 7A), sensor data of the sensor (e.g., 710 of FIG. 7A) and, in some embodiments, location information of the Wi-Fi access point (e.g., 500 or 600 of FIG. 7A) to the Wi-Fi AP Database (e.g., 1030 of FIG. 10A).

In certain embodiments, the location information of the Wi-Fi access point (e.g., 500 or 600 of FIG. 7A) may a latitude and a longitude of the Wi-Fi access point (e.g., 500 or 600 of FIG. 7A). In other embodiments, the location information of the Wi-Fi access point (e.g., 500 or 600 of FIG. 7A) may comprise a latitude and a longitude of a reporting wireless device (e.g., 150b, 150c, 150d of FIG. 10A) at or near the time of its encounter with the Wi-Fi access point (e.g., 500 or 600 of FIG. 7A). In still other embodiments, the location information of the Wi-Fi access point (e.g., 500 or 600 of FIG. 7A) may comprise a received signal strength of the Wi-Fi access point (e.g., 500 or 600 of FIG. 7A) measured by a reporting wireless device (e.g., 150b, 150c, 150d of FIG. 10A) at or near the time of its encounter with the Wi-Fi access point (e.g., 500 or 600 of FIG. 7A). In still other embodiments, the location information of Wi-Fi access point (e.g., 500 or 600 of FIG. 7A) may comprise a latitude and a longitude of one or more other Wi-Fi access points (e.g., other nearby 500 or 600 not shown in FIG. 10A) near the Wi-Fi access point (e.g., 500 or 600 of FIG. 7A) at or near the time of a reporting wireless device's (e.g., 150b, 150c, 150d of FIG. 10A) encounter with Wi-Fi access point (e.g., 500 or 600 of FIG. 7A). In still other embodiments, the location information of the Wi-Fi access point (e.g., 500 or 600 of FIG. 7A) may comprise a location, a received signal strength, any of the above-noted information, or any other information related to one or more other Wi-Fi access points (e.g., other nearby 500 or 600 not shown in FIG. 11) near the Wi-Fi access point (e.g., 500 or 600 of FIG. 7A) at or near the time of a reporting wireless device's (e.g., 150b, 150c, 150d of FIG. 10A) encounter with the Wi-Fi access point (e.g., 500 or 600 of FIG. 7A).

The method may include determining, by the sensor and/or asset tracking database (e.g., 1110 of FIG. 11), a location of the sensor (e.g., 710 of FIG. 7A) based, at least in part, on the first and/or the second observation data of the Wi-Fi access point (e.g., 500 or 600 of FIG. 7A). In certain embodiments, determining the location of the sensor (e.g., 710 of FIG. 7A) may include using a latitude and longitude of the Wi-Fi access point (e.g., 500 or 600 of FIG. 7A) as the location of the sensor (e.g., 710 of FIG. 7A). In other embodiments, determining the location of the sensor (e.g., 710 of FIG. 7A) may include using a latitude and longitude of a reporting wireless device (e.g., 150b, 150c, 150d of FIG. 10A) at or near the time of its encounter with the Wi-Fi access point (e.g., 500 or 600 of FIG. 7A) as the location of the sensor (e.g., 710 of FIG. 7A). In still other embodiments, determining the location of the sensor (e.g., 710 of FIG. 7A) may include using a received signal strength of the Wi-Fi access point (e.g., 500 or 600 of FIG. 7A) measured by a reporting wireless device (e.g., 150b, 150c, or 150d of FIG. 10A) at or near the time of its encounter with the Wi-Fi access point (e.g., 500 or 600 of FIG. 7A) to determine the location of the sensor (e.g., 710 of FIG. 7A). Using well-known Wi-Fi positioning techniques, the received signal strength may be used to determine or enhance the location determination of the Wi-Fi access point (e.g., 500 or 600 of FIG. 7A). For example, the received signal strength may be used to determine a radius of a location of a reporting wireless device (e.g., 150b, 150c, 150d of FIG. 11) which may be used by itself or in combination with other location information to determine or enhance the location determination of the Wi-Fi access point (e.g., 500 or 600 of FIG. 7A). In still other embodiments, determining the location of the sensor (e.g., 710 of FIG. 7A) may include using a latitude and longitude of one or more other Wi-Fi access points (e.g., other nearby 500 or 600 not shown in FIG. 11) encountered by a reporting wireless device (e.g., 150b, 150c, 150d of FIG. 11) at or near the time of its encounter with the Wi-Fi access point (e.g., 500 or 600 of FIG. 7A) to determine the location of the sensor (e.g., 710 of FIG. 7A). Using well known Wi-Fi positioning techniques, the locations of nearby Wi-Fi access points (e.g., other nearby 500 or 600 not shown in FIG. 11) may be used by itself or in combination to determine or enhance the location determination of the Wi-Fi access point (e.g., 500 or 600 of FIG. 7A). In still other embodiments, determining the location of the moveable asset (e.g., 920 of FIG. 10A) may include using a location, a received signal strength, any of the above-noted information, or any other information related to one or more other Wi-Fi access points (e.g., other nearby 500 or 600 not shown in FIG. 10A) near the Wi-Fi access point (e.g., 500 or 600 of FIG. 7A) at or near the time of a reporting wireless device's (e.g., 150b, 150c, 150d of FIG. 11) encounter with the Wi-Fi access point (e.g., 500 or 600 of FIG. 7A) to determine the location of the sensor (e.g., 710 of FIG. 7A). Using well known Wi-Fi positioning techniques, the received signal strengths of nearby Wi-Fi access points (e.g., other nearby 500 or 600 not shown in FIG. 11) may be used by itself or in combination to determine or enhance the location determination of the Wi-Fi access point (e.g., 500 or 600 of FIG. 7A).

One of ordinary skill in the art will recognize that historical location information, reporting wireless device (e.g., 150b, 150c, 150d of FIG. 11) location information, conventional Wi-Fi access point (e.g., 500 of FIG. 11) or pseudo Wi-Fi access point (e.g., 600 of FIG. 11) location information, other nearby Wi-Fi access point (e.g., other nearby 500 or 600 not shown in FIG. 11) location information, received signal strength of the Wi-Fi access point (e.g., 500 or 600 of FIG. 7A) location information, received signal strength of other nearby Wi-Fi access point (e.g., other nearby 500 or 600 not shown in FIG. 11) location information, and any other information relating to the Wi-Fi access point (e.g., 500 or 600 of FIG. 7A) or nearby Wi-Fi access points (e.g., other nearby 500 or 600 not shown in FIG. 11) may be used, alone or in combination, with known positioning techniques, including, but not limited to, smartphone positioning, network-based positioning, hybrid positioning, GPS positioning, cellular positioning, triangulation, trilateration, time of arrival, angle of arrival, and any other positioning technique or combination of positioning techniques may be used in accordance with one or more embodiments of the present invention. Further, one of ordinary skill in the art will recognize that, the positioning technique or techniques used may vary based on the type or kind of observation data available at the time of the location determination.

The method may further include storing the location of the moveable asset (e.g., 920 of FIG. 11) in the sensor and/or asset tracking database (e.g., 1110 of FIG. 11). The method may further include providing a user access, via a client portal (e.g., 1120 of FIG. 11), to the location of the moveable asset (e.g., 920 of FIG. 11) stored in the sensor and/or asset tracking database (e.g., 1110 of FIG. 11). In certain embodiments, a client portal (e.g., 1120 of FIG. 11) may include a software interface for querying and receiving information from the sensor and/or asset tracking database (e.g., 1110 of FIG. 11). The client portal (e.g., 1120 of FIG. 11) may be part of the same computing system as that of the sensor and/or asset tracking database (e.g., 1110 of FIG. 11) or a separate and distinct computing system (e.g., 1200 of FIG. 12) or wireless device (e.g., 150) that connects to the sensor and/or asset tracking database (e.g., 1110 of FIG. 11) over a network connection. The client portal (e.g., 1120 of FIG. 11) may be a web-based portal to the sensor and/or asset tracking database (e.g., 1110 of FIG. 11) or a stand-alone software application providing access to the sensor and/or asset tracking database (e.g., 1110 of FIG. 11) via a network connection.

Advantageously, there is no communication between the sensor and/or asset tracking database (e.g., 1110 of FIG. 11) and the one or more indirect reporting wireless devices (e.g., 150b, 150c, 150d of FIG. 11) that report an encounter with the conventional Wi-Fi access point (e.g., 500 of FIG. 11) or pseudo Wi-Fi access point (e.g., 600 of FIG. 11), comprising observation data, to the Wi-Fi AP Database (e.g., 1130 of FIG. 11), thereby enabling passive, and potentially anonymous, asset tracking in areas where there is no network connectivity. In this hybrid open-network configuration, the existing infrastructure represented by the ecosystem of wireless devices (e.g., 150), such as, for example, smartphones, and the inherent reporting features wireless device operating systems or other software (e.g., 150) to report observation data of conventional Wi-Fi access points (e.g., 500 of FIG. 11) or pseudo Wi-Fi access points (e.g., 600 of FIG. 11) they encounter may be leveraged to passive track sensors and/or assets (e.g., 920 of FIG. 11), without requiring an awareness on the part of the wireless device (e.g., 150), or user thereof, that they are participating in the asset tracking task. Further, the one or more wireless devices (e.g., 150b, 150c, 150d of FIG. 11), or users thereof, may not be aware that they are participating in the asset tracking task. The wireless devices (e.g., 150b, 150c, 150d of FIG. 11) simply report observation data of Wi-Fi access points (e.g., 500 or 600 of FIG. 7A)

they encounter to the Wi-Fi AP Database (e.g., 1130 of FIG. 11), typically as part of their participation in location services.

In one or more embodiments of the present invention, a method of passive sensor tracking may use observation data received directly from one or more direct reporting wireless devices (e.g., 150a of FIG. 11) that encounter a Wi-Fi access point (e.g., 500 or 600 of FIG. 7A). A conventional Wi-Fi access point (e.g., 500 of FIG. 7A) or a pseudo Wi-Fi access point (e.g., 600 of FIG. 7A) may transmit a management frame (e.g., 300 of FIG. 7B) that includes sensor data of a sensor (e.g., 710 of FIG. 7A) as part of Wi-Fi wireless network discovery.

For the purpose of this disclosure, a Wi-Fi access point (e.g., 500 or 600 of FIG. 7A) that spoofs, or emulates, at least portions of the Wi-Fi wireless network discovery process may be used. Notwithstanding, one of ordinary skill in the art will recognize that any type or kind of device capable of spoofing, emulating, or participating in, at least portions of the Wi-Fi network discovery process by either broadcasting beacon frames (e.g., 220 of FIG. 2C or 220s of FIG. 8) or probe response frames (e.g., 240 of FIG. 2C or 240s of FIG. 8) may be used in accordance with one or more embodiments of the present invention.

The method may include associating unique identifying information of Wi-Fi access point (e.g., 500 or 600 of FIG. 7A) with a sensor (e.g., 710 of FIG. 7A) in a sensor and/or asset tracking database (e.g., 1110 of FIG. 11), wherein the Wi-Fi access point (e.g., 500 or 600 of FIG. 7A) is disposed on, attached to, or integrated. The unique identifying information may be any information that uniquely identifies a Wi-Fi access point (e.g., 500 or 600 of FIG. 7A) including, for example, the BSSID of the Wi-Fi access point (e.g., 500 or 600 of FIG. 7A). The unique identifying information may be entered into the sensor and/or asset tracking database (e.g., 1110 of FIG. 11) and logically associated with the sensor (e.g., 710 of FIG. 7A) for purposes of participating in the sensor and/or asset tracking task. In addition, any other information relating to the Wi-Fi access point (e.g., 500 or 600 of FIG. 7A), sensor, or asset may be stored in the same or a related record of the sensor and/or asset tracking database (e.g., 1110 of FIG. 11).

The method may include receiving, at the sensor and/or asset tracking database (e.g., 1110 of FIG. 11), observation data from one or more direct reporting wireless devices (e.g., 150a of FIG. 11) that encounter the Wi-Fi access point (e.g., 500 or 600 of FIG. 7A) comprising the unique identifying information of the Wi-Fi access point (e.g., 500 or 600 of FIG. 7A), sensor data, and in some embodiments, location information of the Wi-Fi access point (e.g., 500 or 600 of FIG. 7A).

In certain embodiments, the location information of Wi-Fi access point (e.g., 500 or 600 of FIG. 7A) may include a latitude and a longitude of the Wi-Fi access point (e.g., 500 or 600 of FIG. 7A). In other embodiments, the location information of the Wi-Fi access point (e.g., 500 or 600 of FIG. 7A) may comprise a latitude and a longitude of a reporting wireless device (e.g., 150a of FIG. 11) at or near the time of its encounter with the Wi-Fi access point (e.g., 500 or 600 of FIG. 7A). In still other embodiments, the location information of the Wi-Fi access point (e.g., 500 or 600 of FIG. 7A) may comprise a received signal strength of the Wi-Fi access point (e.g., 500 or 600 of FIG. 7A) measured by a reporting wireless device (e.g., 150a of FIG. 11) at or near the time of its encounter with the Wi-Fi access point (e.g., 500 or 600 of FIG. 7A). In still other embodiments, the location information of the Wi-Fi access point (e.g., 500 or 600 of FIG. 7A) may comprise a latitude and a longitude of one or more other Wi-Fi access points (e.g., other nearby 500 or 600 not shown in FIG. 11) near the Wi-Fi access point (e.g., 500 or 600 of FIG. 7A) at or near the time of a reporting wireless device's (e.g., 150a of FIG. 11) encounter with the Wi-Fi access point (e.g., 500 or 600 of FIG. 7A). In still other embodiments, the location information of the Wi-Fi access point (e.g., 500 or 600 of FIG. 7A) may comprise a location, a received signal strength, any of the above-noted information, or any other information relating to one or more other Wi-Fi access points (e.g., other nearby 500 or 600 not shown in FIG. 11) near the Wi-Fi access point (e.g., 500 or 600 of FIG. 7A) at or near the time of a reporting wireless device's (e.g., 150a of FIG. 10A) encounter with the Wi-Fi access point (e.g., 500 or 600 of FIG. 7A).

The method may include determining a location of the sensor (e.g., 710 of FIG. 7A) based, at least in part, on the observation data of the Wi-Fi access point (e.g., 500 or 600 of FIG. 7A). In certain embodiments, determining the location of the sensor (e.g., 710 of FIG. 7A) may include using a latitude and longitude of the Wi-Fi access point (e.g., 500 or 600 of FIG. 7A) as the location of the sensor (e.g., 710 of FIG. 7A). In other embodiments, determining the location of the sensor (e.g., 710 of FIG. 7A) may include using a latitude and longitude of a reporting wireless device (e.g., 150a of FIG. 11) at or near the time of its encounter with the Wi-Fi access point (e.g., 500 or 600 of FIG. 7A) as the location of the sensor (e.g., 710 of FIG. 7A). In still other embodiments, determining the location of the sensor (e.g., 710 of FIG. 7A) may include using a received signal strength of the Wi-Fi access point (e.g., 500 or 600 of FIG. 7A) measured by a reporting wireless device (e.g., 150a of FIG. 11) at or near the time of its encounter with the Wi-Fi access point (e.g., 500 or 600 of FIG. 7A) to determine the location of the sensor (e.g., 710 of FIG. 7A). Using well-known Wi-Fi positioning techniques, the received signal strength may be used to determine or enhance the location determination of the Wi-Fi access point (e.g., 500 or 600 of FIG. 7A). For example, the received signal strength may be used to determine a radius of a location of a reporting wireless device (e.g., 150a of FIG. 11) which may be used by itself or in combination with other location information to determine or enhance the location determination of the Wi-Fi access point (e.g., 500 or 600 of FIG. 7A). In still other embodiments, determining the location of the sensor (e.g., 710 of FIG. 7A) may include using a latitude and longitude of one or more other Wi-Fi access points (e.g., other nearby 500 or 600 not shown in FIG. 11) encountered by a reporting wireless device (e.g., 150a of FIG. 11) at or near the time of its encounter with the Wi-Fi access point (e.g., 500 or 600 of FIG. 7A) to determine the location of the sensor (e.g., 710 of FIG. 7A). Using well known Wi-Fi positioning techniques, the locations of nearby Wi-Fi access points (e.g., other nearby 500 or 600 not shown in FIG. 11) may be used by itself or in combination to determine or enhance the location determination of the Wi-Fi access point (e.g., 500 or 600 of FIG. 7A). In still other embodiments, determining the location of the sensor (e.g., 710 of FIG. 7A) may include using a location, a received signal strength, any of the above-noted information, or any other information related to one or more other Wi-Fi access points (e.g., other nearby 500 or 600 not shown in FIG. 11) near the Wi-Fi access point (e.g., 500 or 600 of FIG. 7A) at or near the time of a reporting wireless device's (e.g., 150a) encounter with the Wi-Fi access point (e.g., 500 or 600 of FIG. 7A) to determine the location of the sensor (e.g., 710 of FIG. 7A).

Using well known Wi-Fi positioning techniques, the received signal strengths of nearby Wi-Fi access points (e.g., other nearby 500 or 600 not shown in FIG. 11) may be used by itself or in combination to determine or enhance the location determination of the Wi-Fi access point (e.g., 500 or 600 of FIG. 7A).

One of ordinary skill in the art will recognize that historical location information, reporting wireless device (e.g., 150*a* of FIG. 11) location information, Wi-Fi access point (e.g., 500 or 600 of FIG. 7A) location information, other nearby Wi-Fi access point (e.g., other nearby 500 or 600 not shown in FIG. 11) location information, received signal strength of the Wi-Fi access point (e.g., 500 or 600 of FIG. 7A) location information, received signal strength of other nearby Wi-Fi access point (e.g., other nearby 500 or 600 not shown in FIG. 11) location information, and any other information relating to the Wi-Fi access point (e.g., 500 or 600 of FIG. 7A) or nearby Wi-Fi access points (e.g., other nearby 500 or 600 not shown in FIG. 11) may be used, alone or in combination, with known positioning techniques, including, but not limited to, smartphone positioning, network-based positioning, hybrid positioning, GPS positioning, cellular positioning, triangulation, trilateration, time of arrival, angle of arrival, and any other positioning technique or combination of positioning techniques may be used in accordance with one or more embodiments of the present invention. Further, one of ordinary skill in the art will recognize that, the positioning technique or techniques used may vary based on the type or kind of observation data available at the time of the location determination.

The method may further include storing the location of the (e.g., 710 of FIG. 7A) in the sensor and/or asset tracking database (e.g., 1110 of FIG. 11). The method may further include providing a user access, via the client portal (e.g., 1120 of FIG. 11), to the location of the (e.g., 710 of FIG. 7A) stored in the sensor and/or asset tracking database (e.g., 1110 of FIG. 11). In certain embodiments, a client portal (e.g., 1120 of FIG. 11) may include a software interface for querying and receiving information from the sensor and/or asset tracking database (e.g., 1110 of FIG. 11). The client portal (e.g., 1120 of FIG. 11) may be part of the same computing system as that of the sensor and/or asset tracking database (e.g., 1110 of FIG. 11) or a separate and distinct computing system (e.g., 1100 of FIG. 11) or wireless device (e.g., 150) that connects to the sensor and/or asset tracking database (e.g., 1110 of FIG. 11) over a network connection. The client portal (e.g., 1120 of FIG. 11) may be a web-based portal to the sensor and/or asset tracking database (e.g., 1110 of FIG. 11) or a stand-alone software application providing access to the sensor and/or asset tracking database (e.g., 1110 of FIG. 11) via a network connection.

The method may further include providing one or more wireless devices (e.g., 150*a* of FIG. 11), from the sensor and/or asset tracking database (e.g., 1110 of FIG. 11), with the unique identifying information of the Wi-Fi access point (e.g., 500 or 600 of FIG. 7A) to limit observation data reported by the one or more wireless devices (e.g., 150*a* of FIG. 10A) to data relevant to the Wi-Fi access point (e.g., 500 or 600 of FIG. 7A) associated with the sensor (e.g., 710 of FIG. 7A) to be tracked. The one or more wireless devices (e.g., 150*a* of FIG. 11) may limit the observation data reported directly to the sensor and/or asset tracking database (e.g., 1110 of FIG. 11) to observation data relevant to Wi-Fi access point (e.g., 500 or 600 of FIG. 7A) associated with the sensor (e.g., 710 of FIG. 7A) to be tracked. The unique identifying information may be provided at any time, including, prior to receiving observation data from the one or more wireless devices (e.g., 150*a* of FIG. 11) that encounter the Wi-Fi access point (e.g., 500 or 600 of FIG. 7A).

The method may further include filtering, at the sensor and/or asset tracking database (e.g., 1110 of FIG. 11), observation data received from one or more wireless devices (e.g., 150*a* of FIG. 11) to data relevant to the Wi-Fi access point (e.g., 500 or 600 of FIG. 7A) associated with the sensor (e.g., 710 of FIG. 7A) to be tracked. Filtering may be performed by the sensor and/or asset tracking database (e.g., 1110 of FIG. 11) at any time, including, after receiving observation data from the one or more wireless devices (e.g., 150*a* of FIG. 11) that encounter the Wi-Fi access point (e.g., 500 or 600 of FIG. 7A).

In this configuration, limiting and/or filtering observation data to data relevant to the Wi-Fi access point (e.g., 500 or 600 of FIG. 7A) associated with the sensor (e.g., 710 of FIG. 7A) to be tracked may enhance tracking capabilities and reduce latency in both reporting observation data and querying the sensor and/or asset tracking database (e.g., 1110 of FIG. 11).

In one or more embodiments of the present invention, a method of passive sensor tracking with existing infrastructure may include associating, in a sensor tracking database, unique identifying information of a Wi-Fi access point of a passive sensor with a physical property to be sensed by the passive sensor. The unique identifying information may be any information that uniquely identifies the Wi-Fi access point of the passive sensor and is reported by a Wi-Fi client that encounters the Wi-Fi access point, typically as part of location services, but potentially a direct or indirect report. The sensor data may be placed or encoded in one or more fields of the spoofed beacon frame, probe response frame, or other management frame transmitted by the Wi-Fi access point as part of Wi-Fi wireless network discovery. In certain embodiments, the Wi-Fi access point of the passive sensor may be a dummy Wi-Fi access point that does not allow the wireless device to authenticate to, or associate with, the dummy Wi-Fi access point and the dummy Wi-Fi access point does not provide upstream network connectivity.

In certain embodiments, the unique identifying information may be, for example, the BSSID of the Wi-Fi access point of the passive sensor. However, one of ordinary skill in the art will recognize that any field or subfield of the spoofed beacon frame, probe response frame, or other management frame may be used to uniquely identify the Wi-Fi access point, and by association the passive sensor, in accordance with one or more embodiments of the present invention. Notwithstanding the above, to avoid potential overlap or confusion, using the standardized BSSID that are guaranteed to be unique, may provide the simplest solution to uniquely identifying the Wi-Fi access point of the passive sensor.

The method may also include receiving, at the sensor tracking database, sensor data, comprising the physical property sensed by the passive sensor, placed or encoded in the spoofed beacon frame, probe response frame, or other management frame that the passive sensor transmits, as part of Wi-Fi wireless network discovery, to a wireless device that encounters the passive sensor. As noted above, the sensor data may be numeric or alphanumeric, explicit or encoded, and stored in any suitable field or subfield or combination or portions thereof of the spoofed beacon frame, probe response frame, or other management frame, provided it is a field or subfield that is reported by the Wi-Fi client that reports the encounter with the Wi-Fi access point of the passive sensor to a Wi-Fi AP Database or sensor tracking database. The wireless device may report, either directly or indirectly, the unique identifying information of the Wi-Fi access point of the passive sensor encountered and the sensor data encoded in the spoofed beacon frame, probe response frame, or other management frame to a Wi-Fi AP Database, typically as part of location services, or direct or indirect report to sensor tracking database.

In certain embodiments, the sensor data may be received by the sensor tracking database from the wireless device that encounters the passive sensor. In other embodiments, the sensor data may be received by the sensor tracking database from a Wi-Fi AP Database that receives the sensor data from the wireless device that encounters the passive sensor. The Wi-Fi AP Database may comprise a database managed by an original equipment manufacturer, an operating system developer, or a third-party software developer that compiles and makes information relating to reported Wi-Fi access points available to third-parties, typically to enhance location services, but potentially for other uses.

The wireless device may not be required to authenticate to, associate with, or establish a network connection with the Wi-Fi access point or the dummy Wi-Fi access point of the passive sensor. In addition, the wireless device, or user thereof, is not required to knowingly participate in the passive sensor tracking task. The method may optionally include disposing the passive sensor in a location where the physical property is to be sensed. The method may optionally include providing a user access to the sensed physical property of the passive sensor. In one or more embodiments of the present invention, a non-transitory computer readable medium comprising software instructions, when executed by a processor, may perform any of the above-noted methods.

In one or more embodiments of the present invention, a non-transitory computer readable medium comprising software instructions, when executed by a processor, may perform any of the above-noted methods in accordance with one or more embodiments of the present invention.

Advantages of one or more embodiments of the present invention may include one or more of the following:

In one or more embodiments of the present invention, a method and system for passive sensor and/or asset tracking allows for passively tracking moveable sensors/assets by one or more potentially unrelated wireless devices that are in-range of assets broadcasting Wi-Fi signals even though the wireless device, or user thereof, may not even know they are participating in the sensor and/or asset tracking task. In this way, every smartphone in the vicinity of an asset that is desired to be tracked may, anonymously, and without awareness, participate in the asset tracking task.

In one or more embodiments of the present invention, a method and system for passive sensor and/or asset tracking leverages already existing devices, systems, and networks to passively track sensor data and, in some embodiments, the locations of sensors/assets without requiring the sensor/asset itself to have any connectivity to the Internet or other network connection.

In one or more embodiments of the present invention, a method and system for passive sensor and/or asset tracking may use Wi-Fi access points that do not require connectivity to any particular network, to identify one or more sensors/assets in the field using Wi-Fi wireless network discovery and Wi-Fi access point reporting features of modern smartphones and location services to passively identify sensor data and, in some embodiments, the location of the one or more sensors/assets. The moveable sensors/assets may be passively tracked by one or more wireless devices that may be independent and unrelated whenever any one or more of the wireless devices merely come into range of a sensor/asset associated with a pseudo Wi-Fi access point broadcasting Wi-Fi signals, without any intent or awareness on the part of the wireless device, or user thereof, that they are participating in the sensor/asset tracking task due to the nature of the Wi-Fi wireless network discovery protocol.

In one or more embodiments of the present invention, a method and system for passive sensor and/or asset tracking leverages existing infrastructure inherent in smartphones, operating systems, and software applications to their location as well as the unique identifying information, and other information, of Wi-Fi access points they encounter for improving the accuracy of location-based services that may be advantageously used for the sensor and/or asset tracking task without awareness.

In one or more embodiments of the present invention, a method and system for passive sensor and/or asset tracking uses the Wi-Fi wireless network discovery protocol as well as the Wi-Fi access point reporting feature of smartphones to passively track sensors/assets associated with Wi-Fi access points by one or more wireless devices without requiring that the wireless devices associate with any particular Wi-Fi access point, using publicly accessibly Wi-Fi signals, and in passive scanning applications, completely anonymously with respect to the asset tracking task.

In one or more embodiments of the present invention, a method and system for passive sensor and/or asset tracking uses a Wi-Fi access point associated with a sensor that does not require any connectivity to the Internet or any other network connection and does not require a GPS receiver, relying instead on the one or more wireless devices to report the time, date, and relative location of the in-range pseudo Wi-Fi access point associated with the asset.

In one or more embodiments of the present invention, a method and system for passive sensor and/or asset tracking, a sensor and/or asset tracking database receives unique information identifying, sensor data, and in some embodiments, information relating to the location of one or more pseudo Wi-Fi access points received directly or indirectly from one or more wireless devices or a Wi-Fi AP Database. The sensor data values and/or location of the sensor/asset may be tracked in the sensor and/or asset tracking database by the location of the Wi-Fi access point.

In one or more embodiments of the present invention, a method and system for passive sensor and/or asset tracking may use a Wi-Fi access point that allows for the assignment of alternative meanings to various parts of the beacon frame, probe response frame, or other management frame corresponding to sensor data or other information.

In one or more embodiments of the present invention, a method and system for passive sensor and/or asset tracking reduces theft by providing a trackable sensor/asset without conventional asset tracking hardware or software systems. If the perpetrator of the theft moves a trackable asset within range of any one or more wireless devices, the discovery of the Wi-Fi access point will be reported, and the sensor and/or asset tracking database may be able to locate the associated sensor/asset without the perpetrator knowing that the asset has been tracked.

In one or more embodiments of the present invention, a method and system for passive sensor and/or asset tracking substantially reduces the complexity and cost associated with deploying a comprehensive sensor and/or asset tracking system. As opposed to conventional asset tracking systems, one or more wireless devices, which may be completely independent of and unrelated to the sensor and/or asset tracking task, serve as the tracking infrastructure.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A method of passive sensor tracking using one or more observations of a pseudo Wi- Fi access point comprising:
    associating, in a sensor tracking database, unique identifying information of the pseudo Wi-Fi access point with a sensor,
    wherein the pseudo Wi-Fi access point transmits a management frame comprising sensor data of the sensor,
    wherein one or more wireless devices that encounter the pseudo Wi-Fi access point report observation data including the unique identifying information of the pseudo Wi-Fi access point and the sensor data of the management frame to a Wi-Fi AP Database, and
    wherein there is no communication between the sensor tracking database and the one or more wireless devices that report encounters with the pseudo Wi-Fi access point to the Wi-Fi AP Database;
    receiving, at the sensor tracking database, observation data from the Wi-Fi AP Database comprising the unique identifying information of the pseudo Wi-Fi access point and the sensor data of the sensor;
    storing the sensor data in the sensor tracking database; and
    providing user access to the sensor data in the sensor tracking database.

2. The method of claim 1, wherein the sensor is disposed on, attached to, or integrated with an asset or placed in a location where sensing is desired.

3. The method of claim 1, wherein the unique identifying information of the pseudo Wi-Fi access point comprises a BSSID of the pseudo Wi-Fi access point.

4. The method of claim 1, wherein the sensor data of the sensor is stored in an SSID field of the management frame transmitted by the pseudo Wi-Fi access point.

5. The method of claim 1, wherein observation data further comprises location information of the pseudo Wi-Fi access point.

6. The method of claim 5, wherein the location information of the pseudo Wi-Fi access point comprises a latitude and a longitude of the pseudo Wi-Fi access point.

7. The method of claim 6, wherein the location information of the pseudo Wi-Fi access point comprises a latitude and a longitude of a reporting wireless device at or near the time of an encounter with the pseudo Wi-Fi access point.

8. The method of claim 6, wherein the location information of the pseudo Wi-Fi access point comprises a received signal strength of the pseudo Wi-Fi access point measured by a reporting wireless device at or near the time of an encounter with the pseudo Wi-Fi access point.

9. The method of claim 6, wherein the location information of the pseudo Wi-Fi access point comprises a latitude and a longitude of one or more Wi-Fi access points near the pseudo Wi-Fi access point at or near the time of a reporting wireless device's encounter with the pseudo Wi-Fi access point.

10. The method of claim 6, wherein the location information of the pseudo Wi-Fi access point comprises a received signal strength of one or more other Wi-Fi access points near the pseudo Wi-Fi access point at or near the time of a reporting wireless device's encounter with the pseudo Wi-Fi access point.

11. The method of claim 5, further comprising:
    determining a location of the sensor based, at least in part, on observation data of the pseudo Wi-Fi access point.

12. The method of claim 11, wherein determining the location of the sensor comprises using a latitude and longitude of the pseudo Wi-Fi access point as the location of the sensor.

13. The method of claim 11, wherein determining the location of the sensor comprises using a latitude and longitude of a reporting wireless device as the location of the sensor.

14. The method of claim 11, wherein determining the location of the sensor comprises using a received signal strength of the pseudo Wi-Fi access point measured by a reporting wireless device at or near the time of its encounter with the pseudo Wi-Fi access point to determine the location of the sensor.

15. The method of claim 11, wherein determining the location of the sensor comprises using a latitude and longitude of one or more other Wi-Fi access points encountered by a reporting wireless device at or near the time of its encounter with the pseudo Wi-Fi access point to determine the location of the sensor.

16. The method of claim 11, wherein determining the location of the sensor comprises using a received signal strength of one or more Wi-Fi access points measured by a reporting wireless device at or near the time of its encounter with the pseudo Wi-Fi access point to determine the location of the sensor.

17. A method of passive sensor tracking using one or more observations of a pseudo Wi-Fi access point comprising:
    associating, in a sensor tracking database, unique identifying information of the pseudo Wi-Fi access point with a sensor,
    wherein the pseudo Wi-Fi access point transmits a management frame comprising sensor data of the sensor,
    wherein one or more wireless devices that encounter the pseudo Wi-Fi access point report observation data including the unique identifying information of the pseudo Wi-Fi access point and the sensor data of the management frame to a Wi-Fi AP Database,
    wherein there is no communication between the sensor tracking database and the one or more wireless devices that report encounters with the pseudo Wi-Fi access point to the Wi-Fi AP Database;
    receiving, at the sensor tracking database, first observation data of the pseudo Wi-Fi access point from one or more direct reporting wireless devices that encounter the pseudo Wi-Fi access point, the first observation data comprising the unique identifying information of the pseudo Wi-Fi access point and first sensor data of the sensor, or
    receiving, at the sensor tracking database, second observation data of the pseudo Wi-Fi access point from a Wi-Fi AP Database, the second observation data comprising the unique identifying information of the pseudo Wi-Fi access point and second sensor data of the sensor;
    storing first sensor data or second sensor data in the sensor tracking database; and
    providing user access to sensor data in the sensor tracking database.

18. The method of claim 17, wherein the sensor is disposed on, attached to, or integrated with an asset or placed in a location where sensing is desired.

19. The method of claim 17, wherein the unique identifying information of the pseudo Wi-Fi access point comprises a BSSID of the Wi-Fi access point.

20. The method of claim 17, wherein the sensor data of the sensor is stored in an SSID field of the management frame transmitted by the pseudo Wi-Fi access point.

21. The method of claim 17, wherein observation data further comprises location information of the pseudo Wi-Fi access point.

22. The method of claim 21, wherein the location information of the pseudo Wi-Fi access point comprises a latitude and a longitude of the pseudo Wi-Fi access point.

23. The method of claim 22, wherein determining the location of the sensor comprises using a latitude and longitude of the pseudo Wi-Fi access point as the location of the sensor.

24. The method of claim 22, wherein determining the location of the sensor comprises using a latitude and longitude of a reporting wireless device as the location of the sensor.

25. The method of claim 21, wherein the location information of the pseudo Wi-Fi access point comprises a latitude and a longitude of a reporting wireless device at or near the time of an encounter with the pseudo Wi-Fi access point.

26. The method of claim 21, wherein the location information of the pseudo Wi-Fi access point comprises a received signal strength of the pseudo Wi-Fi access point measured by a reporting wireless device at or near the time of an encounter with the pseudo Wi-Fi access point.

27. The method of claim 21, wherein the location information of the pseudo Wi-Fi access point comprises a latitude and a longitude of one or more Wi-Fi access points near the pseudo Wi-Fi access point at or near the time of a reporting wireless device's encounter with the pseudo Wi-Fi access point.

28. The method of claim 21, wherein the location information of the pseudo Wi-Fi access point comprises a received signal strength of one or more other Wi-Fi access points near the pseudo Wi-Fi access point at or near the time of a reporting wireless device's encounter with the pseudo Wi-Fi access point.

29. The method of claim 17, further comprising:
determining a location of the sensor based, at least in part, on observation data of the pseudo Wi-Fi access point.

30. The method of claim 29, wherein determining the location of the sensor comprises using a received signal strength of the pseudo Wi-Fi access point measured by a reporting wireless device at or near the time of its encounter with the pseudo Wi-Fi access point to determine the location of the sensor.

31. The method of claim 29, wherein determining the location of the sensor comprises using a latitude and longitude of one or more other Wi-Fi access points encountered by a reporting wireless device at or near the time of its encounter with the pseudo Wi-Fi access point to determine the location of the sensor.

32. The method of claim 29, wherein determining the location of the sensor comprises using a received signal strength of one or more Wi-Fi access points measured by a reporting wireless device at or near the time of its encounter with the pseudo Wi-Fi access point to determine the location of the sensor.

33. A method of passive sensor tracking using one or more observations of a pseudo Wi-Fi access point comprising:

associating, in a sensor tracking database, unique identifying information of the pseudo Wi-Fi access point with a sensor,
wherein the pseudo Wi-Fi access point transmits a management frame comprising sensor data of the sensor, and
wherein one or more wireless devices that encounter the pseudo Wi-Fi access point report observation data including the unique identifying information of the pseudo Wi-Fi access point and the sensor data to the sensor tracking database;
receiving, at the sensor tracking database, observation data of the pseudo Wi-Fi access point from one or more wireless devices that encounter the pseudo Wi-Fi access point, the observation data comprising the unique identifying information of the pseudo Wi-Fi access point and sensor data of the sensor;
storing the sensor data in the sensor tracking database; and
providing user access to sensor data in the sensor tracking database.

34. The method of claim 33, further comprising:
providing one or more wireless devices with the unique identifying information of the pseudo Wi-Fi access point to limit observation data reported by one or more wireless devices to data relevant to the pseudo Wi-Fi access point.

35. The method of claim 33, further comprising:
providing one or more wireless devices with identifying information of the pseudo Wi-Fi access point to limit observation data reported by one or more wireless devices to data relevant to the pseudo Wi-Fi access point.

36. The method of claim 33, further comprising:
filtering received observation data to limit observation data to data relevant to the pseudo Wi-Fi access point associated with the moveable asset to be tracked.

37. The method of claim 33, wherein the sensor is disposed on, attached to, or integrated with an asset or placed in a location where sensing is desired.

38. The method of claim 33, wherein the unique identifying information of the pseudo Wi-Fi access point comprises a BSSID of the pseudo Wi-Fi access point.

39. The method of claim 33, wherein the sensor data of the sensor is stored in an SSID field of the management frame transmitted by the pseudo Wi-Fi access point.

40. The method of claim 33, wherein observation data further comprises location information of the pseudo Wi-Fi access point.

41. The method of claim 40, wherein the location information of the pseudo Wi-Fi access point comprises a latitude and a longitude of the pseudo Wi-Fi access point.

42. The method of claim 40, wherein the location information of the pseudo Wi-Fi access point comprises a latitude and a longitude of a reporting wireless device at or near the time of an encounter with the pseudo Wi-Fi access point.

43. The method of claim 40, wherein the location information of the pseudo Wi-Fi access point comprises a received signal strength of the pseudo Wi-Fi access point measured by a reporting wireless device at or near the time of an encounter with the pseudo Wi-Fi access point.

44. The method of claim 40, wherein the location information of the pseudo Wi-Fi access point comprises a latitude and a longitude of one or more Wi-Fi access points near the pseudo Wi-Fi access point at or near the time of a reporting wireless device's encounter with the pseudo Wi-Fi access point.

45. The method of claim 40, wherein the location information of the pseudo Wi-Fi access point comprises a received signal strength of one or more other Wi-Fi access points near the pseudo Wi-Fi access point at or near the time of a reporting wireless device's encounter with the pseudo Wi-Fi access point.

46. The method of claim 33, further comprising:
determining a location of the sensor based, at least in part, on observation data of the pseudo Wi-Fi access point.

47. The method of claim 46, wherein determining the location of the sensor comprises using a latitude and longitude of the pseudo Wi-Fi access point as the location of the sensor.

48. The method of claim 46, wherein determining the location of the sensor comprises using a latitude and longitude of a reporting wireless device as the location of the sensor.

49. The method of claim 46, wherein determining the location of the sensor comprises using a received signal strength of the pseudo Wi-Fi access point measured by a reporting wireless device at or near the time of its encounter with the pseudo Wi-Fi access point to determine the location of the sensor.

50. The method of claim 46, wherein determining the location of the sensor comprises using a latitude and longitude of one or more other Wi-Fi access points encountered by a reporting wireless device at or near the time of its encounter with the pseudo Wi-Fi access point to determine the location of the sensor.

51. The method of claim 46, wherein determining the location of the sensor comprises using a received signal strength of one or more Wi-Fi access points measured by a reporting wireless device at or near the time of its encounter with the pseudo Wi-Fi access point to determine the location of the sensor.

* * * * *